(12) United States Patent
Kim et al.

(10) Patent No.: US 12,349,008 B2
(45) Date of Patent: Jul. 1, 2025

(54) METHOD FOR TRANSMITTING/RECEIVING DOWNLINK INFORMATION IN WIRELESS COMMUNICATION SYSTEM SUPPORTING INTERNET OF THINGS, AND DEVICE THEREFOR

(71) Applicant: LG ELECTRONICS INC., Seoul (KR)

(72) Inventors: Jaehyung Kim, Seoul (KR); Changhwan Park, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 509 days.

(21) Appl. No.: 17/635,811

(22) PCT Filed: Aug. 14, 2020

(86) PCT No.: PCT/KR2020/010911
§ 371 (c)(1),
(2) Date: Feb. 16, 2022

(87) PCT Pub. No.: WO2021/034056
PCT Pub. Date: Feb. 25, 2021

(65) Prior Publication Data
US 2022/0322156 A1 Oct. 6, 2022

(30) Foreign Application Priority Data

| Aug. 16, 2019 | (KR) | 10-2019-0100614 |
| Oct. 4, 2019 | (KR) | 10-2019-0123428 |
| Nov. 8, 2019 | (KR) | 10-2019-0142948 |

(51) Int. Cl.
*H04W 28/26* (2009.01)
*H04W 72/1273* (2023.01)
*H04W 4/70* (2018.01)

(52) U.S. Cl.
CPC ....... *H04W 28/26* (2013.01); *H04W 72/1273* (2013.01); *H04W 4/70* (2018.02)

(58) Field of Classification Search
CPC .... H04W 28/26; H04W 72/1273; H04W 4/70
See application file for complete search history.

(56) References Cited

U.S. PATENT DOCUMENTS

2008/0062178 A1* 3/2008 Khandekar ........... H04L 67/306
345/440
2017/0347351 A1* 11/2017 Cai ....................... H04L 5/0064
(Continued)

FOREIGN PATENT DOCUMENTS

| CN | 105191178 | 12/2015 |
| CN | 109565407 | 4/2019 |

(Continued)

OTHER PUBLICATIONS

3GPP TS 36.331 V15.6.0 (Jun. 2019), 3rd Generation Partnership Project Technical Specification Group Radio Access Network, study on Evolved Universal Terrestrial Radio Access (Release 15), Jun. 2019, 960 pages.

(Continued)

*Primary Examiner* — Parth Patel
(74) *Attorney, Agent, or Firm* — Fish & Richardson P.C.

(57) ABSTRACT

A method of transmitting and receiving downlink information in a wireless communication system supporting Internet of Things (IoT) and a device therefor are disclosed. The method performed by a user equipment (UE) comprises receiving, from a base station, discontinuous reception (DRX) related information via radio resource control (RRC) signaling, receiving, from the base station, a paging message based on the DRX related information, receiving, from the base station, configuration information including information for a slot level bitmap related to a reserved resource and information for a symbol level bitmap related to the reserved (Continued)

resource, and receiving, from the base station, downlink control information (DCI) including indication information related to a use of the reserved resource.

7 Claims, 31 Drawing Sheets

(56) References Cited

U.S. PATENT DOCUMENTS

| | | | | |
|---|---|---|---|---|
| 2018/0070339 | A1 | 3/2018 | Horiuchi et al. | |
| 2018/0098322 | A1* | 4/2018 | Yoon | H04W 56/0005 |
| 2018/0176979 | A1* | 6/2018 | Ryu | H04W 4/70 |
| 2018/0206251 | A1* | 7/2018 | Chen | H04W 72/04 |
| 2018/0206289 | A1* | 7/2018 | Kim | H04W 72/12 |
| 2018/0359772 | A1* | 12/2018 | Park | H04W 72/1268 |
| 2019/0053202 | A1* | 2/2019 | Bendlin | H04W 48/10 |
| 2019/0159168 | A1* | 5/2019 | Wang | H04W 68/02 |
| 2019/0191453 | A1 | 6/2019 | Xiong et al. | |
| 2019/0199422 | A1* | 6/2019 | Li | H04W 72/046 |
| 2019/0327673 | A1* | 10/2019 | Bitra | G01S 5/10 |
| 2019/0327760 | A1* | 10/2019 | Holfeld | H04W 72/23 |
| 2019/0342867 | A1* | 11/2019 | Lin | H04L 1/0013 |
| 2019/0342944 | A1* | 11/2019 | Chatterjee | H04W 80/08 |
| 2019/0364462 | A1* | 11/2019 | Kim | H04W 48/12 |
| 2019/0372719 | A1* | 12/2019 | Talarico | H04L 1/189 |
| 2020/0037292 | A1* | 1/2020 | Oh | H04W 72/23 |
| 2020/0052811 | A1* | 2/2020 | Li | H04L 1/1887 |
| 2020/0053516 | A1* | 2/2020 | Sui | H04L 5/0005 |
| 2020/0160526 | A1* | 5/2020 | Ishikawa | G06T 7/0016 |
| 2020/0178224 | A1* | 6/2020 | Yang | H04L 5/0094 |
| 2020/0196282 | A1* | 6/2020 | Wang | H04W 52/0216 |
| 2020/0280999 | A1* | 9/2020 | Guo | H04W 72/542 |
| 2020/0344719 | A1* | 10/2020 | Luo | H04W 68/005 |
| 2020/0374909 | A1* | 11/2020 | Takeda | H04W 72/535 |
| 2020/0374967 | A1* | 11/2020 | Nogami | H04W 72/0446 |
| 2021/0014928 | A1* | 1/2021 | Zheng | H04W 76/27 |
| 2021/0037516 | A1* | 2/2021 | Lyu | H04W 72/54 |
| 2021/0153289 | A1* | 5/2021 | Wu | H04W 52/0212 |
| 2021/0195529 | A1* | 6/2021 | Yang | H04L 5/0051 |
| 2021/0203468 | A1* | 7/2021 | Yi | H04L 5/0098 |
| 2021/0385710 | A1* | 12/2021 | Jin | H04L 5/1469 |
| 2021/0410084 | A1* | 12/2021 | Li | H04W 52/265 |
| 2022/0053421 | A1* | 2/2022 | Zheng | H04W 52/0229 |
| 2022/0110136 | A1* | 4/2022 | Li | H04W 92/20 |
| 2022/0116875 | A1* | 4/2022 | Nimbalker | H04W 52/0216 |
| 2022/0159701 | A1* | 5/2022 | Islam | H04L 5/0053 |
| 2022/0200773 | A1* | 6/2022 | Alriksson | H04L 5/0094 |
| 2022/0263635 | A1* | 8/2022 | Li | H04W 72/569 |
| 2022/0272583 | A1* | 8/2022 | Mozaffari | H04W 72/0453 |
| 2022/0322156 | A1* | 10/2022 | Kim | H04W 76/28 |

FOREIGN PATENT DOCUMENTS

| | | | |
|---|---|---|---|
| CN | 110035561 | 7/2019 | |
| CN | 110115080 | 8/2019 | |
| CN | 114245991 | 3/2022 | |
| CN | 114270932 | 4/2022 | |
| KR | 10-2018-0093454 | 8/2018 | |
| WO | WO2017026781 | 2/2017 | |
| WO | WO 2018/031746 | 2/2018 | |
| WO | WO 2018/128463 | 7/2018 | |
| WO | WO 2018/203722 | 11/2018 | |
| WO | WO2018196746 | 11/2018 | |
| WO | WO 2019/031834 | 2/2019 | |
| WO | WO 2019/139915 | 7/2019 | |
| WO | WO-2019137510 A1 * | 7/2019 | H04L 5/00 |
| WO | WO-2020026354 A1 * | 2/2020 | |

OTHER PUBLICATIONS

3GPP TS 38.331 V15.6.0 (Jun. 2019), 3rd Generation Partnership Project Technical Specification Group Radio Access Network, study on Radio Resource Control (RRC) protocol specification (Release 15), Jun. 2019, 519 pages.
Extended European Search Report in European Appln. No. 20855597. 9, mailed on Jul. 10, 2023, 15 pages.
Ericsson, "Coexistence of LTE-MTC with NR," R1-1905959, Presented at 3GPP TSG RAN WG1 Meeting #97, Reno, Nevada, USA, May 13-17, 2019, 14 pages.
Ericsson, "Feature lead summary for Coexistence of LTE-MTC with NR," R1-1907581, Presented at 3GPP TSG RAN WG1 Meeting #97, Reno, USA, May 13-17, 2019, 12 pages.
International Search Report in International Appln. No. PCT/KR2020/010911, dated Nov. 6, 2020, 4 pages (with English translation).
OPPO, "Multiplexing between slot-based and symbol-based transmissions and pre-emption indication," R1-1719974, Presented at 3GPP TSG RAN WG1 Meeting 91, Reno, USA, November 27-Dec. 1, 2017, 3 pages.
Ericsson, "DL/UL common aspects of TDD for NB-IoT," R1-1801502, 3GPP TSG-RAN WG1, Meeting #92, Athens, Greece, Feb. 26-Mar. 2, 2018, 13 pages.
Ericsson, "Report on [100#38][MTC/NB-IoT] Padding issue in Msg3," R2-1803077, 3GPP TSG-RAN WG2, Meeting #101, Athens, Greece, Feb. 26-Mar. 2, 2018, 24 pages.
Huawei, HiSilicon, "Feature lead summary of Coexistence of NB-IoT with NR," R1-1903255, 3GPP TSG RAN WG1, Meeting #96, Athens, Greece, Feb. 25-Mar. 1, 2019, 8 pages.
Huawei, HiSilicon, "Feature lead summary of Coexistence of NB-IoT with NR," R1-1907574, 3GPP TSG RAN WG1, Meeting #97, Reno, USA, May 13-17, 2019, 7 pages.
Office Action in Chinese Appln. No. 202080058057.0, mailed on Apr. 24, 2024, 20 pages (with English translation).
Office Action in Korean Appln. No. 10-2022-7004354, mailed on Jul. 8, 2024, 21 pages (with English translation).

* cited by examiner

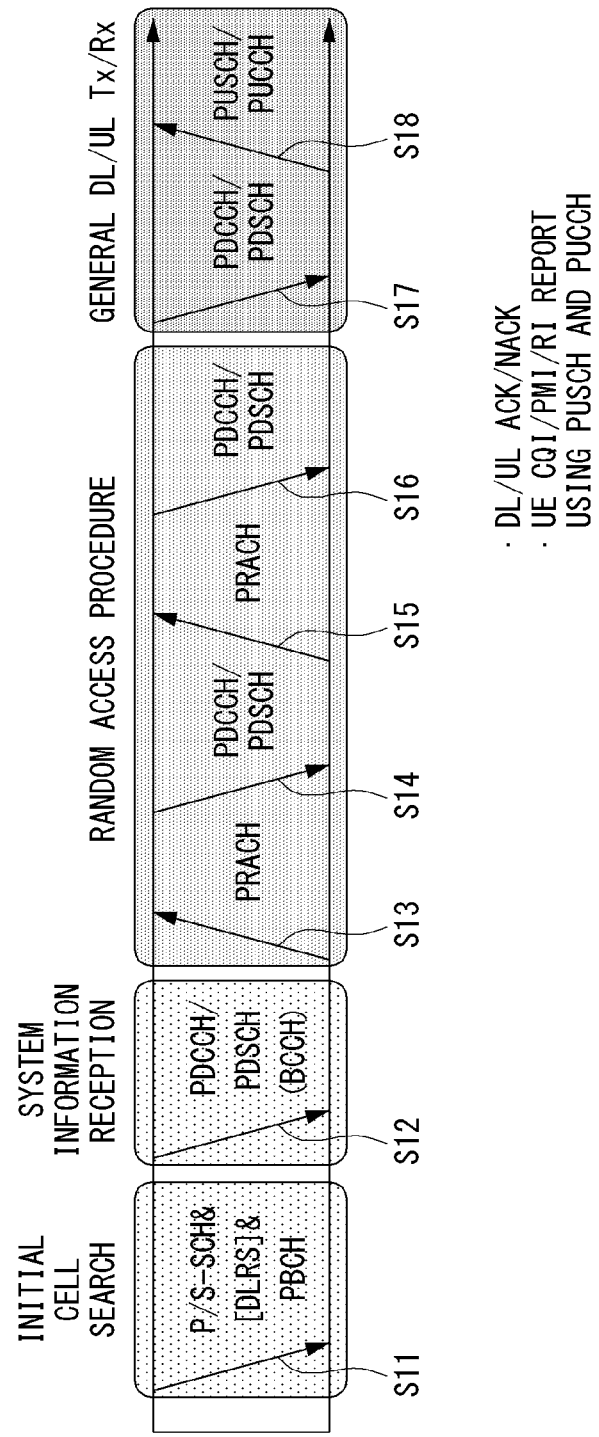

[FIG. 2]
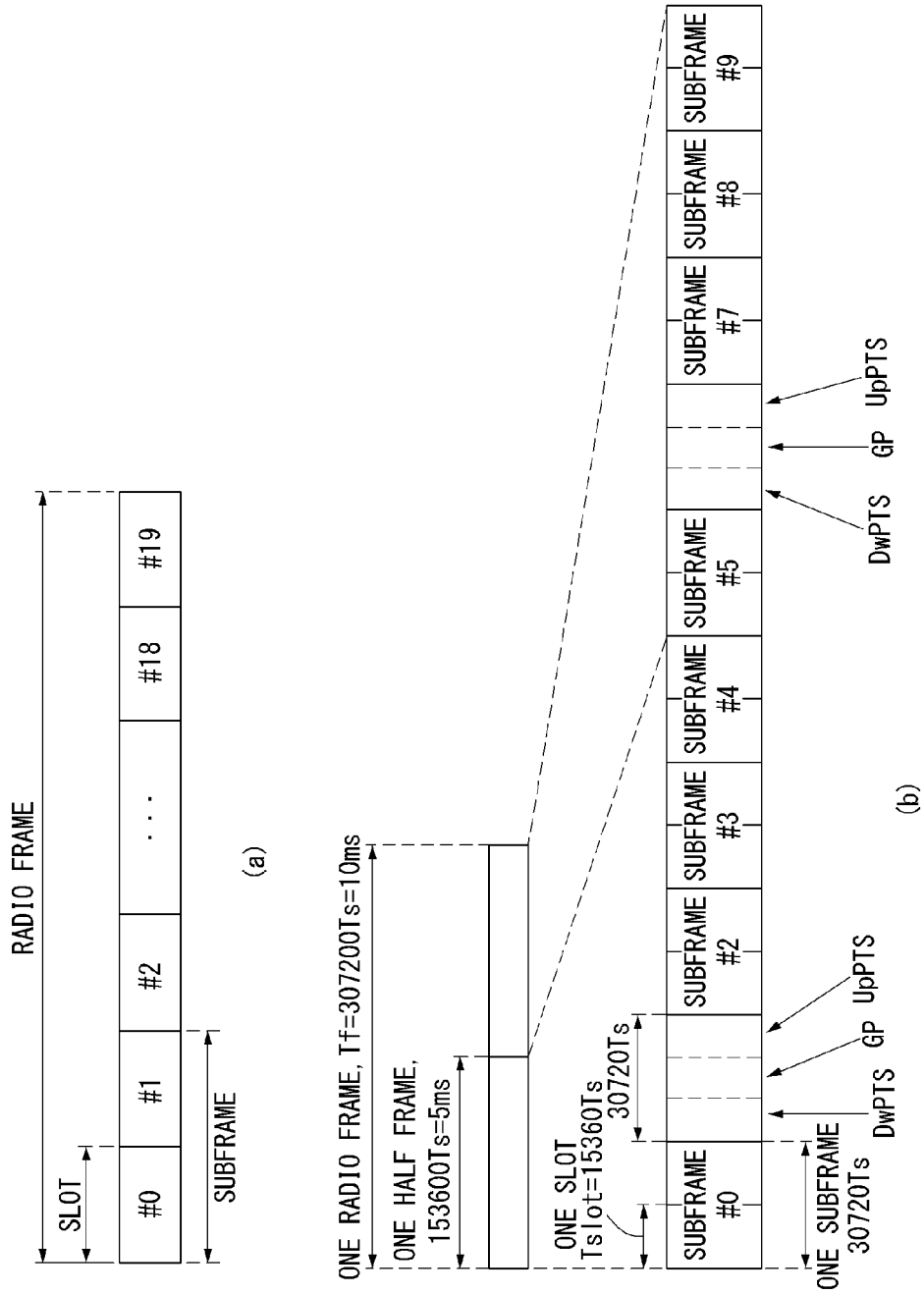

[FIG. 3]
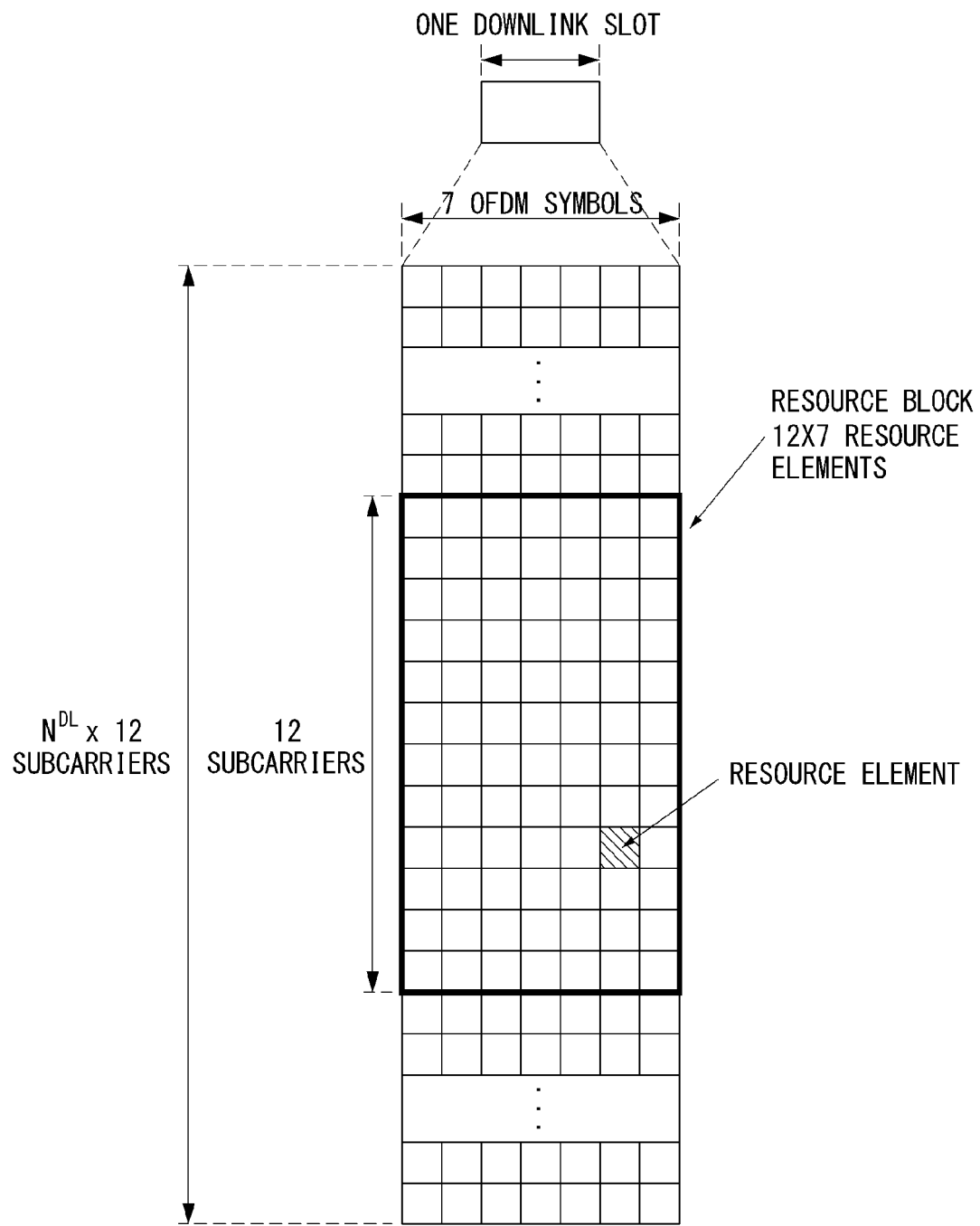

[FIG. 4]
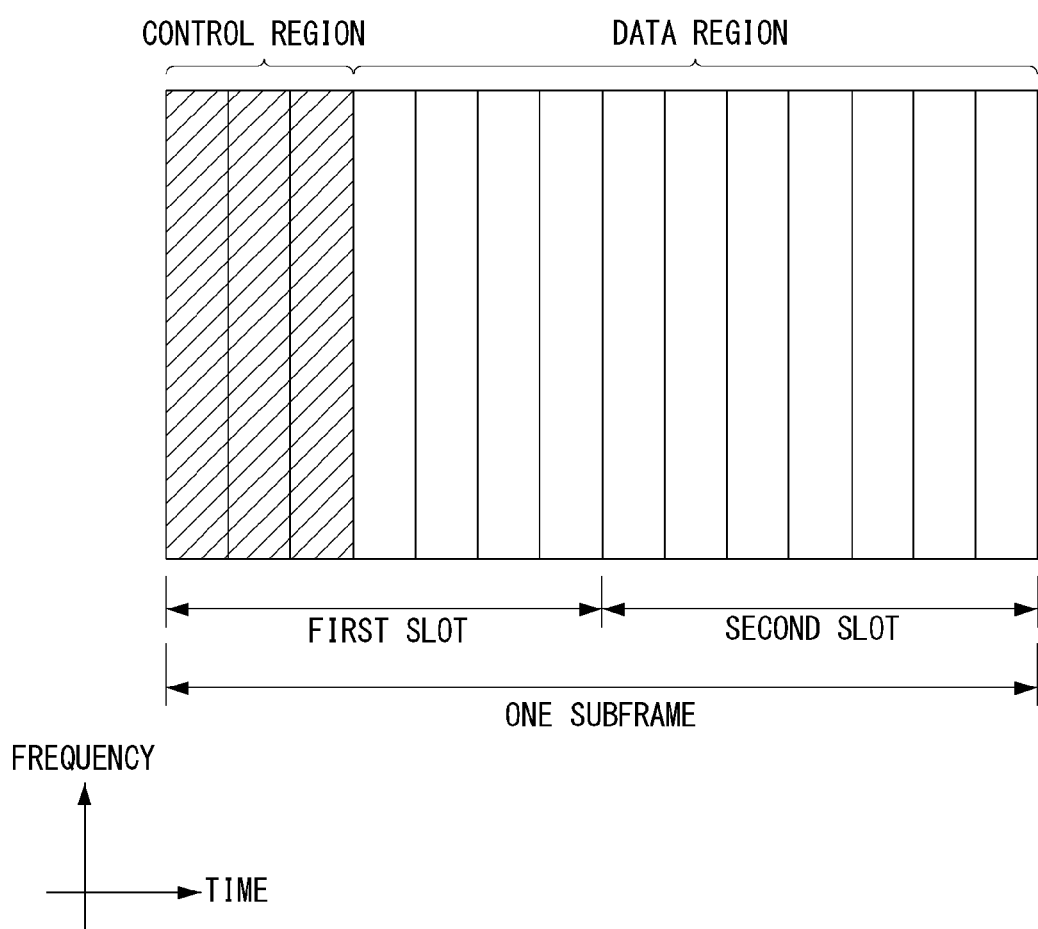

[FIG. 5]
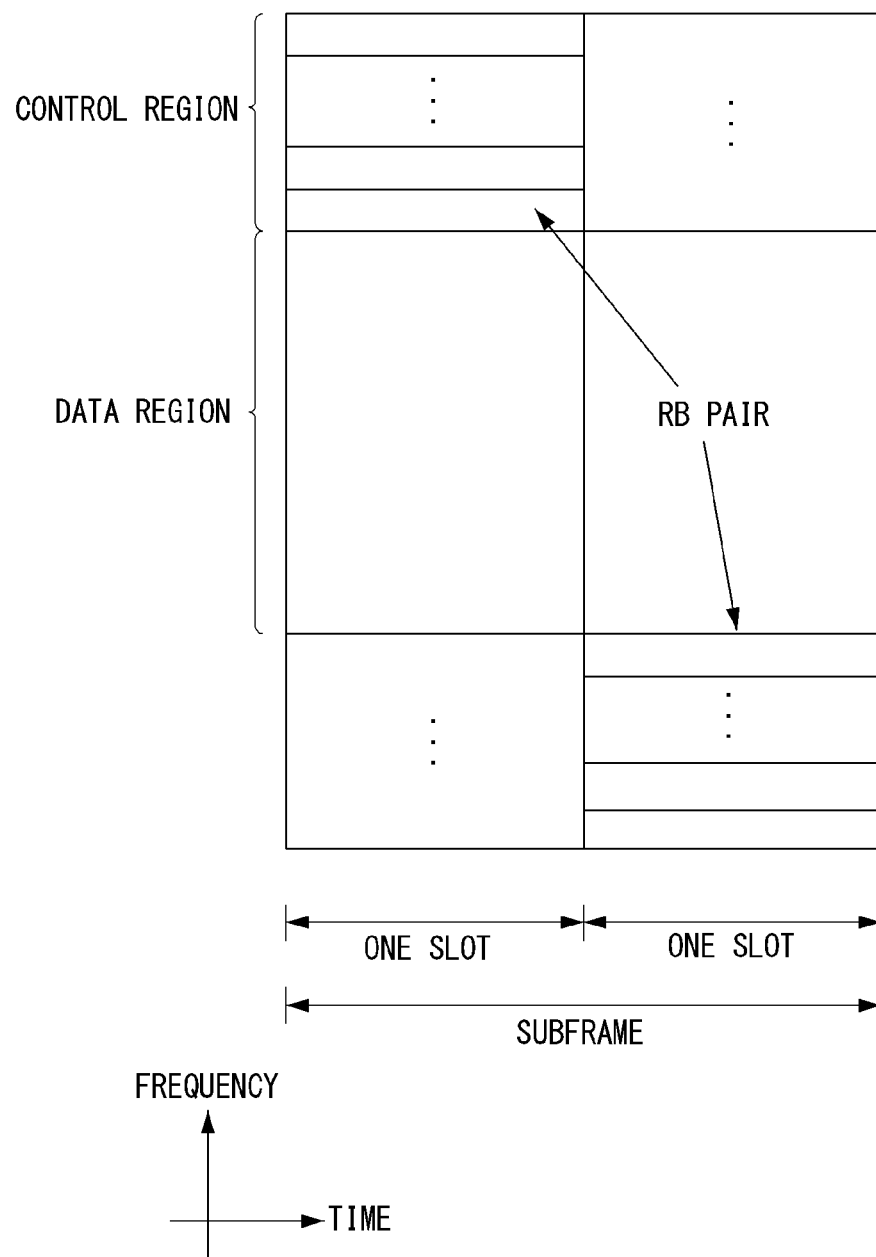

[FIG. 6]
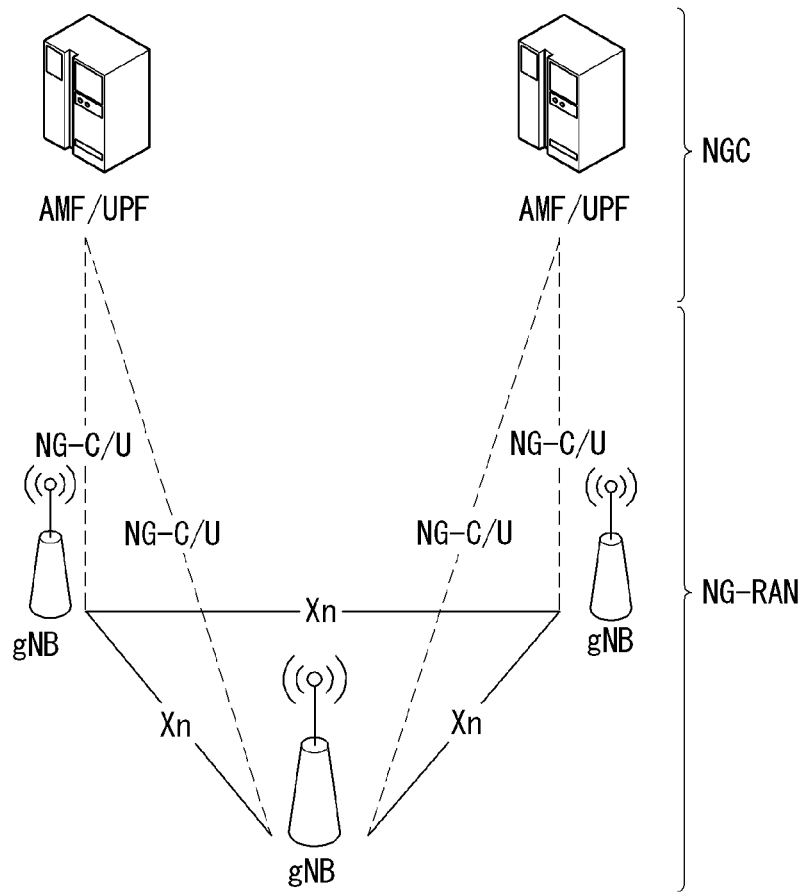
[FIG. 7]
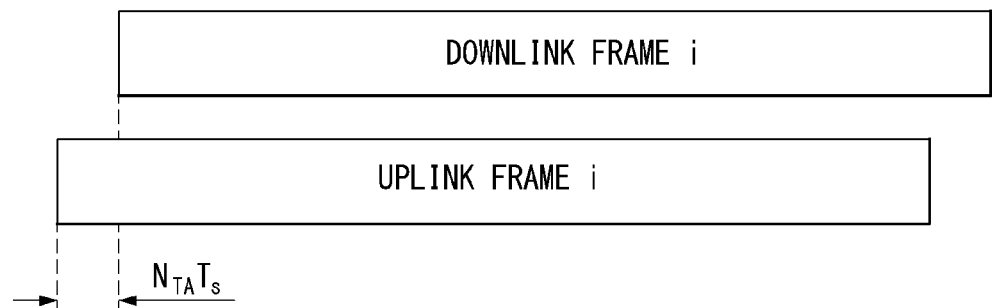

[FIG. 8]
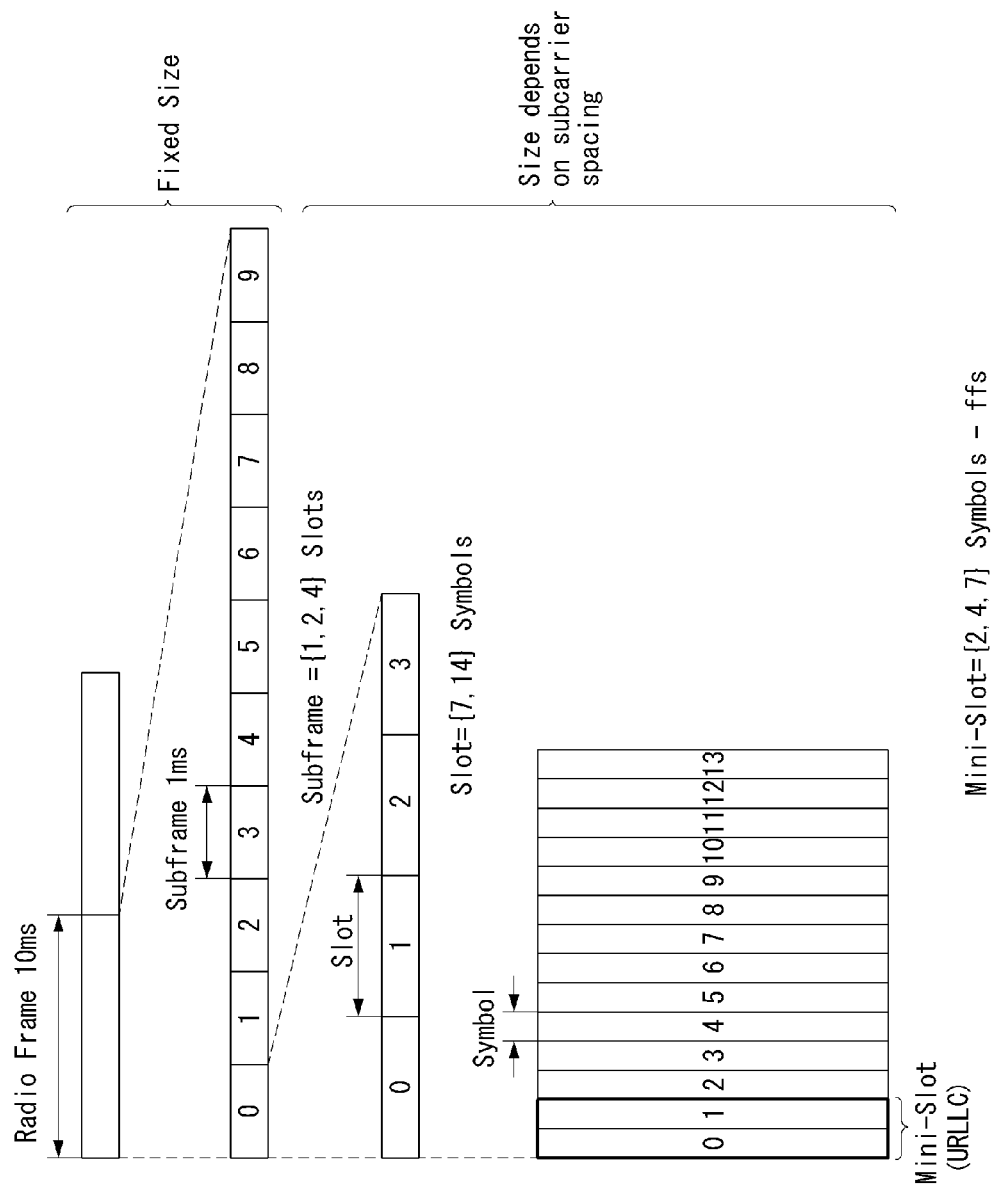

[FIG. 9]
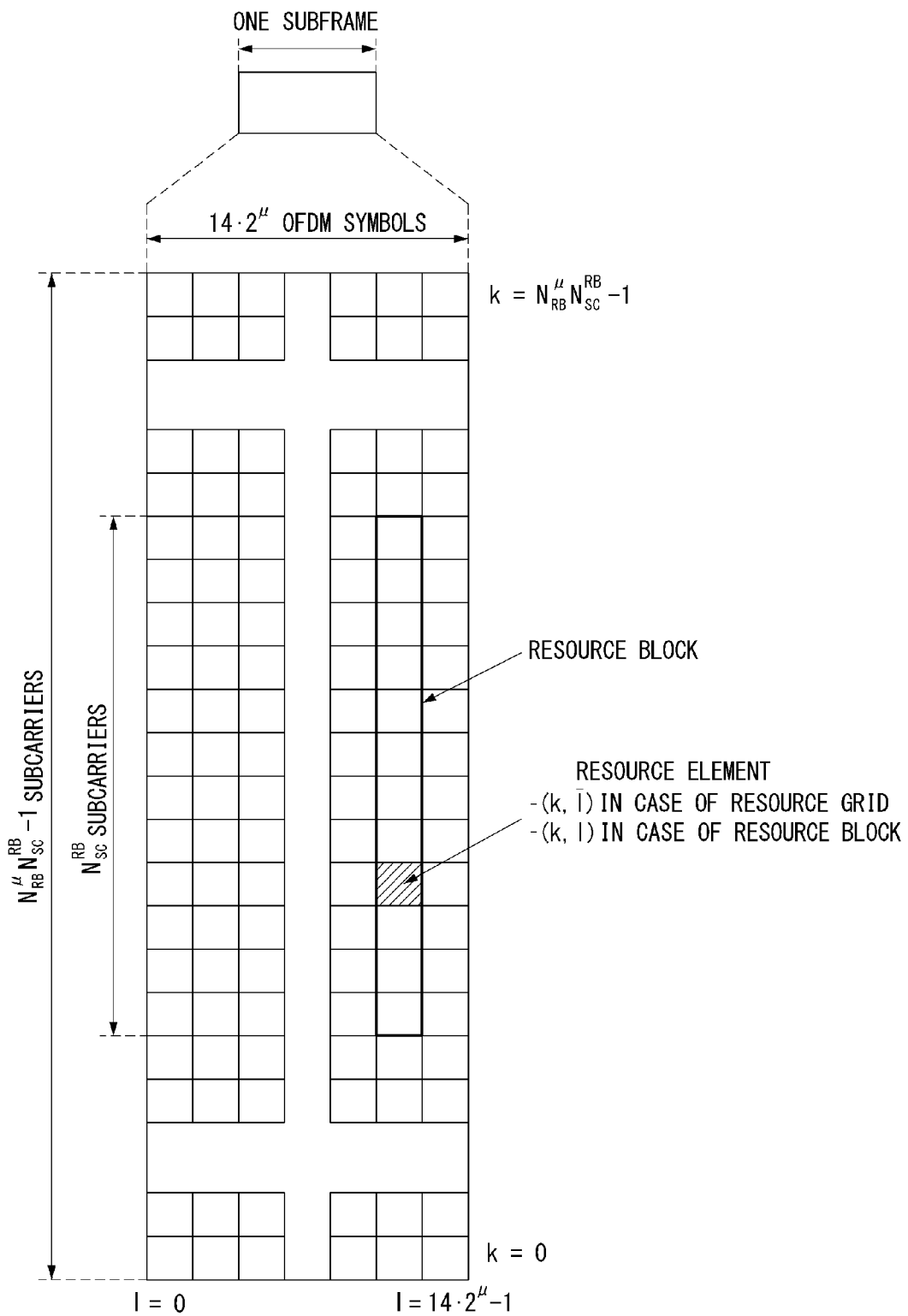

[FIG. 10]
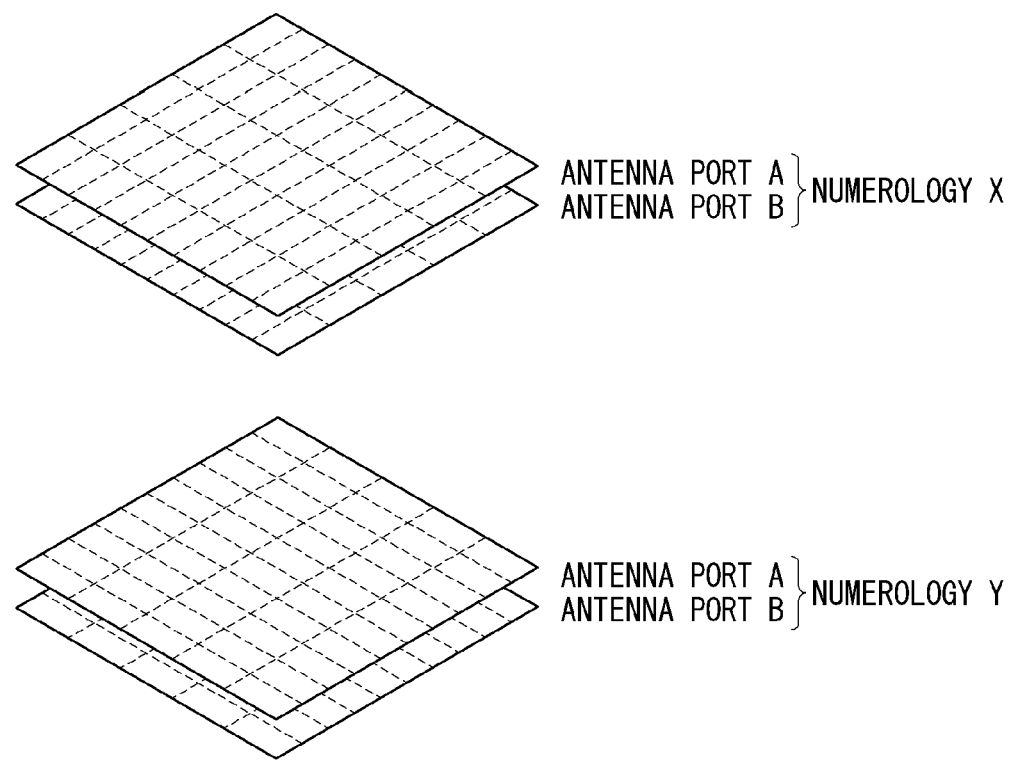

[FIG. 11]
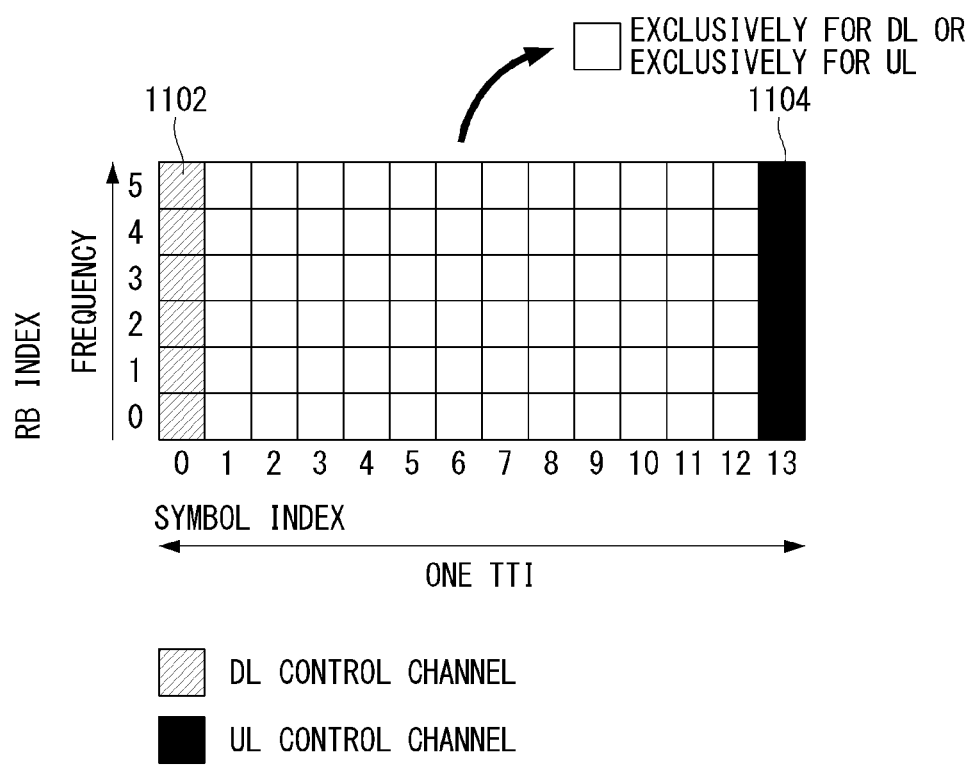

[FIG. 12]
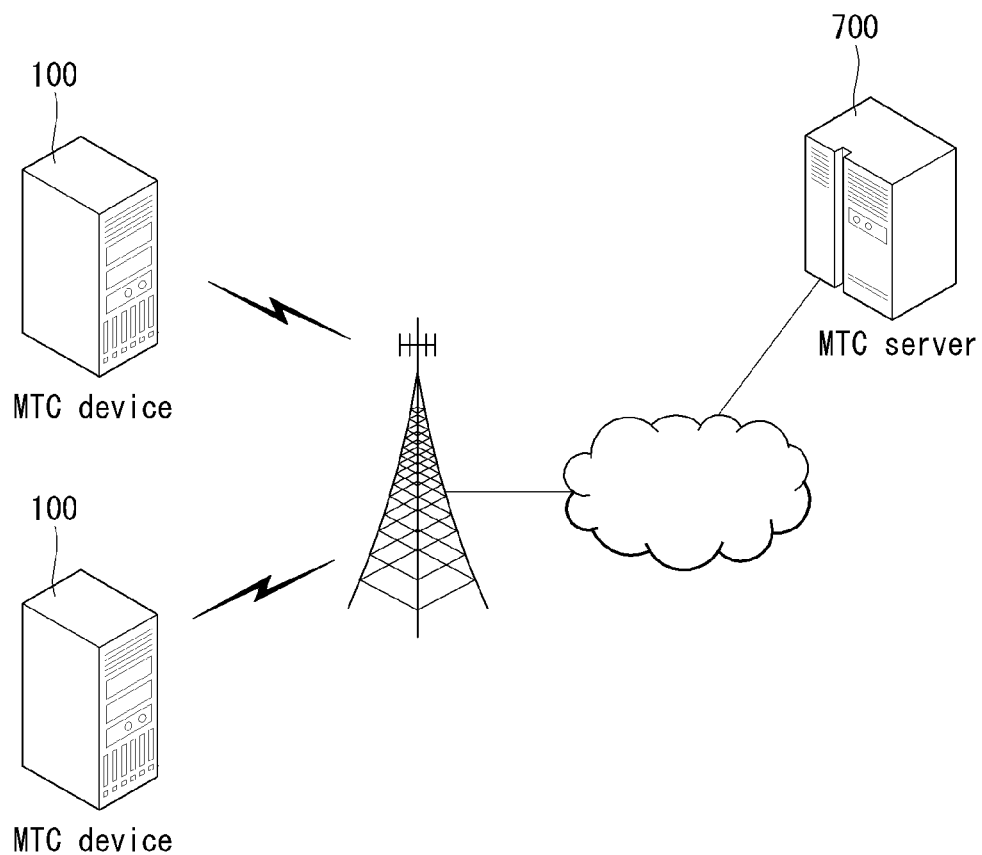

[ FIG. 13 ]
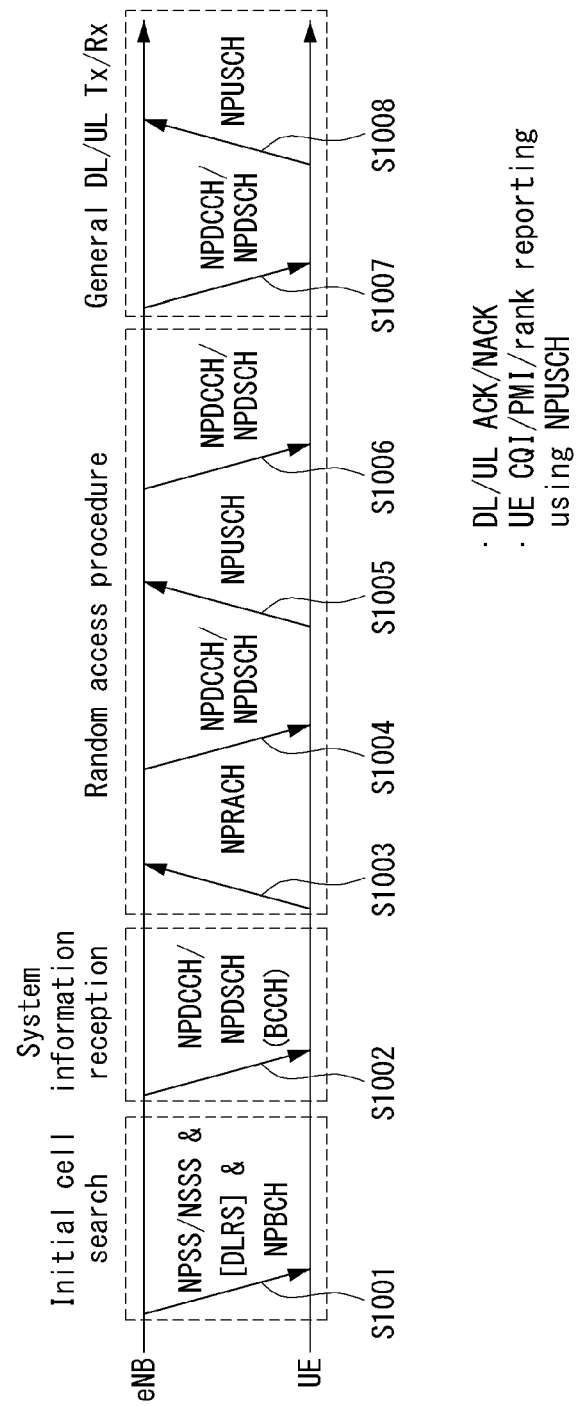

[FIG. 14]
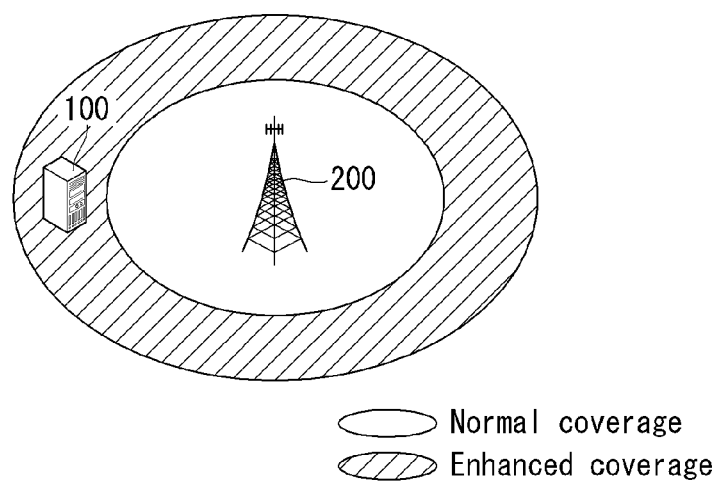
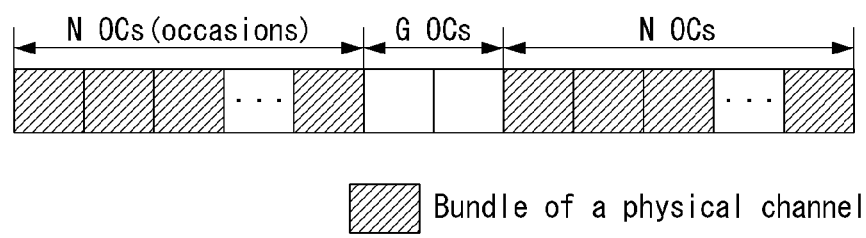

[FIG. 15]
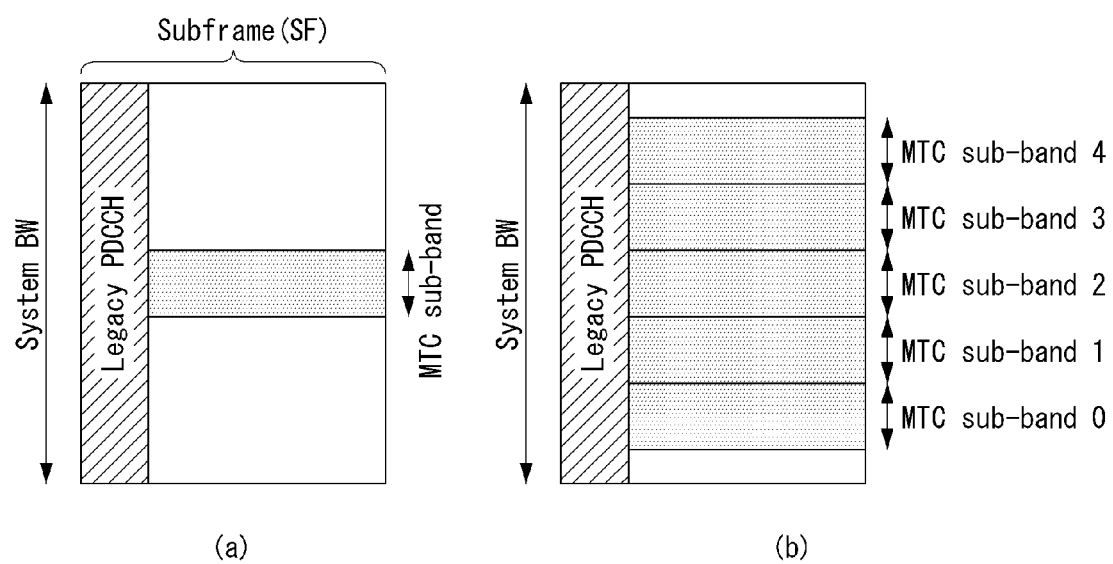

[FIG. 16]
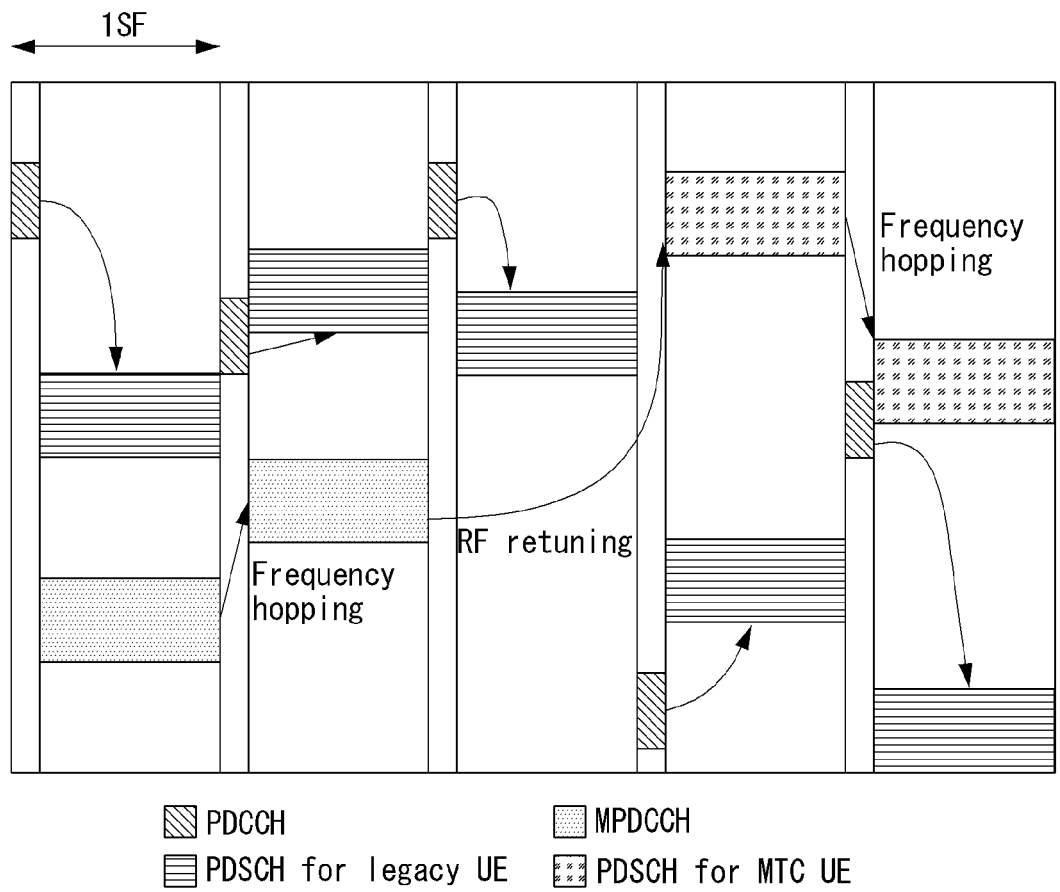

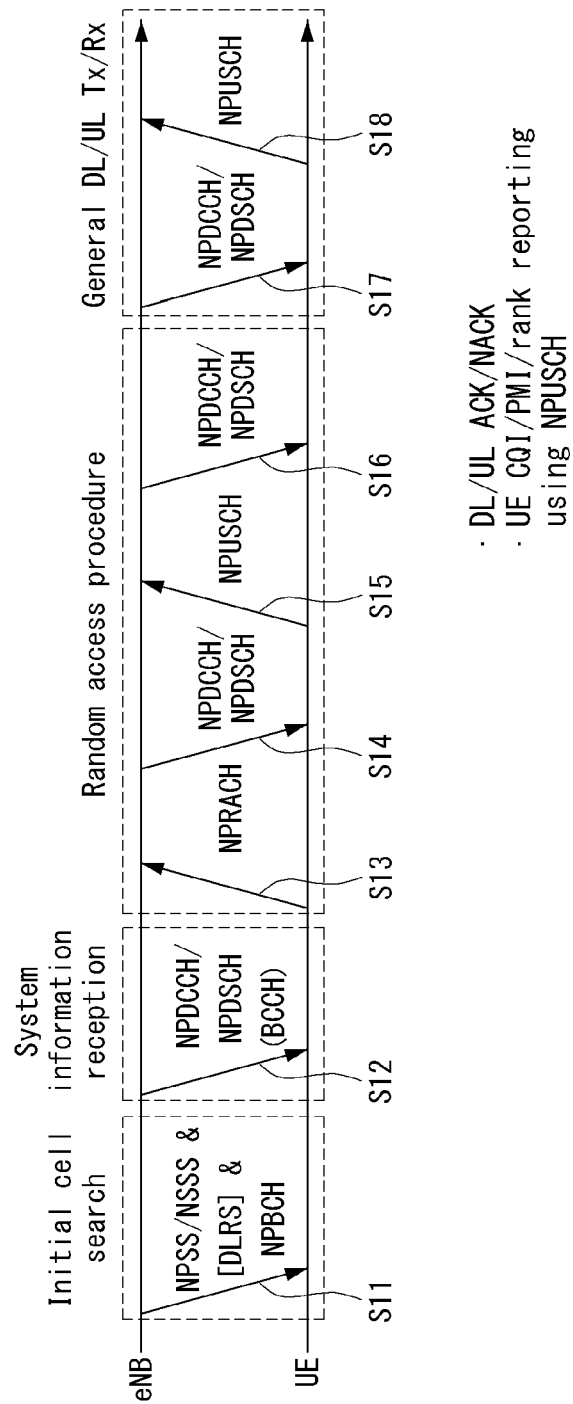
[ FIG. 17 ]

[FIG. 18]
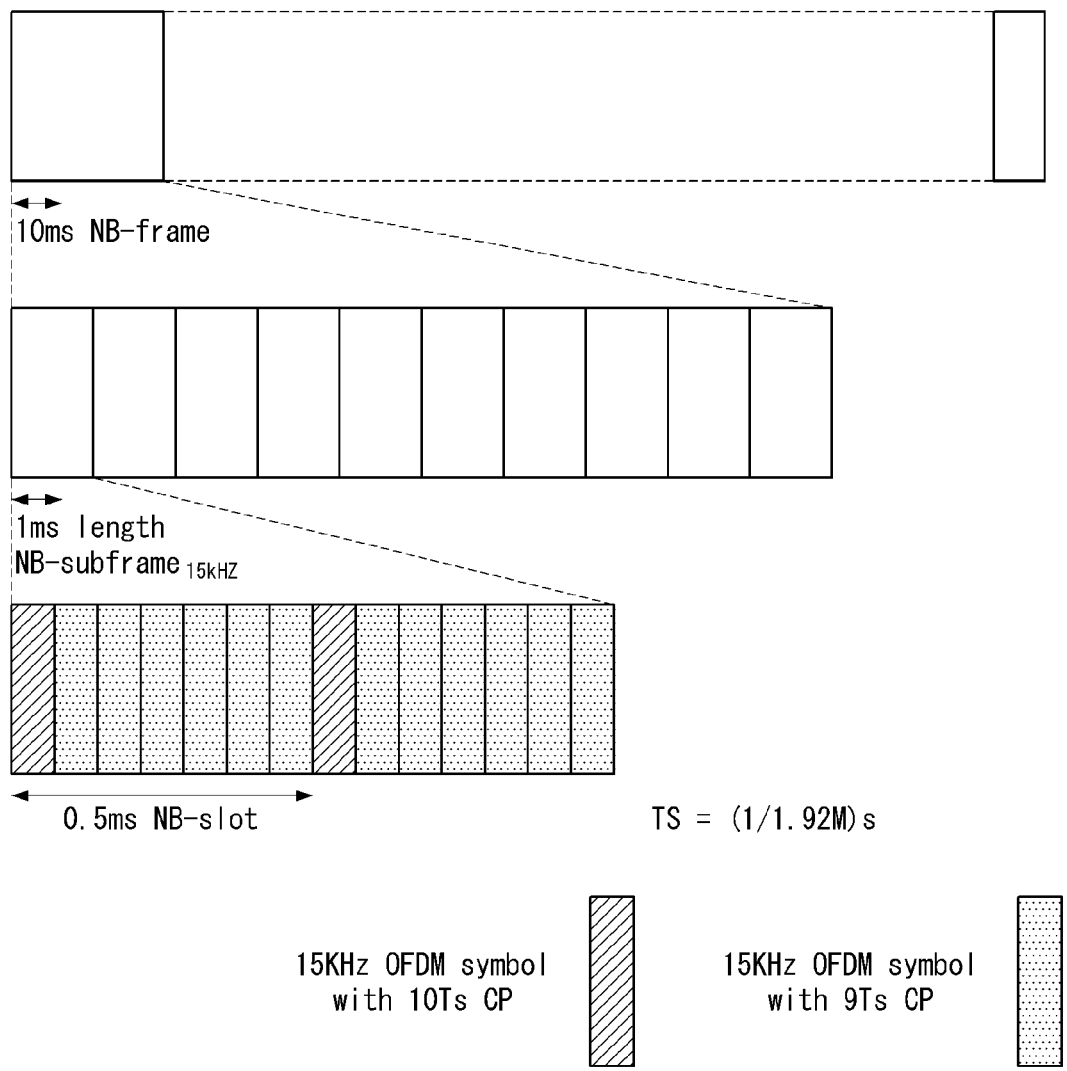

[FIG. 19]
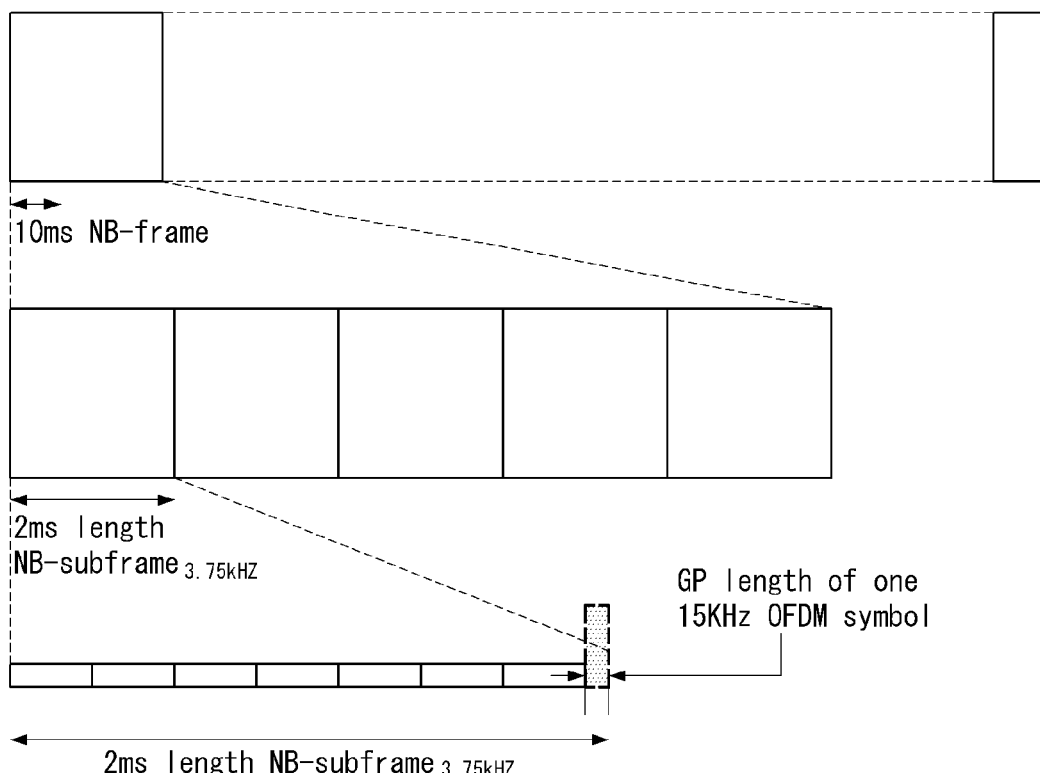

[FIG. 20]
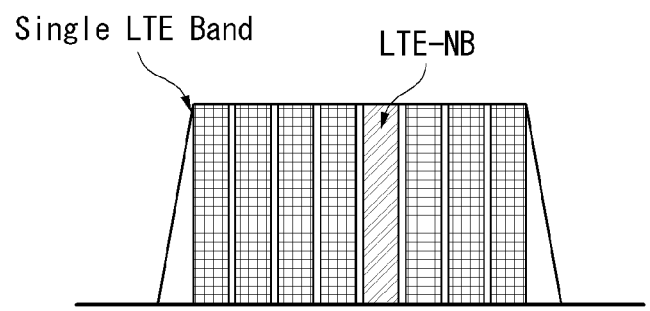
(a) In-band system
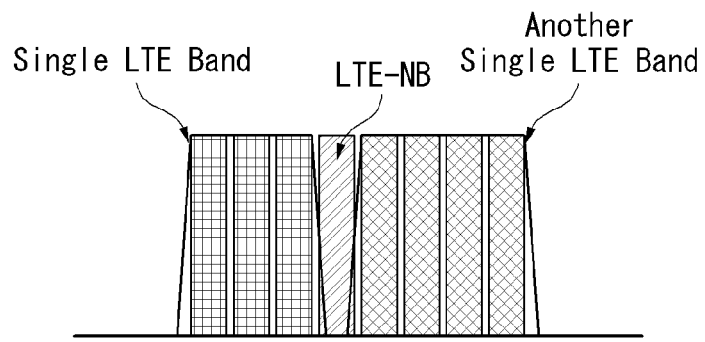
(b) Guard-band system
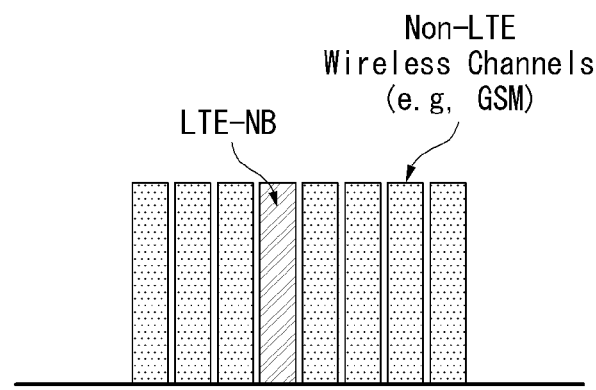
(c) Stand-alone system

[FIG. 21]
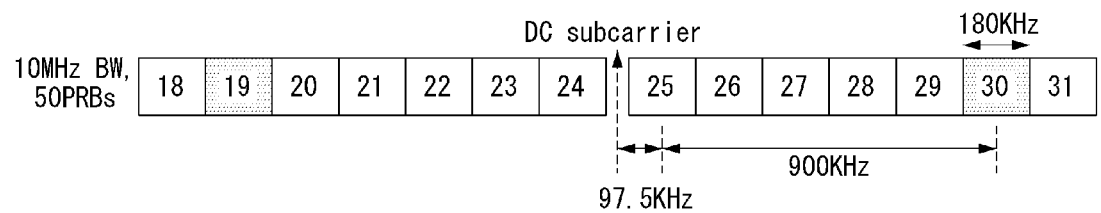
[FIG. 22]
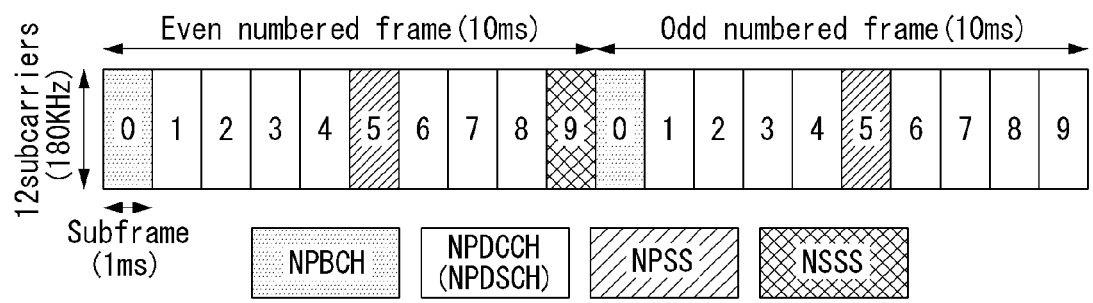

[FIG. 23]
[FIG. 24]
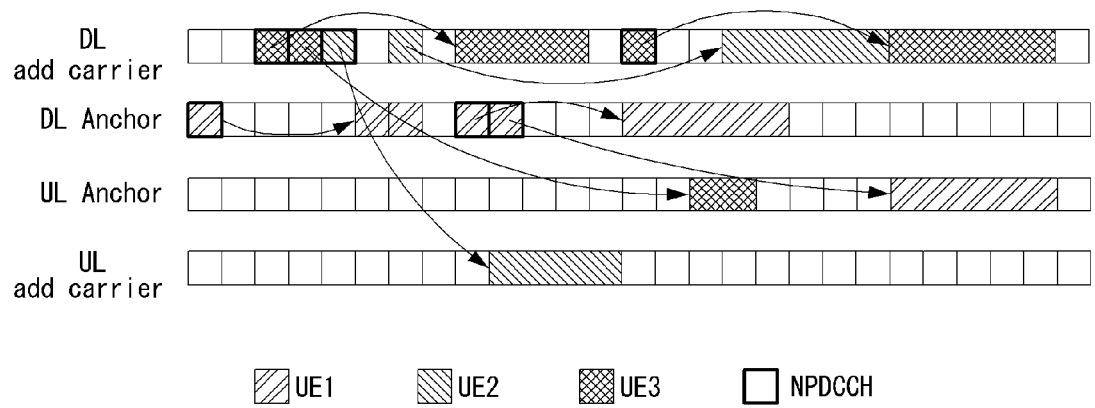

[FIG. 25]
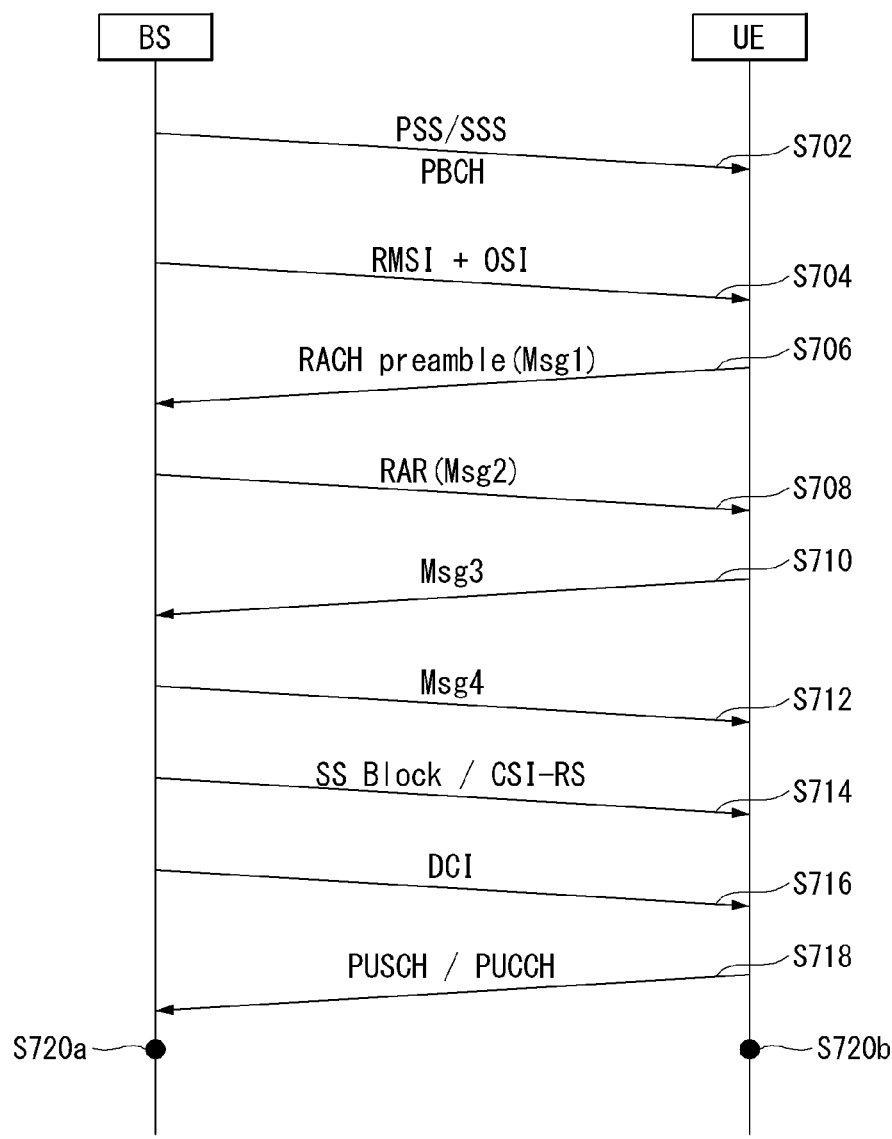

[FIG. 26]
(a) Preamble symbol group
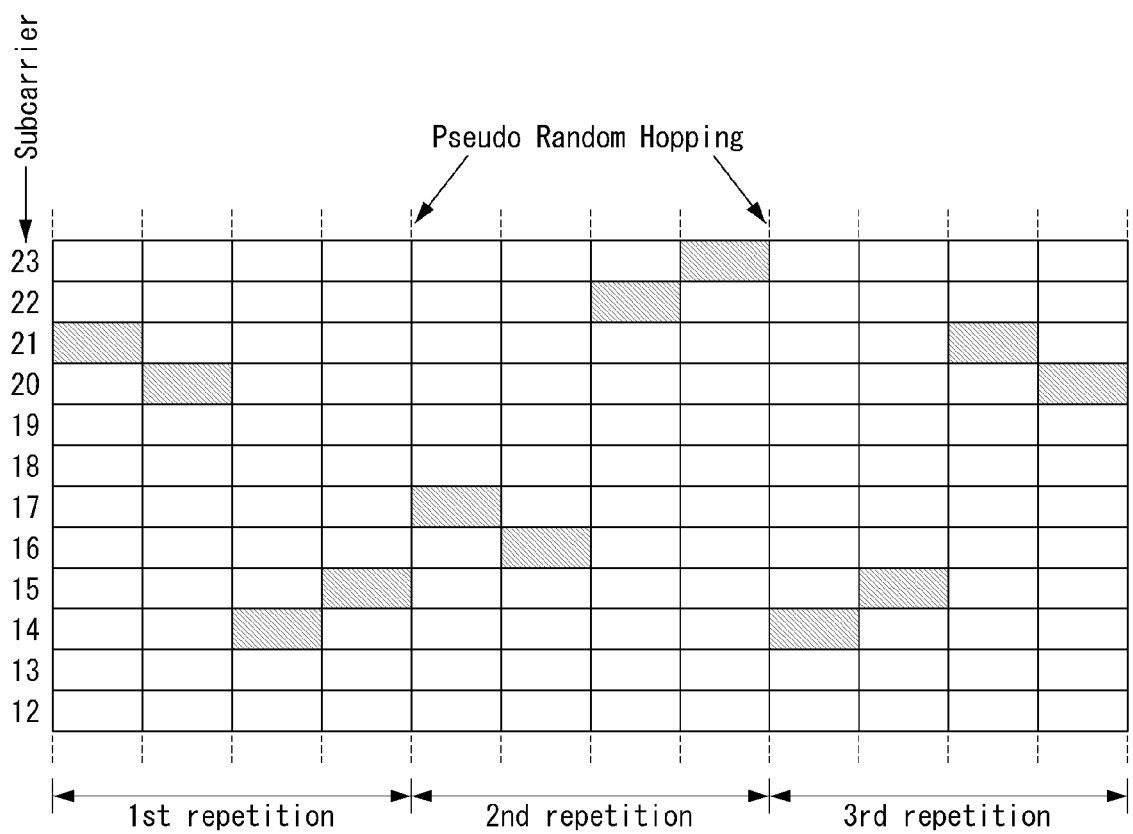
(b) Preamble transmission

[FIG. 27]
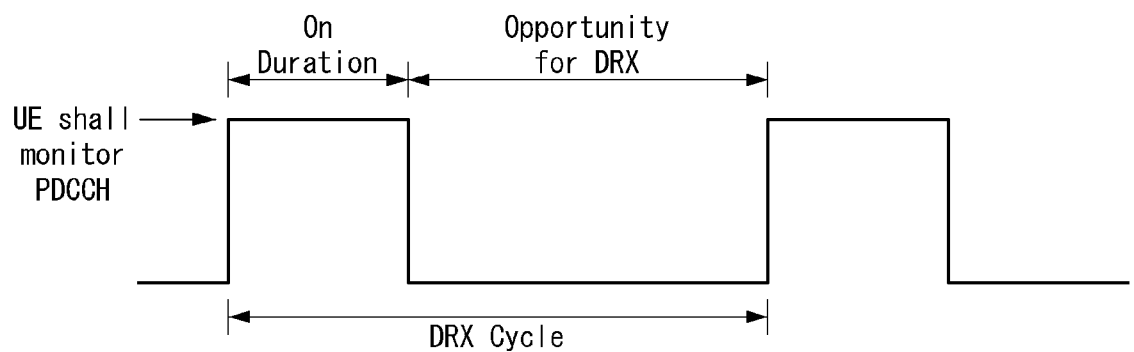
[FIG. 28]
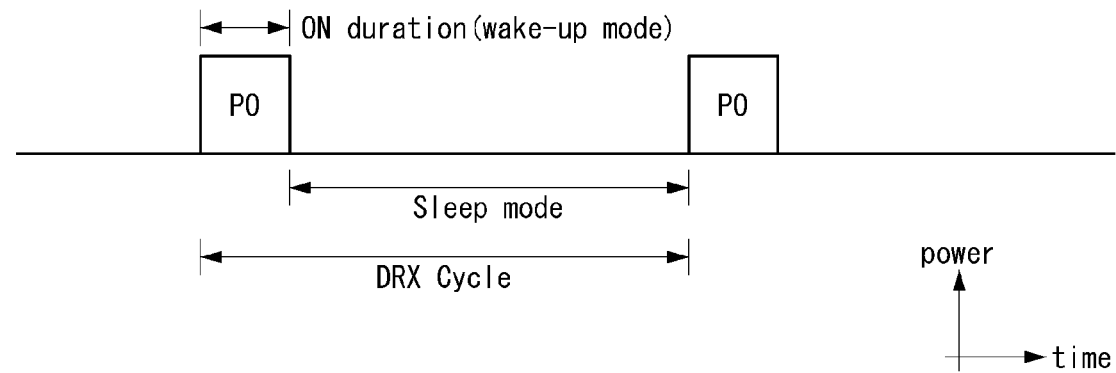

[FIG. 29]
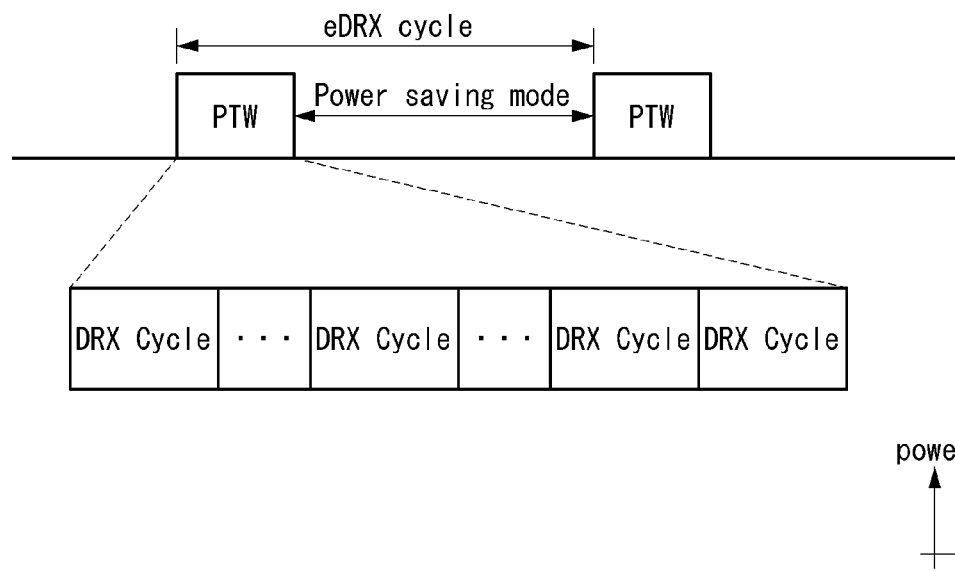
[FIG. 30]
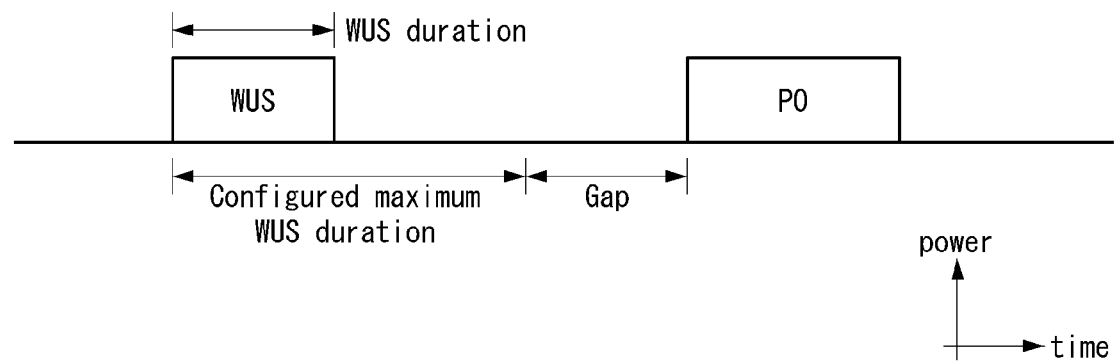

[FIG. 31]
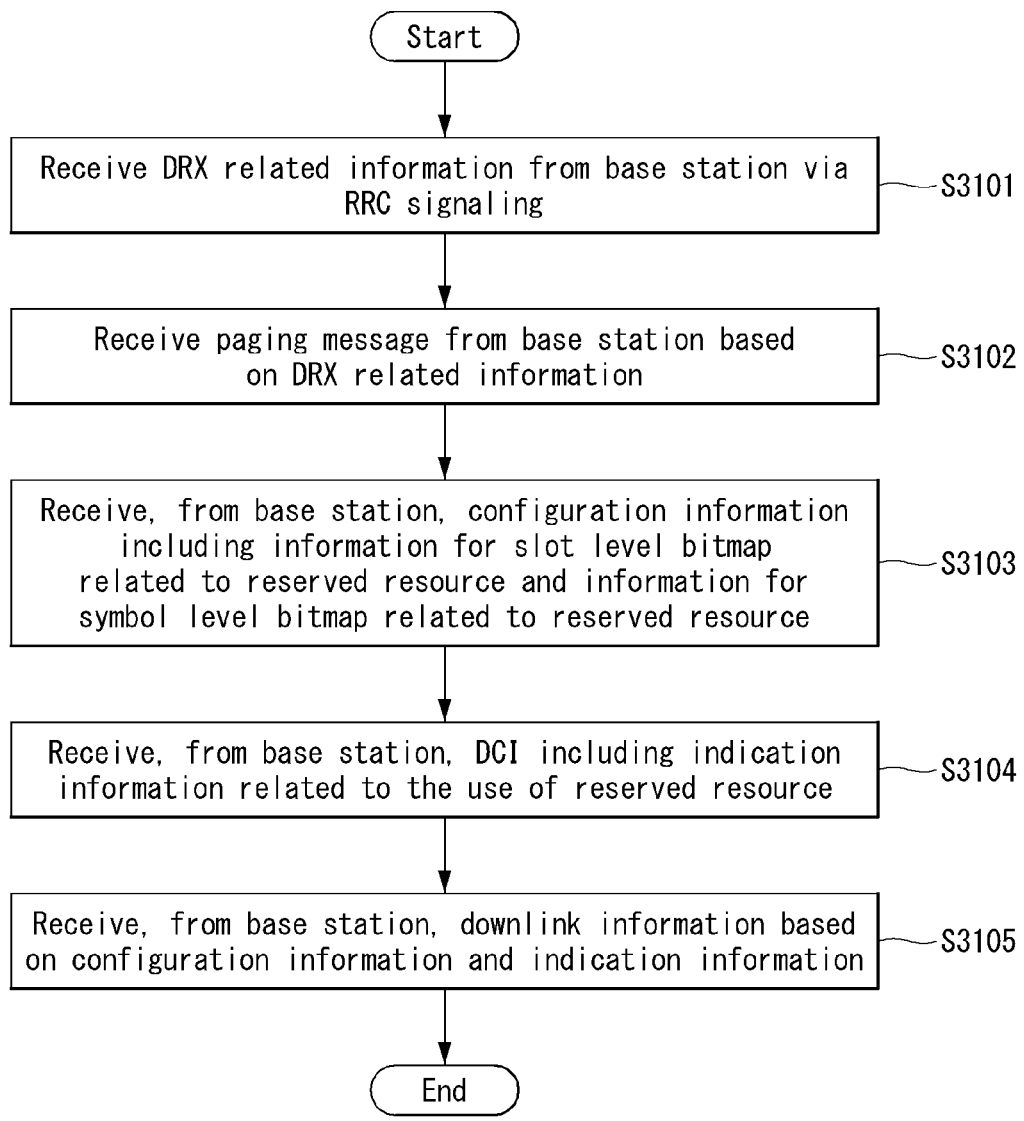

[FIG. 32]
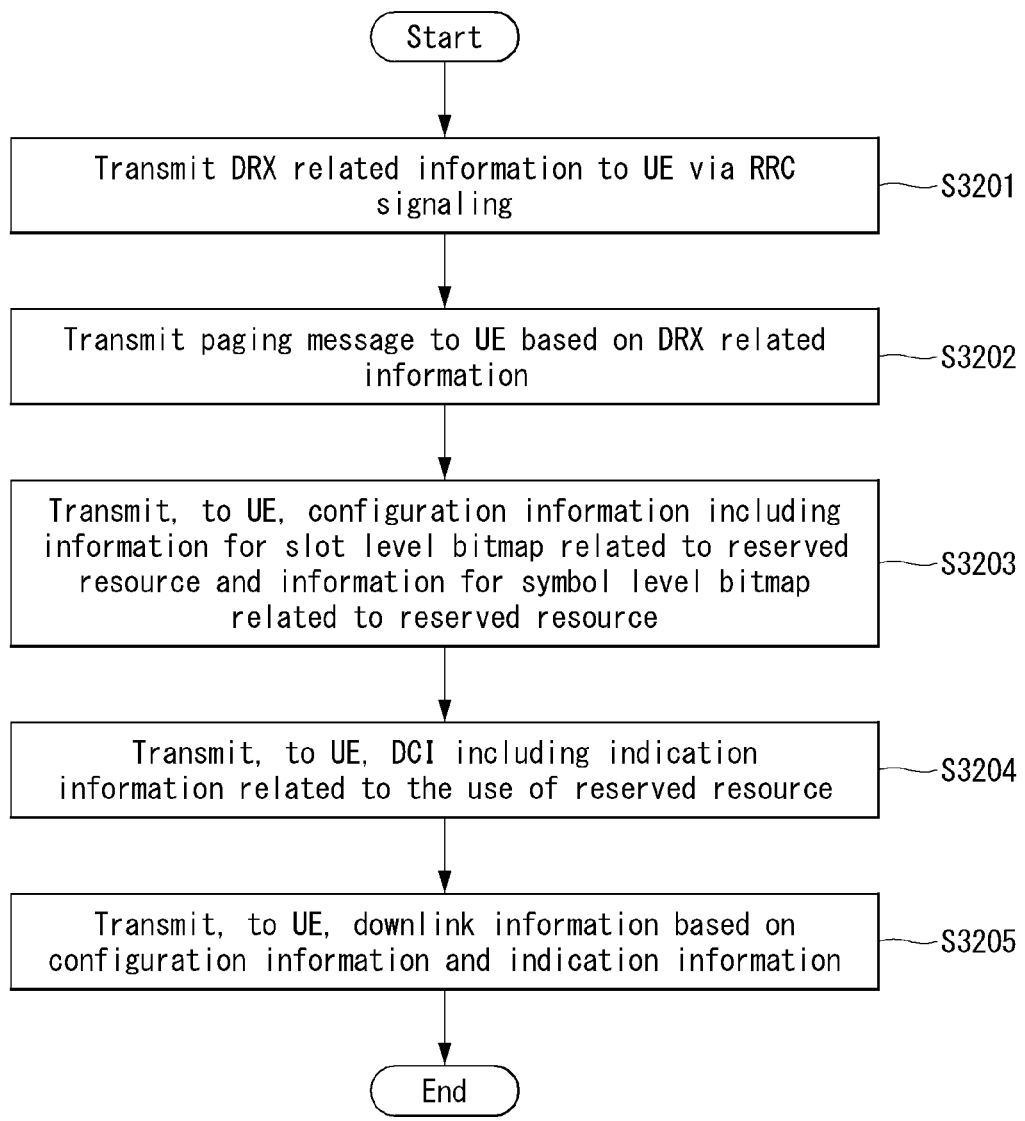

[FIG. 33]
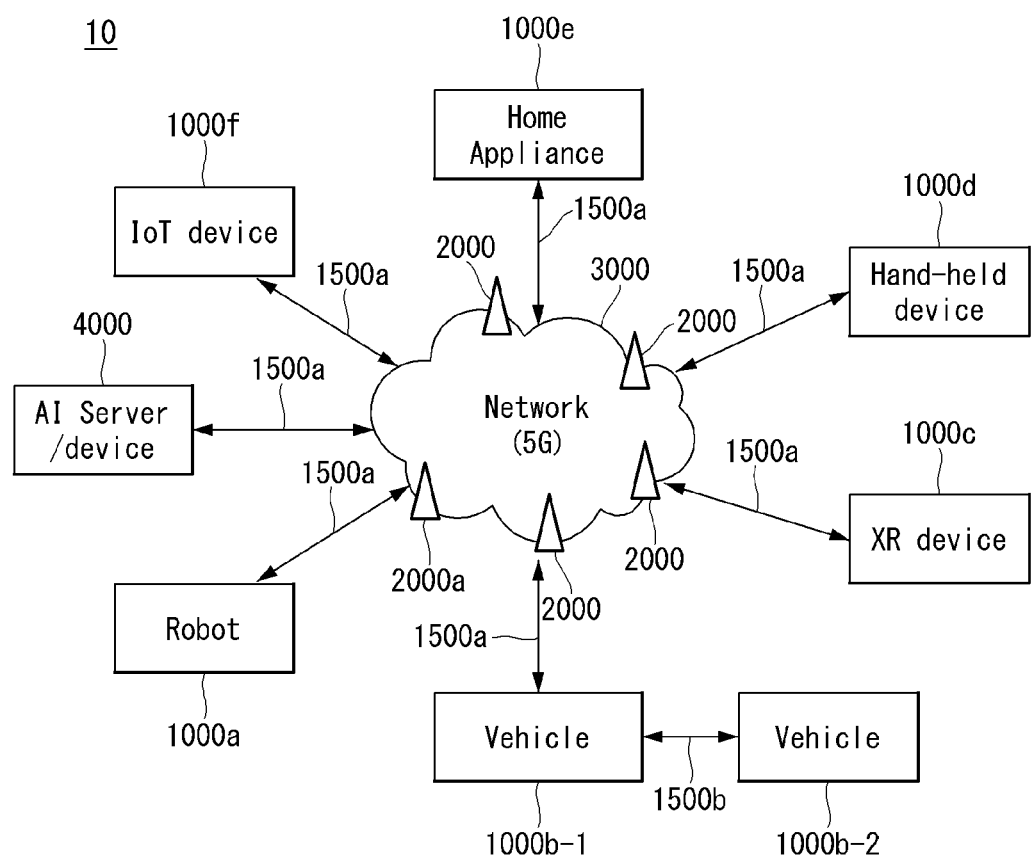

[FIG. 34]
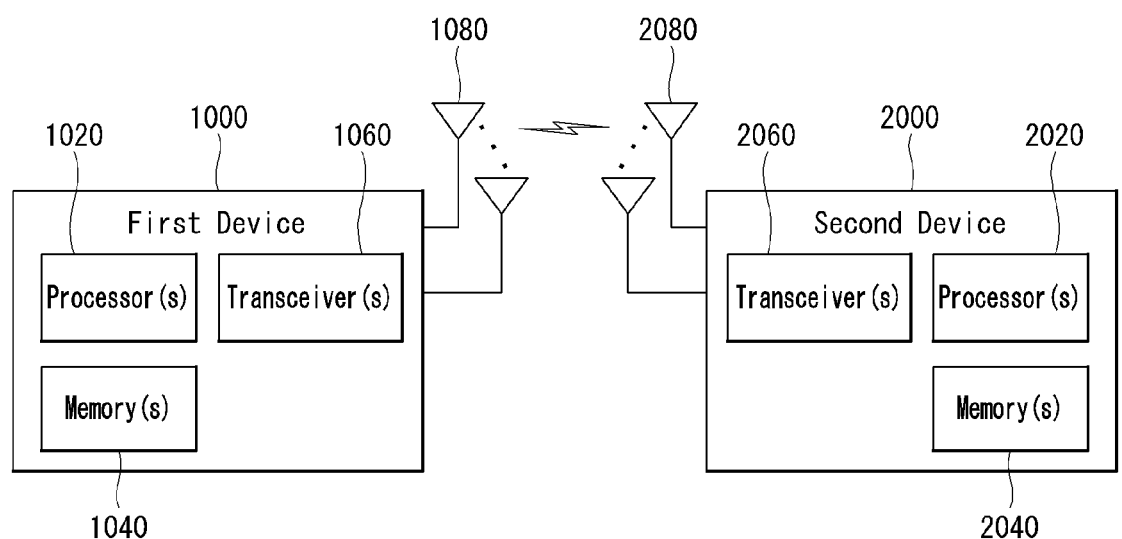
[FIG. 35]
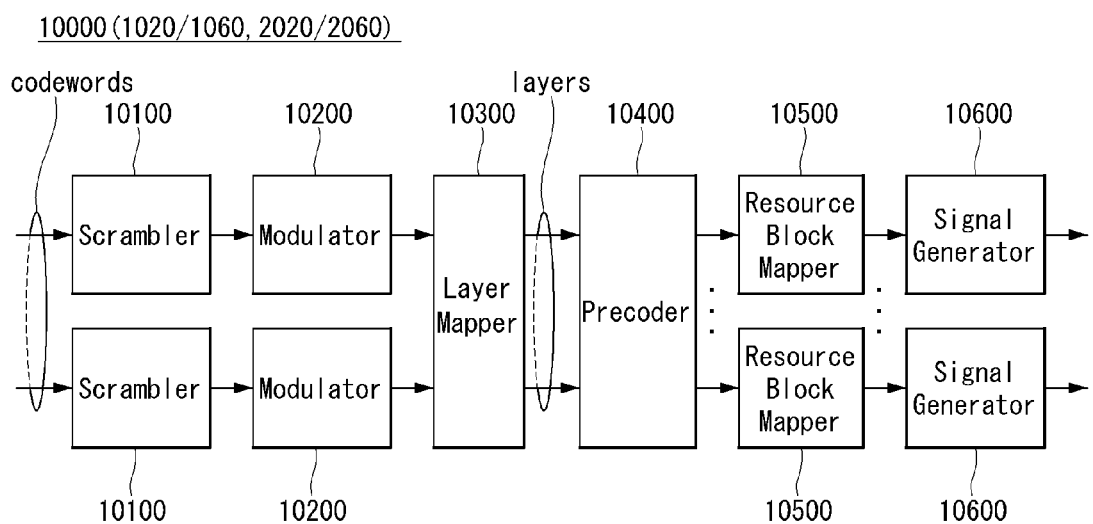

[FIG. 36]
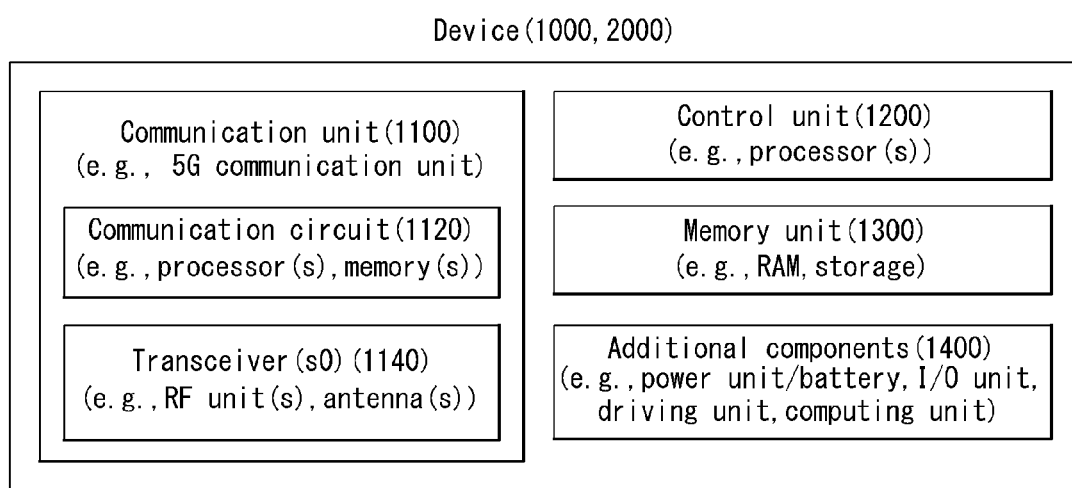

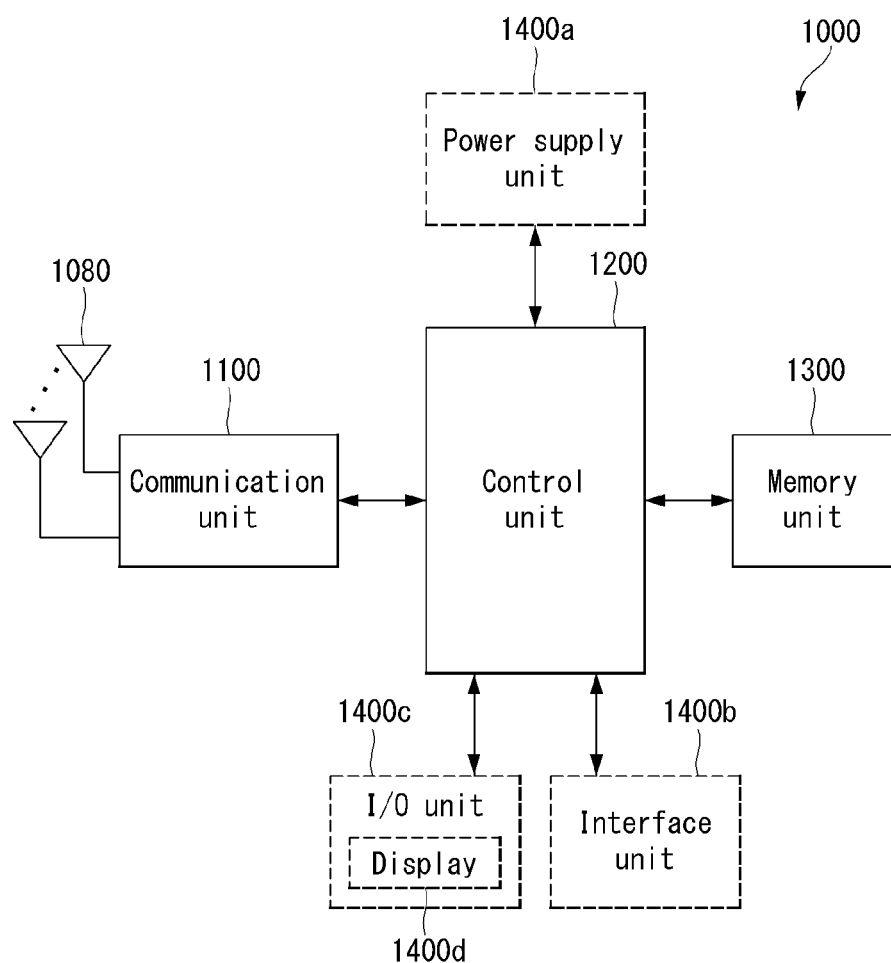
[FIG. 37]

METHOD FOR TRANSMITTING/RECEIVING DOWNLINK INFORMATION IN WIRELESS COMMUNICATION SYSTEM SUPPORTING INTERNET OF THINGS, AND DEVICE THEREFOR

CROSS-REFERENCE TO RELATED APPLICATIONS

This application is the National Stage filing under 35 U.S.C. 371 of International Application No. PCT/KR2020/010911, filed on Aug. 14, 2020, which claims the benefit of Korean Application No. 10-2019-0100614, filed on Aug. 16, 2019, No. 10-2019-0123428, filed on Oct. 4, 2019, and No. 10-2019-0142948, filed on Nov. 8, 2019, the contents of which are all hereby incorporated by reference herein in their entirety.

TECHNICAL FIELD

The present disclosure relates to a wireless communication system supporting Internet of Things (IoT) (e.g., MTC, NB-IoT), and more particularly to a method of transmitting and receiving downlink information and a device therefor.

BACKGROUND ART

In a wireless communication system, mobile communication systems have been developed to provide voice services while ensuring activity and mobility of users. However, coverage of mobile communication systems has been extended to include data services, as well as voice services, resulting in an explosive increase in traffic and shortage of resources. To meet the demands of users expecting relatively high speed services, an advanced mobile communication system is required.

Requirements of a next-generation mobile communication system include accommodation of increased amounts of data traffic, a significant increase in a transfer rate per user terminal, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

The present disclosure provides a method of configuring hierarchically a reserved resource in a wireless communication system supporting Internet of Things (IoT) (e.g., MTC, NB-IoT) and a device therefor.

The present disclosure also provides a method of using a reserved resource based on downlink control information (DCI) and a device therefor.

The present disclosure also provides a method of configuring a reserved resource in units of specific resource (e.g., narrowband, NB-IoT carrier).

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect of the present disclosure, there is provided a method of receiving, by a user equipment (UE), downlink information in a wireless communication system supporting Internet of Things (IoT), the method comprising receiving, from a base station, discontinuous reception (DRX) related information via radio resource control (RRC) signaling, receiving, from the base station, a paging message based on the DRX related information, receiving, from the base station, configuration information including information for a slot level bitmap related to a reserved resource and information for a symbol level bitmap related to the reserved resource, receiving, from the base station, downlink control information (DCI) including indication information related to a use of the reserved resource, and receiving, from the base station, the downlink information based on the configuration information and the indication information.

The downlink information may be received using the reserved resource based on that the indication information includes an indication related to the use of the reserved resource.

The downlink information may be received without the use of the reserved resource based on that the indication information includes an indication related to a reservation of the reserved resource.

The reserved resource may be one or more symbols reserved based on the symbol level bitmap in a slot reserved based on the slot level bitmap.

The slot level bitmap may be set in units of 10 milliseconds (ms) or 40 ms.

The IoT may include machine type communication (MTC) and/or narrowband-IoT (NB-IoT).

Based on that the IoT is the MTC, the configuration information may be configured per narrowband, and based on that the IoT is the NB-IoT, the configuration information may be configured per NB-IoT carrier.

The configuration information may be received via radio resource control (RRC) signaling.

The downlink information may be received via a physical downlink control channel (PDCCH) and/or a physical downlink shared channel (PDSCH).

In another aspect of the present disclosure, there is provided a user equipment (UE) receiving downlink information in a wireless communication system supporting Internet of Things (IoT), the UE comprising one or more transceivers, one or more processors, and one or more memories operatively connected to the one or more processors and storing instructions performing operations, wherein the operations comprise receiving, from a base station, discontinuous reception (DRX) related information via radio resource control (RRC) signaling, receiving, from the base station, a paging message based on the DRX related information, receiving, from the base station, configuration information including information for a slot level bitmap related to a reserved resource and information for a symbol level bitmap related to the reserved resource, receiving, from the base station, downlink control information (DCI) including indication information related to a use of the reserved resource, and receiving, from the base station, the downlink information based on the configuration information and the indication information.

In another aspect of the present disclosure, there is provided a method of transmitting, by a base station, downlink information in a wireless communication system supporting Internet of Things (IoT), the method comprising transmitting, to a user equipment (UE), discontinuous reception (DRX) related information via radio resource control (RRC) signaling, transmitting, to the UE, a paging message based on the DRX related information, transmitting, to the UE, configuration information including information for a slot level bitmap related to a reserved resource and information for a symbol level bitmap related to the reserved resource, transmitting, to the UE, downlink control information (DCI) including indication information related to a use of the reserved resource, and transmitting, to the UE, the downlink information based on the configuration information and the indication information.

The downlink information may be transmitted using the reserved resource based on that the indication information includes an indication related to the use of the reserved resource.

The downlink information may be transmitted without the use of the reserved resource based on that the indication information includes an indication related to a reservation of the reserved resource.

The reserved resource may be one or more symbols reserved based on the symbol level bitmap in a slot reserved based on the slot level bitmap.

The slot level bitmap may be set in units of 10 milliseconds (ms) or 40 ms.

The IoT may include machine type communication (MTC) and/or narrowband-IoT (NB-IoT).

Based on that the IoT is the MTC, the configuration information may be configured per narrowband, and based on that the IoT is the NB-IoT, the configuration information may be configured per NB-IoT carrier.

In another aspect of the present disclosure, there is provided a base station transmitting downlink information in a wireless communication system supporting Internet of Things (IoT), the base station comprising one or more transceivers, one or more processors, and one or more memories operatively connected to the one or more processors and storing instructions performing operations, wherein the operations comprise transmitting, to a user equipment (UE), discontinuous reception (DRX) related information via radio resource control (RRC) signaling, transmitting, to the UE, a paging message based on the DRX related information, transmitting, to the UE, configuration information including information for a slot level bitmap related to a reserved resource and information for a symbol level bitmap related to the reserved resource, transmitting, to the UE, downlink control information (DCI) including indication information related to a use of the reserved resource, and transmitting, to the UE, the downlink information based on the configuration information and the indication information.

In another aspect of the present disclosure, there is provided a device comprising one or more memories, and one or more processors operatively connected to the one or more memories, wherein the one or more processors are configured to allow the device to receive, from a base station, discontinuous reception (DRX) related information via radio resource control (RRC) signaling, receive, from the base station, a paging message based on the DRX related information, receive, from the base station, configuration information including information for a slot level bitmap related to a reserved resource and information for a symbol level bitmap related to the reserved resource, receive, from the base station, downlink control information (DCI) including indication information related to a use of the reserved resource, and receive, from the base station, downlink information based on the configuration information and the indication information.

In another aspect of the present disclosure, there is provided a non-transitory computer readable medium (CRM) storing one or more instructions, wherein the one or more instructions executable by one or more processors allow a user equipment (UE) to receive, from a base station, discontinuous reception (DRX) related information via radio resource control (RRC) signaling, receive, from the base station, a paging message based on the DRX related information, receive, from the base station, configuration information including information for a slot level bitmap related to a reserved resource and information for a symbol level bitmap related to the reserved resource, receive, from the base station, downlink control information (DCI) including indication information related to a use of the reserved resource, and receive, from the base station, downlink information based on the configuration information and the indication information.

Advantageous Effects

The present disclosure has an effect of efficiently signaling a reserved resource by configuring hierarchically the reserved resource in a wireless communication system supporting Internet of Things (IoT) (e.g., MTC, NB-IoT).

The present disclosure also has an effect of dynamically using a reserved resource by using the reserved resource based on DCI.

The present disclosure also has an effect of using a reserved resource considering a situation of a frequency band by configuring a reserved resource in units of specific resource (e.g., narrowband, NB-IoT carrier).

The present disclosure also has an effect of efficiently coexisting with a different wireless communication system (e.g., NR system) at the same frequency band.

The present disclosure also has an effect of implementing a low-latency and high-reliability wireless communication system.

Effects which may be obtained in the disclosure are not limited to the above-described effects, and other technical effects not described above may be evidently understood by a person having ordinary skill in the art to which the disclosure pertains from the following description.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates physical channels and general signal transmission used in a 3GPP system.

FIG. 2 illustrates the structure of a radio frame in a wireless communication system to which the disclosure may be applied.

FIG. 3 illustrates a resource grid for one downlink slot in a wireless communication system to which the disclosure may be applied.

FIG. 4 illustrates the structure of a downlink subframe in a wireless communication system to which the disclosure may be applied.

FIG. 5 illustrates the structure of an uplink subframe in a wireless communication system to which the disclosure may be applied.

FIG. 6 illustrates an example of an overall structure of a NR system to which a method proposed in the disclosure may be applied.

FIG. 7 illustrates a relation between an uplink frame and a downlink frame in a wireless communication system to which a method proposed in the disclosure may be applied.

FIG. 8 illustrates an example of a frame structure in a NR system.

FIG. 9 illustrates an example of a resource grid supported in a wireless communication system to which a method proposed in the disclosure may be applied.

FIG. 10 illustrates examples of a resource grid per antenna port and numerology to which a method proposed in the disclosure may be applied.

FIG. 11 illustrates an example of a self-contained structure to which a method proposed in the disclosure may be applied.

FIG. 12 illustrates MTC.

FIG. 13 illustrates physical channels and general signal transmission used in MTC.

FIG. 14 illustrates cell coverage enhancement in MTC.

FIG. 15 illustrates a signal band for MTC.

FIG. 16 illustrates scheduling in legacy LTE and MTC.

FIG. 17 illustrates physical channels used in NB-IoT and general signal transmission using the physical channels.

FIG. 18 illustrates a frame structure when a subframe spacing is 15 kHz.

FIG. 19 illustrates a frame structure when a subframe spacing is 3.75 kHz.

FIG. 20 illustrates three operation modes of NB-IoT.

FIG. 21 illustrates a layout of an in-band anchor carrier at an LTE bandwidth of 10 MHz.

FIG. 22 illustrates transmission of an NB-IoT downlink physical channel/signal in an FDD LTE system.

FIG. 23 illustrates an NPUSCH format.

FIG. 24 illustrates an operation when multi-carriers are configured in FDD NB-IoT.

FIG. 25 illustrates an initial network access and a subsequent communication process.

FIG. 26 illustrates preamble transmission in NB-IoT RACH.

FIG. 27 illustrates a DRX cycle for discontinuous reception of PDCCH.

FIG. 28 illustrates a DRX cycle for paging.

FIG. 29 illustrates an extended DRX (eDRX) cycle.

FIG. 30 illustrates a timing relationship between WUS and PO.

FIG. 31 is a flowchart for describing an operation method of a UE proposed in the present disclosure.

FIG. 32 is a flowchart for describing an operation method of a BS proposed in the present disclosure.

FIG. 33 illustrates a communication system 10 applied to the present disclosure.

FIG. 34 illustrates a wireless device which may be applied to the present disclosure.

FIG. 35 illustrates a signal processing circuit for a transmit signal.

FIG. 36 illustrates another example of a wireless device applied to the present disclosure.

FIG. 37 illustrates a portable device applied to the present disclosure.

MODE FOR INVENTION

Hereafter, preferred embodiments of the disclosure will be described in detail with reference to the accompanying drawings. A detailed description to be disclosed hereinafter together with the accompanying drawing is to describe embodiments of the disclosure and not to describe a unique embodiment for carrying out the disclosure. The detailed description below includes details in order to provide a complete understanding. However, those skilled in the art know that the disclosure can be carried out without the details.

In some cases, in order to prevent a concept of the disclosure from being ambiguous, known structures and devices may be omitted or may be illustrated in a block diagram format based on core function of each structure and device.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

Embodiments of the present disclosure may be supported by standard documents disclosed in at least one of wireless access systems IEEE 802, 3GPP, and 3GPP2. That is, steps or portions of the embodiments of the present disclosure which are not described in order to clearly illustrate the technical spirit of the present disclosure may be supported by the documents. Further, all terms disclosed in the document may be described by the standard document.

For clarity of description, a 3GPP LTE/LTE-A/NR system is mainly described, but the technical features of the present disclosure are not limited thereto.

Physical Channel and General Signal Transmission

FIG. 1 illustrates physical channels and general signal transmission used in a 3GPP system. In the wireless communication system, the UE receives information from the BS through Downlink (DL) and the UE transmits information from the BS through Uplink (UL). The information which the BS and the UE transmit and receive includes data and various control information and there are various physical channels according to a type/use of the information which the BS and the UE transmit and receive.

When the UE is powered on or newly enters a cell, the UE performs an initial cell search operation such as synchronizing with the BS (S11). To this end, the UE may receive a Primary Synchronization Signal (PSS) and a (Secondary Synchronization Signal (SSS) from the BS and synchronize with the BS and acquire information such as a cell ID or the like. Thereafter, the UE may receive a Physical Broadcast Channel (PBCH) from the BS and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S12).

Meanwhile, when there is no radio resource first accessing the BS or for signal transmission, the UE may perform a Random Access Procedure (RACH) to the BS (S13 to S16). To this end, the UE may transmit a specific sequence to a preamble through a Physical Random Access Channel (PRACH) (S13 and S15) and receive a response message (Random Access Response (RAR) message) for the preamble through the PDCCH and a corresponding PDSCH. In the case of a contention based RACH, a Contention Resolution Procedure may be additionally performed (S16).

The UE that performs the above procedure may then perform PDCCH/PDSCH reception (S17) and Physical Uplink Shared Channel (PUSCH)/Physical Uplink Control Channel (PUCCH) transmission (S18) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the BS through the uplink or the UE receives from the BS may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Overview of LTE System

FIG. 2 illustrates the structure of a radio frame in a wireless communication system to which the disclosure may be applied.

A 3GPP LTE/LTE-A supports radio frame structure type 1 applicable to frequency division duplex (FDD) and radio frame structure type 2 applicable to time division duplex (TDD).

In FIG. 2, the size of the radio frame in the time domain is represented by a multiple of a time unit of $T\_s=1/(15000*2048)$. The downlink and uplink transmissions are configured by a radio frame having an interval of $T\_f=307200*T\_s=10$ ms.

FIG. 2(a) illustrates the structure of radio frame type 1. Radio frame type 1 may be applied to both full duplex and half duplex FDDs.

The radio frame is constituted by 10 subframes. One radio frame is constituted by 20 slots having a length of $T\_slot=15360*T\_s=0.5$ ms and indexes of 0 to 19 are granted to each slot. One subframe is constituted by two consecutive slots in the time domain and subframe i is constituted by slot 2i and slot 2i+1. A time required for transmitting one subframe is referred to as a transmission time interval (TTI). For example, a length of one subframe may be 1 ms and the length of one slot may be 0.5 ms.

In the FDD, the uplink transmission and the downlink transmission are classified in the frequency domain. There is no limit in the full duplex FDD, while in a half duplex FDD operation, the UE may not perform transmission and reception simultaneously.

One slot includes a plurality of orthogonal frequency division multiplexing (OFDM) symbols in the time domain and includes multiple resource blocks (RBs) in the frequency domain. Since the 3GPP LTE uses OFDMA in the downlink, the OFDM symbol is intended to represent one symbol period. The OFDM symbol may be referred to as one SC-FDMA symbol or symbol period. A resource block as a resource allocation unit includes a plurality of consecutive subcarriers in one slot.

The subframe may be defined as one or more slots as below according to a subcarrier spacing (SCS).

In the case of SCS=7.5 kHz or 15 kHz, subframe #i is defined as two 0.5 ms slots #2i and #2i+1 (i=0 to 9).

In the case of SCS=1.25 kHz, subframe #i is defined as one 1 ms slot #2i.

In the case of SCS=15 kHz, subframe #i may be defined as six subslots as shown in Table A1.

Table 1 shows a subslot configuration in the subframe (normal CP).

TABLE 1

| Subslot number | 0 | 1 | 2 | 3 | 4 | 5 |
|---|---|---|---|---|---|---|
| Slot number | | 2i | | | 2i + 1 | |
| Uplink subslot pattern (Symbol number) | 0, 1, 2 | 3, 4 | 5, 6 | 0, 1 | 2, 3 | 4, 5, 6 |
| Downlink subslot pattern 1 (Symbol number) | 0, 1, 2 | 3, 4 | 5, 6 | 0, 1 | 2, 3 | 4, 5, 6 |
| Downlink subslot pattern 2 (Symbol number) | 0, 1 | 2, 3, 4 | 5, 6 | 0, 1 | 2, 3 | 4, 5, 6 |

FIG. 2(b) illustrates frame structure type 2.

Radio frame type 2 is constituted by two half frames each having a length of $153600*T\_s=5$ ms. Each half frame is constituted by 5 subframes having a length of $30720*T\_s=1$ ms.

In frame structure type 2 of the TDD system, an uplink-downlink configuration is a rule indicating whether the uplink and the downlink are assigned (or reserved) for all subframes.

Table 2 shows an uplink-downlink configuration.

TABLE 2

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, for each subframe of the radio frame, 'D' denotes a subframe for the downlink transmission, 'U' denotes a subframe for the uplink transmission, 'S' denotes a special subframe constituted by three fields, i.e., a downlink pilot time slot (DwPTS), a guard period (GP), and an uplink pilot time slot (UpPTS). The DwPTS is used for initial cell search, synchronization, or channel estimation in the UE. The UpPTS is used to match the channel estimation at the base station and uplink transmission synchronization of the UE. The GP is a period for eliminating interference caused in the uplink due to a multi-path delay of a downlink signal between the uplink and the downlink.

Each subframe i is constituted by slot 2i and slot 2i+1 each having a length of T_slot=15360*T_s=0.5 ms.

The uplink-downlink configuration may be divided into 7 types and locations and/or the numbers of downlink subframes, special subframes, and uplink subframes vary for each configuration.

A point when the downlink is changed to the uplink or a point when the uplink is switched to the downlink is referred to as a switching point. Switch-point periodicity means a period in which an aspect in which the uplink subframe and the downlink subframe are switched is similarly repeated and both 5 ms and 10 ms are supported. When the downlink-downlink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and the subframe and a subframe immediately following the subframe are always periods for the uplink transmission.

The uplink-downlink configuration as system information may be known by both the base station and the UE. The base station transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and as broadcast information may be commonly transmitted to all UEs in a cell through a broadcast channel.

Table 3 shows a configuration (the length of DwPTS/GP/UpPTS) of the special subframe.

TABLE 3

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | $(2 + X) \cdot 2192 \cdot T_s$ | $(2 + X) \cdot 2560 \cdot T_s$ | $7680 \cdot T_s$ | $(2 + X) \cdot 2192 \cdot T_s$ | $(2 + X) \cdot 2560 \cdot T_s$ |
| 5 | $6592 \cdot T_s$ | | | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Here, X is configured by a higher layer (e.g., RRC) signal or given as 0.

The structure of the radio frame according to the example of FIG. 2 is merely an example and the number of subcarriers included in the radio frame or the number of slots included in the subframe, and the number of OFDM symbols included in the slot may be variously changed.

FIG. 3 is a diagram illustrating a resource grid for one downlink slot in the wireless communication system to which the disclosure may be applied.

Referring to FIG. 3, one downlink slot includes the plurality of OFDM symbols in the time domain. Herein, it is exemplarily described that one downlink slot includes 7 OFDM symbols and one resource block includes 12 subcarriers in the frequency domain, but the disclosure is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 4 illustrates the structure of a downlink subframe in the wireless communication system to which the disclosure may be applied.

Referring to FIG. 4, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a physical control format indicator channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

An enhanced PDCCH (EPDCCH) carries UE-specific signaling. The EPDCCH is located in a physical resource block (PRB) that is configured to be UE specific. In other words, as described above, the PDCCH may be transmitted in up to first three OFDM symbols in a first slot of a subframe, but the EPDCCH may be transmitted in a resource region other than the PDCCH. A time (i.e., symbol) at which the EPDCCH starts in the subframe may be configured to the UE via higher layer signaling (e.g., RRC signaling).

The EPDCCH may carry a transport format, resource allocation and HARQ information related to DL-SCH, a transport format, resource allocation and HARQ information related to UL-SCH, resource allocation information related to sidelink shared channel (SL-SCH) and physical sidelink control channel (PSCCH), etc. Multiple EPDCCHs may be supported, and the UE may monitor a set of EPCCHs.

The EPDCCH may be transmitted using one or more consecutive enhanced CCEs (ECCEs), and the number of ECCEs per EPDCCH may be determined for each EPDCCH format.

Each ECCE may consist of a plurality of enhanced resource element groups (EREGs). The EREG is used to define mapping of the ECCE to the RE. There are 16 EREGs per PRB pair. All REs except the RE carrying the DMRS in each PRB pair are numbered from 0 to 15 in increasing order of the frequency and then in increasing order of time.

The UE may monitor a plurality of EPDCCHs. For example, one or two EPDCCH sets may be configured in one PRB pair in which the UE monitors EPDCCH transmission.

Different coding rates may be implemented for the EPCCH by combining different numbers of ECCEs. The EPCCH may use localized transmission or distributed transmission, and hence, the mapping of ECCE to the RE in the PRB may vary.

FIG. 5 illustrates the structure of an uplink subframe in the wireless communication system to which the disclosure may be applied.

Referring to FIG. 5, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH frequency-hops in a slot boundary.

Overview of NR System

The following disclosure proposed by the disclosure can be applied to a 5G NR system (or device) as well as a LTE/LTE-A system (or device).

Communication of the 5G NR system is described below with reference to FIGS. 6 to 11.

The 5G NR system defines enhanced mobile broadband (eMBB), massive machine type communications (mMTC), ultra-reliable and low latency communications (URLLC), and vehicle-to-everything (V2X) based on usage scenario (e.g., service type).

A 5G NR standard is divided into standalone (SA) and non-standalone (NSA) depending on co-existence between a NR system and a LTE system.

The 5G NR system supports various subcarrier spacings and supports CP-OFDM in the downlink and CP-OFDM and DFT-s-OFDM (SC-OFDM) in the uplink.

Embodiments of the disclosure can be supported by standard documents disclosed in at least one of IEEE 802, 3GPP, and 3GPP2 which are the wireless access systems. That is, steps or parts in embodiments of the disclosure which are not described to clearly show the technical spirit of the disclosure can be supported by the standard documents. Further, all terms disclosed in the disclosure can be described by the standard document.

As smartphones and Internet of Things (IoT) terminals spread rapidly, an amount of information exchanged through a communication network is increasing. Hence, it is necessary to consider an environment (e.g., enhanced mobile broadband communication) that provides faster services to more users than the existing communication system (or existing radio access technology) in the next generation wireless access technology.

To this end, a design of a communication system considering machine type communication (MTC) that provides services by connecting multiple devices and objects is being discussed. In addition, a design of a communication system (e.g., ultra-reliable and low latency communication (URLLC) considering a service and/or a terminal sensitive to reliability and/or latency of communication is also being discussed.

Hereinafter, in the disclosure, for convenience of description, the next generation radio access technology is referred to as NR (new RAT, radio access technology), and a wireless communication system to which the NR is applied is referred to as an NR system.

Definition of NR System Related Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

FIG. 6 illustrates an example of an overall structure of a NR system to which a method proposed in the disclosure may be applied.

Referring to FIG. 6, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher there than, a bandwidth larger than 24.25 GHz is supported in order to overcome phase noise.

An NR frequency band is defined as frequency ranges of two types (FR1 and FR2). FR1 and FR2 may be configured as shown in Table 4 below. Further, FR2 may mean a millimeter wave (mmW).

TABLE 4

| Frequency Range Designation | Corresponding Frequency Range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

New Rat (NR) Numerology and Frame Structure

The NR system may support multiple numerologies. Here, the numerology may be defined by a subcarrier spacing and cyclic prefix (CP) overhead. In this case, multiple subcarrier spacings may be derived by scaling a basic subcarrier spacing with an integer N (or μ). Further, even if it is assumed that a very low subcarrier spacing is not used at a very high carrier frequency, the used numerology may be selected independently of a frequency band.

In addition, in the NR systems, various frame structures depending on multiple numerologies may be supported.

Hereinafter, Orthogonal Frequency Division Multiplexing (OFDM) numerology and the frame structure which may be considered in the NR system will be described.

Multiple OFDM numerologies supported in the NR systems may be defined as shown in Table 5.

TABLE 5

| μ | $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In respect to the frame structure in the NR system, sizes of various fields are expressed as a multiple of a time unit of $T_s = 1/(\Delta f_{max} \cdot N_f)$. Here, $\Delta f_{max} = 480 \cdot 10$ and $N_f = 4096$ Downlink and uplink transmission is configured by a radio frame having a section of $T_f = (\Delta f_{max} N_f/100) \cdot T_s = 10$ ms Here, the radio frame is constituted by 10 subframes each having a section of $T_{sf} = (\Delta f_{max} N_f/1000) \cdot T_s = 1$ ms In this case, one set of frames for uplink and one set frames for downlink may exist.

FIG. 7 illustrates a relationship between an uplink frame and a downlink frame in a wireless communication system to which a method proposed in the present disclosure may be applied.

As illustrated in FIG. 7, transmission of uplink frame number i from the UE should start before the start of the corresponding downlink frame in the corresponding UE by $T_{TA} = N_{TA} T_s$.

For numerology μ, slots are numbered in an increasing number of $n_s^\mu \in \{0, \ldots, N_{subframe}^{slots,\mu} - 1\}$ in the subframe and numbered in an increasing order of $n_{s,f}^\mu \in \{0, \ldots, N_{frame}^{slots,\mu} - 1\}$ in the radio frame. One slot is constituted by consecutive OFDM symbols of $N_{symb}^\mu$ and $N_{symb}^\mu$ is determined according to used numerology and slot configuration. The start of slot n, in the subframe is temporally aligned with the start of THE OFDM symbols $n_s^\mu N_{symb}^\mu$ in the same subframe.

All UEs may not simultaneously perform transmission and reception and this means that all OFDM symbols of a downlink slot or an uplink slot may not be used.

Table 6 shows the number of OFDM symbols for slot ($N_{symb}^{slot}$), the number of slots for each radio frame ($N_{slot}^{frame,\mu}$), and the number of slots for each subframe ($N_{slot}^{subframe,\mu}$) in the normal CP and Table 7 shows the number of OFDM symbols for each slot, the number of slots for each radio frame, and the number of slots for each subframe in the extended CP.

TABLE 6

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 7

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 8 illustrates an example of a frame structure in an NR system. FIG. 8 is just for convenience of the description and does not limit the scope of the present disclosure.

In the case of Table 7, as an example of a case where P=2, that is, a case where the subcarrier spacing is 60 kHz, referring to Table 7, one subframe may include four slots, and one subframe={1, 2, 4} slots illustrated in FIG. 8 is an example and the number of slots which may included in one subframe may be defined as in Table 7.

Further, a mini-slot may be constituted by 2, 4, or 7 symbols and constituted by more or less symbols.

With respect to the physical resource in the NR system, an antenna port, a resource grid, a resource element, a resource block, a carrier part, and the like may be considered.

Hereinafter, the physical resources which may be considered in the NR system will be described in detail.

First, with respect to the antenna port, the antenna port is defined so that a channel in which the symbol on the antenna port is transported may be inferred from a channel in which different symbols on the same antenna port are transported. When a large-scale property of a channel in which a symbol on one antenna port is transported may be interred from a channel in which symbols on different antenna ports are transported, two antenna ports may have a quasi co-located or quasi co-location (QC/QCL) relationship. Here, the large-scale property includes at least one of a delay spread, a Doppler spread, a frequency shift, average received power, and a received timing.

FIG. 9 illustrates an example of a resource grid supported by a wireless communication system to which a method proposed in the present disclosure may be applied.

Referring to FIG. 9, it is exemplarily described that the resource grid is constituted by $N_{RB}^\mu N_{sc}^{RB}$ subcarriers on the frequency domain and one subframe is constituted by 14·2μ OFDM symbols, but the present disclosure is not limited thereto.

In the NR system, a transmitted signal is described by one or more resource grids constituted by $N_{RB}^\mu N_{sc}^{RB}$ subcarriers and $2^\mu N_{symb}^{(\mu)}$ OFDM symbols. Here, $N_{RB}^\mu \leq N_{RB}^{max,\mu}$. The $N_{RB}^{max,\mu}$ represents a maximum transmission bandwidth and this may also vary between uplink and downlink in addition to numerology.

In this case, as illustrated in FIG. 10, one resource grid may be configured for each numerology μ and antenna port p.

FIG. 10 illustrates examples of a resource grid for each antenna port and numerology to which a method proposed in the present disclosure may be applied.

Each element for resource grids for numerology μ and antenna port p is referred to as the resource element and is uniquely identified by index pair (k,l). Here, k=0, . . . , $N_{RB}^\mu N_{sc}^{RB}-1$ represents the index on the frequency domain and l=0, . . . , $2^\mu N_{symb}^{(\mu)}-1$ refers to the position of the symbol in the subframe. When the resource element is referred in the slot, index pair (k,l) is used. Here, l=0, . . . , $N_{symb}^\mu-1$.

Resource element (k,l) for numerology μ and antenna p corresponds to complex value $a_{k,l}^{(p,\mu)}$. When there is no confusion or when a specific antenna port or numerology is not specified, indexes p and μ may be dropped. As a result, the complex value may be $a_{k,l}^{(p)}$ or $a_{k,l}$.

Further the physical resource block is defined by $N_{sc}^{RB}=12$ consecutive subcarriers on the frequency domain.

Point A may serve as a common reference point of a resource block grid and may be acquired as follows.

OffsetToPointA for PCell downlink indicates the frequency offset between the lowest subcarrier of the lowest resource block superposed with the SS/PBCH block used by the UE for initial cell selection and point A, and is expressed by resource block units assuming a 15 kHz subcarrier spacing for FR1 and a 60 kHz subcarrier spacing for FR2; and absoluteFrequencyPointA indicates the frequency-position of point A expressed as in an absolute radio-frequency channel number (ARFCN).

Common resource blocks are numbered upwards from 0 in the frequency domain for subcarrier spacing configuration μ.

A center of subcarrier 0 of common resource block 0 for subcarrier spacing μ coincides with 'point A'. A resource element (k,l) for common resource block number $n_{CRB}^\mu$ and subcarrier spacing configuration μ may be given as in Equation 1 below.

$$n_{CRB}^\mu = \left\lfloor \frac{k}{N_{sc}^{RB}} \right\rfloor \quad \text{[Equation 1]}$$

Here, k may be relatively defined to point A so that k=0 corresponds to a subcarrier centered on point A. Physical resource blocks are numbered from 0 to $N_{BWP,i}^{size}-1$ in a bandwidth part (BWP) and i represents the number of the BWP. A relationship between physical resource block $n_{PRB}$ and common resource block $n_{CRB}$ may be given by Equation 2 below.

$$n_{CRB}=n_{PRB}+N_{BWP,i}^{start} \quad \text{[Equation 2]}$$

Here, $N_{BWP,i}^{start}$ may represent a common resource block in which the BWP starts relatively to common resource block 0.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

FIG. 11 illustrates one example of a self-contained structure to which a method proposed in the present disclosure may be applied. FIG. 11 is just for convenience of the description and does not limit the scope of the present disclosure.

Referring to FIG. 11, it is assumed that one transmission unit (e.g., slot or subframe) is constituted by 14 orthogonal frequency division multiplexing (OFDM) symbols as in legacy LTE.

In FIG. 11, a region 1102 refers to a downlink control region and a region 1104 refers to an uplink control region. Further, regions (that is, regions without a separate indication) other than the regions 1102 and 1104 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 11 is used, in one self-contained slot, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data transfer may be minimized.

In the self-contained slot structure illustrated in FIG. 11, a time gap for a process of switching from a transmission mode to a reception mode of a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Downlink Channel Structure

The BS transmits an associated signal to the UE through a downlink channel to be described below and the UE receives the associated signal from the BS through the downlink channel to be described below.

Physical Downlink Shared Channel (PDSCH)

The PDSCH transports downlink data (e.g., DL-shared channel transport block (DL-SCH TB)), and adopts modulation methods such as Quadrature Phase Shift Keying (QPSK), 16 Quadrature Amplitude Modulation (QAM), 64 QAM, and 256 QAM. A codeword is generated by encoding a TB. The PDSCH may transport a maximum of 2 codewords. Scrambling and modulation mapping are performed for each codeword and modulation symbols generated from each codeword are mapped to one or more layers (layer mapping). Each layer is mapped to a resource together with a demodulation reference signal (DMRS), generated as an OFDM symbol signal, and transmitted through a corresponding antenna port.

Physical Downlink Control Channel (PDCCH)

The PDCCH transports downlink control information (DCI) and a QPSK modulation method is applied. One PDCCH is constituted by 1, 2, 4, 8, and 16 Control Channel Elements (CCEs) according to an Aggregation Level (AL). One CCE is constituted by 6 Resource Element Groups (REGs). One REG is defined by one OFDM symbol and one (P)RB. The PDCCH is transmitted through a control resource set (CORESET). The CORESET is defined as a REG set with given numerology (e.g., SCS, CP length, etc.). A plurality of CORESETs for one UE may be overlapped in the time/frequency domain. The CORESET may be configured through system information (e.g., MIB) or UE-specific higher layer (e.g., Radio Resource Control or RRC layer) signaling. Specifically, the number of RBs and the number of symbols (maximum 3) constituting the CORESET may be configured by the higher layer signaling.

The UE performs decoding (so-called, blind decoding) for a set of PDCCH candidates to obtain the DCI transmitted through the PDCCH. The set of PDCCH candidates decoded by the UE is defined as a PDCCH search space set. The search space set may be a common search space or a UE-specific search space. The UE may obtain the DCI by monitoring PDCCH candidates in one or more search space sets configured by the MIB or higher layer signaling. Each CORESET configuration is associated with one or more search space sets and each search space set is associated with one CORESET configuration. One search space set is determined based on the following parameters.

controlResourceSetId: represents a control resource set associated with the search space set monitoringSlotPeriodicityAndOffset: represents a PDCCH monitoring period section (slot unit) and an PDCCH monitoring section offset (slot unit)

monitoringSymbolsWithinSlot: represents a PDCCH monitoring pattern in the slot for PDCCH monitoring (e.g., represents a first symbol(s) of a control resource set)

nrofCandidates: represents the number of PDCCH candidates (one value of 0, 1, 2, 3, 4, 5, 6, and 8) for each AL={1, 2, 4, 8, 16}

Table 8 shows a feature for each search space type.

TABLE 8

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI or a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 9 shows DCI formats transmitted through the PDCCH.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

TABLE 9-continued

| DCI format | Usage |
|---|---|
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule TB-based (or TB-level) PUSCH, DCI format 01 may be used to schedule TB-based (or TB-level) PUSCH or Code Block Group (CBG)-based (or CBG-level) PUSCH. DCI format 1_0 may be used to schedule TB-based (or TB-level) PDSCH, DCI format 1_1 may be used to schedule TB-based (or TB-level) PDSCH or Code Block Group (CBG)-based (or CBG-level) PDSCH. DCI format 2_0 is used for transferring dynamic slot format information (e.g., dynamic SFI) to the UE and DCI format 2_1 is used for transferring downlink pre-emption information to the UE. DCI format 2_0 and/or DCI format 2_1 may be transferred to UEs in the corresponding group through group common PDCCH which is PDCCH transferred to UEs defined as one group.

Uplink Channel Structure

The UE transmits an associated signal to the BS through an uplink channel to be described below and the BS receives the associated signal from the UE through the uplink channel to be described below.

Physical Uplink Shared Channel (PUSCH)

The PUSCH transports uplink data (e.g., UL-shared channel transport block (UL-SCH TB) and/or uplink control information (UCI) and is transmitted based on a Cyclic Prefix-Orthogonal Frequency Division Multiplexing (CP-OFDM) waveform or a Discrete Fourier Transform—spread—Orthogonal Frequency Division Multiplexing (DFT-s-OFDM) waveform. When the PUSCH is transmitted based on the DFT-s-OFDM waveform, the UE transmits the PUSCH by applying transform precoding. As an example, when the transform precoding is disable (e.g., transform precoding is disabled), the UE transmits the PUSCH based on the CP-OFDM waveform, and when the transform precoding is enabled (e.g., transform precoding is enabled), the UE may transmit the PUSCH based on the CP-OFDM waveform or the DFT-s-OFDM waveform. PUSCH transmission is dynamically scheduled by the UL grant in the DCI or semi-statically scheduled based on higher layer (e.g., RRC) signaling (and/or Layer 1 (L1) signaling (e.g., PDCCH)) (configured grant). The PUSCH transmission may be performed based on a codebook or a non-codebook.

Physical Uplink Control Channel (PUCCH)

The PUCCH transports uplink control information, HARQ-ACK, and/or scheduling request (SR), and is divided into Short PUCCH and Long PUCCH according to a PUCCH transmission length. Table 10 shows PUCCH formats.

TABLE 10

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 transports the UCI with a maximum size of 2 bits and is mapped and transmitted based on a sequence. Specifically, the UE transmits specific UCI to the BS by transmitting one of a plurality of sequences through the PUCCH which is PUCCH format 0. The UE transmits the PUCCH which is PUCCH format 0 within a PUCCH resource for corresponding SR configuration only when transmitting a positive SR.

PUCCH format 1 transports the UCI having the maximum size of 2 bits and the modulation signal is spread by an orthogonal cover code (OCC) (configured differently depending on whether or not frequency hopping) in the time domain. The DMRS is transmitted in a symbol in which the modulation symbol is not transmitted (that is, time division multiplexed (TDMed) and transmitted).

PUCCH format 2 transports UCI having a bit size larger than 2 bits and the modulation symbol is frequency division multiplexed (FDMed) with the DMRS and transmitted. The DMRS is located in symbol indexes #1, #4, #7, and #10 within a resource block given with a density of ⅓. A pseudo noise (PN) sequence is used for a DMRS sequence. The frequency hopping may be activated for 2 symbol PUCCH format 2.

PUCCH format 3 does not support multiplexing of UEs in the same physical resource block, and transports UCI with a bit size larger than 2 bits. In other words the PUCCH resource of PUCCH format 3 includes the orthogonal cover code. The modulation symbol is subjected to time division multiplexing (TDM) with the DMRS and transmitted.

PUCCH format 4 supports multiplexing of up to 4 terminals in the same physical resource block, and transports UCI with a bit size larger than 2 bits. In other words the PUCCH resource of PUCCH format 3 includes an orthogonal cover code. The modulation symbol is subjected to time division multiplexing (TDM) with the DMRS and transmitted.

Machine Type Communication (MTC)

MTC as a type of data communication including one or more machines and may be applied to Machine-to-Machine (M2M) or Internet-of-Things (IoT). Here, the machine is an entity that does not require direct human manipulation or intervention. For example, the machine includes a smart meter with a mobile communication module, a vending machine, a portable terminal having an MTC function, etc.

In 3GPP, the MTC may be applied from release 10 and may be implemented to satisfy criteria of low cost and low complexity, enhanced coverage, and low power consumption. For example, a feature for a low-cost MTC device is added to 3GPP Release 12 and to this end, UE category 0 is defined. UE category is an index indicating how many data the UE may process in a communication modem. The UE of UE category 0 uses a half-duplex operation having a reduced peak data rate and relieved radio frequency (RF) requirements, and a single receiving antenna to reduce baseband/

RF complexity. In 3GPP Release 12, enhanced MTC (eMTC) is introduced and the MTC terminal is configured to operate only at 1.08 MHz (i.e., 6 RBs) which is a minimum frequency bandwidth supported in legacy LTE to further reduce a price and power consumption of the MTC UE.

In the following description, the MTC may be mixedly used with terms such as eMTC, LTE-M1/M2, Bandwidth reduced low complexity/coverage enhanced (BL/CE), non-BL UE (in enhanced coverage), NR MTC, enhanced BL/CE, etc., or other equivalent terms. Further, the MT CUE/device encompasses a UE/device (e.g., the smart meter, the vending machine, or the portable terminal with the MTC function) having the MTC function.

FIG. 12 illustrates MTC.

Referring to FIG. 12, the MTC device 100 as a wireless device providing the MTC may be fixed or mobile. For example, the MTC device 100 includes the smart meter with the mobile communication module, the vending machine, the portable terminal having the MTC function, etc. The BS 200 may be connected to the MTC device 100 by using radio access technology and connected to the MTC server 700 through a wired network. The MTC server 700 is connected to the MTC devices 100 and provides an MTC service to the MTC devices 100. The service provided through the MTC has discrimination from a service in communication in which human intervenes in the related art and various categories of services including tracking, metering, payment, a medical field service, remote control, and the like may be provided. For example, services including electric meter reading, water level measurement, utilization of a monitoring camera, reporting of an inventory of the vending machine, and the like may be provided through the MTC. The MTC has a characteristic in that a transmission data amount is small and uplink/downlink data transmission/reception occurs occasionally. Accordingly, it is efficient to lower a unit price of the MTC device and reduce battery consumption according to a low data rate. The MTC device generally has low mobility, and as a result, the MTC has a characteristic in that a channel environment is hardly changed.

FIG. 13 illustrates physical channels used in MTC and general signal transmission using the same. In a wireless communication system, the MTC UE receives information from the BS through Downlink (DL) and the UE transmits information to the BS through Uplink (UL). The information which the BS and the UE transmit and receive includes data and various control information and there are various physical channels according to a type/use of the information which the BS and the UE transmit and receive.

A UE that is powered on again while being powered off or enters a new cell performs an initial cell search operation such as synchronizing with the BS (S1001). To this end, the UE receives a Primary Synchronization Signal (PSS) and a Secondary Synchronization Signal (SSS) from the BS to synchronize with the BS and obtain information such as a cell identifier (ID), etc. The PSS/SSS used for the initial cell search operation of the UE may be a PSS/SSS of the legacy LTE. Thereafter, the MTC UE may receive a Physical Broadcast Channel (PBCH) from the BS and obtain in-cell broadcast information (S1002). Meanwhile, the UE receives a Downlink Reference Signal (DL RS) in an initial cell search step to check a downlink channel state.

Upon completion of the initial cell search, the UE receives MTC PDCCH (MPDCCH) and PDSCH corresponding thereto to obtain more specific system information (S1102).

Thereafter, the UE may perform a random access procedure in order to complete an access to the BS (S1003 to S1006). Specifically, the UE may transmit a preamble through a Physical Random Access Channel (PRACH) (S1003) and receive a Random Access Response (RAR) for the preamble through the PDCCH and the PDSCH corresponding thereto (S1004). Thereafter, the UE may transmit a Physical Uplink Shared Channel (PUSCH) by using scheduling information in the RAR (S1005) and perform a Contention Resolution Procedure such as the PDCCH and the PDSCH corresponding thereto (S1006).

The UE that performs the aforementioned procedure may then perform reception of an MPDCCH signal and/or a PDSCH signal (S1107) and transmission of a physical uplink shared channel (PUSCH) signal and/or a physical uplink control channel (PUCCH) signal (S5080) as a general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indication (CQI), a Precoding Matrix Indicator (PMI), Rank Indicator (RI), etc.

FIG. 14 illustrates cell coverage enhancement in MTC.

Various cell coverage extension techniques are being discussed in order to extend coverage extension or coverage enhancement (CE) of the BS for the MTC device 100. For example, for the extension of the cell coverage, the BS/UE may transmit one physical channel/signal over multiple occasions (a bundle of physical channels). Within a bundle section, the physical channel/signal may be repeatedly transmitted according to a pre-defined rule. A receiving apparatus may increase a decoding success rate of the physical channel/signal by decoding a part or the entirety of the physical channel/signal bundle. Here, the occasion may mean a resource (e.g., time/frequency) in which the physical channel/signal may be transmitted/received. The occasion for the physical channel/signal may include a subframe, a slot, or a symbol set in a time domain. Here, the symbol set may be constituted by one or more consecutive OFDM-based symbols. The OFDM-based symbols may include an OFDM(A) symbol and a DFT-s-OFDM(A) (=SC-FDM(A)) symbol. The occasion for the physical channel/signal may include a frequency band and an RB set in a frequency domain. For example, PBCH, PRACH, MPDCCH, PDSCH, PUCCH, and PUSCH may be repeatedly transmitted.

FIG. 15 illustrates a signal band for MTC.

Referring to FIG. 15, as a method for lowering the unit price of the MT CUE, the MTC may operate only in a specific band (or channel band) (hereinafter, referred to as an MTC subband or narrowband (NB)) regardless of a system bandwidth of a cell. For example, an uplink/downlink operation of the MT CUE may be performed only in a frequency band of 1.08 MHz. 1.08 MHz corresponds to 6 consecutive physical resource blocks (PRBs) in the LTE system is defined to follow the same cell search and random access procedures as the LTE UE. FIG. 15(a) illustrates a case where an MTC subband is configured at a center (e.g., 6 PRBs) of the cell and FIG. 15(b) illustrates a case where a plurality of MTC subbands is configured in the cell. The plurality of MTC subbands may be consecutively/inconsecutively configured in the frequency domain. The physical channels/signals for the MTC may be transmitted/received in one MTC subband. In the NR system, the MTC subband may be defined by considering a frequency range and a subcarrier spacing (SCS). As an example, in the NR system, a size of the MTC subband may be defined as X consecutive PRBs (i.e., a bandwidth of $0.18*X*(2^u)$ MHz) (see Table A4 for u). Here, X may be defined as 20 according to the size of a Synchronization Signal/Physical Broadcast Channel (SS/PBCH). In the NR system, the MTC may operate in at least one bandwidth part (BWP). In this case, the plurality of MTC subbands may be configured in the BWP.

FIG. 16 illustrates scheduling in legacy LTE and MTC.

Referring to FIG. 16, in the legacy LTE, the PDSCH is scheduled by using the PDCCH. Specifically, the PDCCH may be transmitted in first N OFDM symbols in the subframe (N=1 to 3) and the PDSCH scheduled by the PDCCH is transmitted in the same subframe. Meanwhile, in the MTC, the PDSCH is scheduled by using the MPDCCH. As a result, the MT CUE may monitor an MPDCCH candidate in a search space in the subframe. Here, monitoring includes blind-decoding the MPDCCH candidates. The MPDCCH transmits the DCI and the DCI includes uplink or downlink scheduling information. The MPDCCH is FDM-multiplexed with the PDSCH in the subframe. The MPDCCH is repeatedly transmitted in a maximum of 256 subframes and the DCI transmitted by the MPDCCH includes information on the number of MPDCCH repetitions. In the case of downlink scheduling, when repeated transmission of the MPDCCH ends in subframe #N, the PDSCH scheduled by the MPDCCH starts to be transmitted in subframe #N+2. The PDSCH may be repeatedly transmitted in a maximum of 2048 subframes. The MPDCCH and the PDSCH may be transmitted in different MTC subbands. As a result, the MT CUE may perform radio frequency (RF) retuning for receiving the PDSCH after receiving the MPDCCH. In the case of uplink scheduling, when repeated transmission of the MPDCCH ends in subframe #N, the PUSCH scheduled by the MPDCCH starts to be transmitted in subframe #N+4. When the repeated transmission is applied to the physical channel, frequency hopping is supported between different MTC subbands by the RF retuning. For example, when the PDSCH is repeatedly transmitted in 32 subframes, the PDSCH may be transmitted in a first MTC subband in first 16 subframes and the PDSCH may be transmitted in a second MTC subband in 16 remaining subframes. The MTC operates in a half duplex mode. HARQ retransmission of the MTC is an adaptive asynchronous scheme.

Narrowband Internet of Things (NB-IoT)

NB-IoT represents a narrow-band Internet of Things technology that supports a low-power wide area network through a legacy wireless communication system (e.g., LTE, NR). In addition, the NB-IoT may refer to a system for supporting low complexity and low power consumption through a narrowband. The NB-IoT system uses OFDM parameters such as subcarrier spacing (SCS) in the same manner as the legacy system, so that there is no need to separately allocate an additional band for the NB-IoT system. For example, one PRB of the legacy system band may be allocated for the NB-IoT. Since the NB-IoT UE recognizes a single PRB as each carrier, the PRB and the carrier may be interpreted as the same meaning in the description of the NB-IoT.

Hereinafter, the description of the NB-IoT mainly focuses on a case where the description of the NB-IoT is applied to the legacy LTE system, but the description below may be extensively applied even to a next generation system (e.g., NR system, etc.). Further, in the present disclosure, contents related to the NB-IoT may be extensively applied to MTC which aims for similar technical purposes (e.g., low-power, low-cost, coverage enhancement, etc.). Further, the NB-IoT may be replaced with other equivalent terms such as NB-LTE, NB-IoT enhancement, enhanced NB-IoT, further enhanced NB-IoT, NB-NR, and the like.

FIG. 17 illustrates physical channels used in NB-IoT and general signal transmission using the same. In the wireless communication system, the UE receives information from the BS through Downlink (DL) and the UE transmits information from the BS through Uplink (UL). The information which the BS and the UE transmit and receive includes data and various control information and there are various physical channels according to a type/use of the information which the BS and the UE transmit and receive.

A UE that is powered on again while being powered off or enters a new cell performs an initial cell search operation such as synchronizing with the BS (S11). To this end, the UE receives a Narrowband Primary Synchronization Signal (NPSS) and a Narrowband Secondary Synchronization Signal (NSSS) from the BS to synchronize with the BS and obtain information such as a cell identifier (ID), etc. Thereafter, the UE receives a Narrowband Physical Broadcast Channel (NPBCH) from the BS to obtain in-cell broadcast information (S12). Meanwhile, the UE receives a Downlink Reference Signal (DL RS) in an initial cell search step to check a downlink channel state.

Upon completion of the initial cell search, the UE receives Narrowband PDCCH (NPDCCH) and Narrowband PDSCH (NPDSCH) corresponding thereto to obtain more specific system information in step S12 (S12).

Thereafter, the UE may perform a random access procedure in order to complete an access to the BS (S13 to S16). Specifically, the UE may transmit a preamble through a Narrowband Physical Random Access Channel (NPRACH) (S13) and receive the Random Access Response (RAR) for the preamble through the NPDCCH and the NPDSCH corresponding thereto (S14). Thereafter, the UE may transmit a Narrowband Physical Uplink Shared Channel (NPUSCH) by using scheduling information in the RAR (S15) and perform a Contention Resolution Procedure such as the NPDCCH and the NPDSCH corresponding thereto (S16).

The UE that performs the aforementioned procedure may then perform reception of the NPDCCH signal and/or NPDSCH signal (S17) and NPUSCH transmission (S18) as the general uplink/downlink signal transmission procedure. Control information transmitted from the UE to the BS is collectively referred to as uplink control information (UCI). The UCI includes Hybrid Automatic Repeat and reQuest Acknowledgement/Negative-ACK (HARQ ACK/NACK), Scheduling Request (SR), Channel State Information (CSI), etc. The CSI includes a Channel Quality Indication (CQI), a Precoding Matrix Indicator (PMI), Rank Indicator (RI), etc. In the NB-IoT, the UCI is transmitted through the NPUSCH. According to the request/instruction of the network (e.g., BS), the UE may transmit the UCI through the NPUSCH periodically, aperiodically, or semi-persistently.

An NB-IoT frame structure may be configured differently according to the subcarrier spacing (SCS). FIG. 18 illustrates a frame structure when a subframe spacing is 15 kHz and FIG. 18 illustrates a frame structure when a subframe spacing is 3.75 kHz. The frame structure of FIG. 18 may be used in downlink/uplink and the frame structure of FIG. 19 may be used only in uplink.

Referring to FIG. 18 the NB-IoT frame structure for the subcarrier spacing of 15 kHz may be configured to be the same as the frame structure of the legacy system (i.e., LTE system) (see FIG. 2). That is, a 10-ms NB-IoT frame may include ten 1-ms NB-IoT subframes and a 1-ms NB-IoT subframe may include two 0.5-ms NB-IoT slots. Each 0.5-ms NB-IoT slot may include seven symbols. The 15-kHz subcarrier spacing may be applied to both downlink and uplink. The symbol includes an OFDMA symbol in downlink and an SC-FDMA symbol in uplink. In the frame structure of FIG. 18, the system band is 1.08 MHz and is defined by 12 subcarriers. The 15-kHz subcarrier spacing is applied to both downlink and uplink and orthogonally with the LTE system is guaranteed, and as a result, coexistence with the LTE system may be facilitated.

Referring to FIG. 19, when the subcarrier spacing is 3.75 kHz, the 10-ms NB-IoT frame may include five 2-ms NB-IoT subframes, and the 2-ms NB-IoT subframe may include seven symbols and one guard period (GP) symbol. The 2-ms NB-IoT subframe may be expressed as an NB-IoT slot or an NB-IoT resource unit (RU). Here, the symbol may include the SC-FDMA symbol. In the frame structure of FIG. 19, the system band is 1.08 MHz and is defined by 48 subcarriers. The subcarrier spacing of 3.75 kHz may be applied only to the uplink and the orthogonality with the LTE system may be impaired, resulting in performance degradation due to interference.

The figure may illustrate an NB-IoT frame structure based on an LTE system frame structure and the illustrated NB-IoT frame structure may be extensively applied even to the next-generation system (e.g., NR system).

FIG. 20 illustrates three operation modes of NB-IoT. Specifically, FIG. 20(*a*) illustrates an in-band system, FIG. 20(*b*) illustrates a guard-band system, and FIG. 20(*c*) illustrates a stand-alone system. Here, the in-band system may be expressed as an in-band mode, the guard-band system may be expressed as guard-band mode, and the stand-alone system may be expressed as a stand-alone mode. For convenience, the NB-IoT operation mode is described based on the LTE band, but the LTE band may be replaced with a band of another system (e.g., NR system band).

The in-band mode means an operation mode to perform the NB-IoT in the (legacy) LTE band. In the in-band mode, some resource blocks of an LTE system carrier may be allocated for the NB-IoT. For example, in the in-band mode, specific 1 RB (i.e., PRB) in the LTE band may be allocated for the NB-IoT. The in-band mode may be operated in a structure in which the NB-IoT coexists in the LTE band. The guard-band mode means an operation mode to perform the NB-IoT in a reserved space for the guard-band of the (legacy) LTE band. Accordingly, in the guard-band mode, the guard-band o the LTE carrier not used as the resource block in the LTE system may be allocated for the NB-IoT. The (legacy) LTE band may have a guard-band of at least 100 kHz at the end of each LTE band. The stand-alone mode means an operation mode to perform the NB-IoT in a frequency band independently from the (legacy) LTE band. For example, in the stand-alone mode, a frequency band (e.g., a GSM carrier to be reallocated in the future) used in a GSM EDGE Radio Access Network (GERAN) may be allocated for the NB-IoT.

The NB-IoT UE searches an anchor carrier in units of 100 kHz and in the in-band and the guard-band, a center frequency of the anchor carrier should be located within ±7.5 kHz from a 100 kHz channel raster. Further, six center PRBs among LTE PRBs are not allocated to the NB-IoT. Accordingly, the anchor carrier may be located only in a specific PRB.

FIG. 21 illustrates a layout of an in-band anchor carrier at an LTE bandwidth of 10 MHz.

Referring to FIG. 21, a direct current (DC) subcarrier is located in the channel raster. Since a center frequency spacing between adjacent PRBs is 180 kHz, the center frequency is located at ±2.5 kH from the channel raster in the case of PRB indexes 4, 9, 14, 19, 30, 35, 40, and 45. Similarly, the center frequency of the PRB suitable as the anchor carrier at an LTE bandwidth of 20 MHz is located at ±2.5 kHz from the channel raster and the center frequency of the PRB suitable as the anchor carrier at LTE bandwidths of 3 MHz, 5 MHz, and 15 MHz is located at 7.5 kHz from the channel raster.

In the case of the guard-band mode, the center frequency is located at ±2.5 kHz from the channel raster in the case of a PRB immediately adjacent to an edge PRB of LTE at the bandwidths of 10 MHz and 20 MHz. In the case of the bandwidths 3 MHz, 5 MHz, and 15 MHz, a guard frequency band corresponding to three subcarriers from the edge PRB is used to locate the center frequency of the anchor carrier at ±7.5 kHz from the channel raster.

The anchor carrier of the stand-alone mode may be aligned in the 100 kHz channel raster and all GSM carriers including a DC carrier may be used as the NB-IoT anchor carrier.

The NB-IoT may support multi-carriers and combinations of in-band and in-band, in-band and guard-band, guard band and guard-band, and stand-alone and stand-alone may be used.

In NB-IoT downlink, physical channels such as a Narrowband Physical Broadcast Channel (NPBCH), a Narrowband Physical Downlink Shared Channel (NPDSCH), and a Narrowband Physical Downlink Control Channel (NPDCCH) are provided and physical signals such as a Narrowband Primary Synchronization Signal (NPSS), a Narrowband Primary Synchronization Signal (NSSS), and aNarrowband Reference Signal (NRS) are provided.

The NPBCH transfers, to the UE, a Master Information Block-Narrowband (MIB-NB) which is minimum system information which the NB-IoT requires for accessing the system. The NPBCH signal may be repeatedly transmitted eight times in total for coverage enhancement. A Transport Block Size (TBS) of the MIB-NB is 34 bits and is newly updated every 64 ms TTI period. The MIB-NB includes information such as an operation mode, a System Frame Number (SFN), a Hyper-SFN, the number of Cell-specific Reference Signal (CRS) ports, a channel raster offset, etc.

FIG. 22 illustrates transmission of an NB-IoT downlink physical channel/signal in an FDD LTE system. A downlink physical channel/signal is transmitted through one PRB and supports 15 kHz subcarrier spacing/multi-tone transmission.

Referring to FIG. 22, the NPSS is transmitted in a 6th subframe of every frame and the NSSS is transmitted in a last (e.g., 10th) subframe of every even frame. The UE may obtain frequency, symbol, and frame synchronization using the synchronization signals (NPSS and NSSS) and search 504 physical cell IDs (PCIDs) (i.e., BS IDs). The NPBCH is transmitted in a first subframe of every frame and transports the NB-MIB. The NRS is provided as a reference signal for downlink physical channel demodulation and is generated in the same scheme as the LTE. However, Physical Cell ID (NB-PCID) (or NCell ID or NB-IoT BS ID) is used as an initialization value for NRS sequence generation. The NRS is transmitted through one or two antenna ports. The NPDCCH and the NPDSCH may be transmitted in the remaining subframes except for the NPSS/NSSS/NPBCH. The NPDCCH and the NPDSCH may be transmitted together in the same subframe. The NPDCCH transports the DCI and the DCI supports three types of DCI formats. DCI format N0 includes Narrowband Physical Uplink Shared Channel (NPUSCH) scheduling information and DCI formats N1 and N2 include NPDSCH scheduling information. The NPDCCH may be repeatedly transmitted 2048 times in total for coverage enhancement. The NPDSCH is used for transmitting data (e.g., TB) of transmission channels such as a Downlink-Shared Channel (DL-SCH) and a Paging Channel (PCH). The maximum TBS is 680 bits and may be repeatedly transmitted 2048 times in total for coverage enhancement.

The uplink physical channel includes a Narrowband Physical Random Access Channel (NPRACH) and the NPUSCH and supports single-tone transmission and multi-tone transmission. The single-tone transmission is supported for the subcarrier spacings of 3.5 kHz and 15 kHz and the multi-tone transmission is supported only for the subcarrier spacing of 15 kHz.

FIG. 23 illustrates an NPUSCH format.

The NPUSCH supports two formats. NPUSCH format 1 is used for UL-SCH transmission, and the maximum TBS is 1000 bits. NPUSCH format 2 is used for transmission of uplink control information such as HARQ ACK signaling. NPUSCH format 1 supports the single-/multi-tone transmission, and NPUSCH format 2 supports only the single-tone transmission. In the case of the single-tone transmission, pi/2-Binary Phase Shift Keying (BPSK) and pi/4-Quadrature Phase Shift Keying (QPSK) are used to reduce Peat-to-Average Power Ratio (PAPR). In the NPUSCH, the number of slots occupied by one resource unit (RU) may vary according to resource allocation. The RU represents the smallest resource unit to which the TB is mapped, and is constituted by NULsymb*NULslots consecutive SC-FDMA symbols in the time domain and NRUsc consecutive subcarriers in the frequency domain. Here, NULsymb represents the number of SC-FDMA symbols in the slot, NULslots represents the number of slots, and NRUsc represents the number of subcarriers constituting the RU.

Table 11 shows the configuration of the RU according to the NPUSCH format and subcarrier spacing. In the case of TDD, the supported NPUSCH format and SCS vary according to the uplink-downlink configuration. Table 2 may be referred to for the uplink-downlink configuration.

TABLE 11

| NPUSCH format | Subcarrier spacing | Supported uplink-downlink configurations | $N^{RU}_{sc}$ | $N^{UL}_{slots}$ | $N^{UL}_{symb}$ |
|---|---|---|---|---|---|
| 1 | 3.75 kHz | 1, 4 | 1 | 16 | 7 |
|  | 15 kHz | 1, 2, 3, 4, 5 | 1 | 16 |  |
|  |  |  | 3 | 8 |  |
|  |  |  | 6 | 4 |  |
|  |  |  | 12 | 2 |  |
| 2 | 3.75 kHz | 1, 4 | 1 | 4 |  |
|  | 15 kHz | 1, 2, 3, 4, 5 | 1 | 4 |  |

Scheduling information for transmission of UL-SCH data (e.g., UL-SCH TB) is included in DCI format N0, and the DCI format N0 is transmitted through the NPDCCH. The DCI format N0 includes information on the start time of the NPUSCH, the number of repetitions, the number of RUs used for TB transmission, the number of subcarriers, resource locations in the frequency domain, and MCS.

Referring to FIG. 23, DMRSs are transmitted in one or three SC-FDMA symbols per slot according to the NPUSCH format. The DMRS is multiplexed with data (e.g., TB, UCI), and is transmitted only in the RU including data transmission.

FIG. 24 illustrates an operation when multi-carriers are configured in FDD NB-IoT.

In FDD NB-IoT, a DL/UL anchor-carrier may be basically configured, and a DL (and UL) non-anchor carrier may be additionally configured. Information on the non-anchor carrier may be included in RRCConnectionReconfiguration. When the DL non-anchor carrier is configured (DL add carrier), the UE receives data only in the DL non-anchor carrier. On the other hand, synchronization signals (NPSS and NSSS), broadcast signals (MIB and SIB), and paging signals are provided only in the anchor-carrier. When the DL non-anchor carrier is configured, the UE listens only to the DL non-anchor carrier while in the RRC_CONNECTED state. Similarly, when the UL non-anchor carrier is configured (UL add carrier), the UE transmits data only in the UL non-anchor carrier, and simultaneous transmission on the UL non-anchor carrier and the UL anchor-carrier is not allowed. When the UE is transitioned to the RRC_IDLE state, the UE returns to the anchor-carrier.

FIG. 24 illustrates a case where only the anchor-carrier is configured for UE1, the DL/UL non-anchor carrier is additionally configured for UE2, and the DL non-anchor carrier is additionally configured for UE3. As a result, carriers in which data is transmitted/received in each UE are as follows.

UE1: Data reception (DL anchor-carrier) and data transmission (UL anchor-carrier)

UE2: Data reception (DL non-anchor-carrier) and data transmission (UL non-anchor-carrier)

UE3: Data reception (DL non-anchor-carrier) and data transmission (UL anchor-carrier)

The NB-IoT UE may not transmit and receive at the same time, and the transmission/reception operations are limited to one band each. Therefore, even if the multi-carrier is configured, the UE requires only one transmission/reception chain of the 180 kHz band.

Network Access and Communication Process

The UE may perform a network access process while performing the procedures and/or methods described/proposed above. For example, the UE may receive system information and configuration information required for performing the procedure and/or methods described/proposed above while performing accessing a network (e.g., BS), and store the received system information and configuration information. The configuration information required for the present disclosure may be received through higher layer (e.g., RRC layer; Medium Access Control, MAC, layer, etc.) signaling.

FIG. 25 illustrates an initial network access and a subsequent communication process. In NR, a physical channel and a reference signal may be transmitted by using beam-forming. When beam-forming based signal transmission is supported, a beam management process may be accompanied in order to align a beam between the BS and the UE. Further, a signal proposed in the present disclosure may be transmitted/received by using the beam-forming. In a radio resource control (RRC) idle mode, beam alignment may be performed based on an SSB. On the contrary, in an RRC connected mode, the beam alignment may be performed based on CSI-RS (in DL) and SRS (in UL). Meanwhile, when the beam-forming based signal transmission is not supported, an operation related to a beam may be omitted in the following description.

Referring to FIG. 25, the base station (e.g., BS) may periodically transmit the SSB (S702). Here, the SSB includes a PSS/SSS/PBCH. The SSB may be transmitted by using beam sweeping (see FIG. 22). The PBCH may include a master information block (MIB), and the MIB may include scheduling information regarding remaining minimum system information (RMSI). Thereafter, the BS may transmit the RMSI and other system information (OSI) (S704). The RMSI may include information (e.g., PRACH configuration information) which the UE requires to initially access the BS. Meanwhile, the UE performs SSB detection, and then identifies a best SSB. Thereafter, the UE may transmit, to the BS, an RACH preamble (Message 1, Msg1) by using a PRACH resource linked/corresponding to an index (i.e., a beam) of the best SSB (S706). A beam direction of an RACH preamble is associated with a PRACH resource. An association between the PRACH resource (and/or RACH preamble) and the SSB (index) may be configured through system information (e.g., RMSI). Thereafter, as a part of an RACH process, the BS may transmit a random access response (Msg2) in response to the RACH preamble (S708), the UE may transmit Msg3 (e.g., RRC connection request) by using a UL grant in the RAR (S710), and the BS may transmit a contention resolution message (Msg4) (S712). Msg4 may include RRC connection setup.

When the RRC connection is configured between the BS and the UE through the RACH process, subsequent beam alignment may be performed based on SSB/CSI-RS (in DL) and SRS (in UL). For example, the UE may receive the SSB/CSI-RS (S714). The SSB/CSI-RS may be used for the UE to generate beam/CSI reporting. Meanwhile, the BS may request the beam/CSI reporting to the UE through DCI (S716). In this case, the UE may generate the beam/CSI reporting based on the SSB/CSI-RS, and transmit the generated beam/CSI reporting to the BS through the PUSCH/PUCCH (S718). The beam/CSI reporting may include a beam measurement result, information on a preferred beam, and the like. The BS and the UE may switch the beam based on the beam/CSI reporting (S720a and S720b).

Thereafter, the UE and the BS may perform the procedure and/or methods described/proposed above. For example, the UE and the BS may process the information in the memory and transmit the radio signal or process the received radio signal and store the processed radio signal in the memory according to the proposal of the present disclosure based on configuration information obtained during the network access process (e.g., a system information acquisition process, an RRC connection process through the RACH, etc.). Here, the radio signal may include at least one of the PDCCH, the PDSCH, and the reference signal (RS) in the case of the downlink and include at least one of the PUCCH, the PUSCH, and the SRS in the case of the uplink.

The contents described above may be basically applied to the MTC and the NB-IoT in common. Parts which may be different in the MTC and the NB-IoT will be additionally described below.

MTC Network Access Process

The MTC network access process based on the LTE will be additionally described. The following description may be extensively applied even to the NR. In the LTE, the MIB includes 10 reserved bits. In the MTC, 5 most significant bits (MSBs) among 10 reserved bits in the MIB are used to indicate scheduling information for System Information Block for bandwidth reduced device (SIB1-RB). 5 MSBs are used for indicating a repetition number of SIB1-BR and a transport block size (TBS). The SIB1-BR is transmitted in the PDSCH. The SIB1-BR may not be changed in 512 radio frames (5120 ms) so as to permit multiple subframes to be combined. Transported information in the SIB1-BR is similar to SIB1 in the LTE system.

The MTC RACH process is basically the same as the LTE RACH process, and both processes are different in the following matter. The MTC RACH process is performed based on a coverage enhancement (CE) level. For example, whether the PRACH is repeatedly transmitted/the number of repeated transmission times of the PRACH may vary for each CE level for PRACH coverage improvement.

Table 12 shows a CE mode/level supported in the MTC. The MTC supports 2 modes (CE mode A and CE mode B) and 4 levels (levels 1 to 4) for coverage enhancement.

TABLE 12

| Mode | Level | Description |
| --- | --- | --- |
| Mode A | Level 1 | No repetition |
|  | Level 2 | Small Number of Repetition |
| Mode B | Level 3 | Medium Number of Repetition |
|  | Level 4 | Large Number of Repetition |

CE mode A may be a mode for small coverage enhancement in which complete mobility and CSI feedback are supported, and there may be no repetition or the repetition number may be configured to be small. CE mode B may be a mode for a UE which is in an extremely poor coverage condition supporting the CSI feedback and the limited mobility, and the repetition number may be configured to be large.

The BS may broadcast system information including a plurality of (e.g., 3) reference signal received power (RSRP) thresholds, and the UE compares the RSRP threshold and the RSRP measurement value to determine the CE level. The following information may be independently configured through the system information for each CE level.

PRACH resource information: Period/offset of PRACH opportunity, PRACH frequency resource Preamble group: Preamble set allocated for each CE level Repetition number for each preamble attempt and the maximum number of preamble attempts RAR window time: Length of a time interval in which RAR reception is expected (e.g., a subframe number)

Contention resolution window time: Length of time interval in which contention resolution message reception is expected The UE may select a PRACH resource corresponding to the CE level thereof, and then perform the PRACH transmission based on the selected PRACH resource. A PRACH waveform used in the MTC is the same as the PRACH waveform used in the LTE (e.g., OFDM and Zadoff-Chu sequence). Signals/messages transmitted after the PRACH may be repeatedly transmitted, and the repetition number may be independently configured according to the CE mode/level.

NB-IoT Network Access Process

The NB-IoT network access process based on the LTE will be additionally described. The following description may be extensively applied even to the NR. In FIG. 12, the PSS, the SSS, and the PBCH of S702 are replaced with NPSS, NSSS, and NPBCH in the NB-IoT, respectively. Matters for the NPSS, the NSSS, and the NPBCH may be described with reference to FIG. 22.

The NB-IoT RACH process is basically the same as the LTE RACH process, and both processes are different in the following matter. First, RACH preamble formats are different. In the LTE, the preamble is based on a code/sequence (e.g., Zadoff-chu sequence), while in the NB-IoT, the preamble, is a subcarrier. Second, the NB-IoT RACH process is performed based on the CE level. Accordingly, the PRACH resource is differently assigned for each CE level. Third, since the SRS resource is not configured in the NB-IoT, an uplink resource allocation request in the NB-IoT is performed by using the RACH process.

FIG. 26 illustrates preamble transmission in NB-IoT RACH.

Referring to FIG. 26, the NPRACH preamble may be constituted by 4 symbol groups, and each symbol group may be constituted by a CP and a plurality of (e.g., 5) SC-FDMA symbols. In the NR, the SC-FDMA symbol may be replaced with the OFDM symbol or the DFT-s-OFDM symbol. The NPRACH supports only single-tone transmission of 3.75 kHz subcarrier spacing, and provides CPs having lengths of 66.7 µs and 266.67 µs in order to support different cell radii. Each symbol group supports frequency hopping and a hopping pattern is as follows. A subcarrier that transmits a first symbol group is determined by a pseudo-random scheme. A second symbol group leaps 1 subcarrier, a third symbol group leaps 6 subcarriers, and a fourth symbol group leaps 1 subcarrier. A frequency hopping procedure is repeatedly applied to repeated transmission, and the NPRACH preamble may be repeatedly transmitted {1, 2, 4, 8, 16, 32, 64, 128} times for coverage improvement. The NPRACH resource may be configured for each CE level. The UE may select the NPRACH resource based on the CE level determined according to a downlink measurement result (e.g., RSRP), and transmit the RACH preamble by using the selected NPRACH resource. The NPRACH may be transmitted in an anchor carrier or transmitted in a non-anchor carrier in which the NPRACH resource is configured.

Discontinuous Reception (DRX) Operation

The UE may perform the DRX operation while performing the procedures and/or methods described/proposed above. A UE in which the DRX is configured discontinuously receives a DL signal to reduce power consumption. The DRX may be performed in a Radio Resource Control (RRC)_IDLE state, an RRC_INACTIVE state, and an RRC_CONNECTED state.

RRC_CONNECTED DRX

In the RRC_CONNECTED state, the DRX is used for discontinuous reception of the PDCCH. For convenience, the DRX performed in the RRC_CONNECTED state will be referred to as RRC_CONNECTED DRX.

FIG. 27 illustrates a DRX cycle for discontinuous reception of PDCCH.

Referring to FIG. 27, the DRX cycle is constituted by On Duration and Opportunity for DRX. The DRX cycle defines a time interval in which the On Duration is periodically repeated. The On Duration represents a time interval which the UE monitors in order to receive the PDCCH (or MPDCCH or NPDCCH). When the DRX is configured, the UE monitors the PDCCH for On Duration. When there is a PDCCH which is successfully detected while monitoring the PDCCH, the UE operates an inactivity timer and maintains an awake state. On the contrary, when there is no PDCCH which is successfully detected while monitoring the PDCCH, the UE enters a sleep state after the On Duration ends. Accordingly, when the DRX is configured, PDCCH monitoring/reception may be discontinuously performed in the time domain in performing the procedure and/or method described/proposed above. For example, when the DRX is configured, the PDCCH monitoring may be discontinuously performed according to the DRX configuration in an activated cell(s). Specifically, when a PDCCH occasion (e.g., a time interval configured to monitor the PDCCH (e.g., one or more continuous OFDM symbols)) corresponds to On Duration, the PDCCH monitoring may be performed and when the PDCCH occasion corresponds to Opportunity for DRX, the PDCCH monitoring may be omitted. On the contrary, when the DRX is not configured, the PDCCH monitoring/reception may be continuously performed in the time domain in performing the procedure and/or method described/proposed above. For example, when the DRX is not configured, the PDCCH reception occasion may be continuously configured. Meanwhile, regardless of whether the DRX is configured, the PDCCH monitoring may be limited in a time interval configured as a measurement gap.

Table 13 shows a process of the UE related to the DRX (RRC_CONNECTED state). Referring to Table 13, DRX configuration information is received through higher layer (e.g., RRC) signaling and whether the DRX is on/off is controlled by a DRX command of an MAC layer. When the DRX is configured, the UE may discontinuously monitor the PDCCH in performing the procedure and/or method described/proposed in the present disclosure as illustrated in FIG. 27.

TABLE 13

| | Type of signals | UE procedure |
|---|---|---|
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

Here, MAC-CellGroupConfig includes configuration information required for configuring a Medium Access Control (MAC) parameter for a cell group. MAC-CellGroupConfig may include even configuration information for the DRX. For example, MAC-CellGroupConfig may include information as follows in defining the DRX.

Value of drx-OnDurationTimer: Defining the length of the start interval of the DRX cycle Value of drx-InactivityTimer: Defining the length of a time interval in which the UE is in an awake state after the PDCCH occasion in which a PDCCH indicating initial UL or DL data is detected Value of drx-HARQ-RTT-TimerDL: Defining the length of a maximum time interval until DL retransmission is received after DL initial transmission is received Value of drx-HARQ-RTT-TimerDL: Defining the length of a maximum time interval until a grant for UL retransmission is received after the grant for UL initial transmission is received drx-LongCycleStartOffset: Defining a time length and a start point of the DRX cycle drx-ShortCycle (optional): Defining a time length of a short DRX cycle Here, when even any one of drx-OnDurationTimer, drx-InactivityTimer, drx-HARQ-RTT-TimerDL, and drx-HARQ-RTT-TimerDL is operating, the UE monitors the PDCCH every PDCCH occasion while maintaining the awake state.

RRC_IDLE DRX

In the RRC_IDLE state and the RRC_INACTIVE state, the DRX is used for discontinuously receiving a paging signal. For convenience, the DRX performed in the RRC_IDLE (or RRC_INACTIVE) state will be referred to as RRC_IDLE DRX.

Therefore, when the DRX is configured, the PDCCH monitoring/reception may be discontinuously performed in the time domain in performing the procedure and/or method described/proposed above.

FIG. 28 illustrates a DRX cycle for paging.

Referring to FIG. 28, DRX may be configured for discontinuous reception of a paging signal. The UE may receive DRX configuration information from the base station through higher layer (e.g., RRC) signaling. The DRX configuration information may include configuration information for a DRX cycle, a DRX offset, and DRX timer, etc. The UE repeats On Duration and Sleep Duration according to the DRX cycle. The UE may operate in a wakeup mode in the On duration and operate in a sleep mode in the Sleep duration.

In the wakeup mode, the UE may monitor a PO in order to receive a paging message. The PO means a time resource/interval (e.g., subframe or slot) in which the UE expects to receive the paging message. PO monitoring includes monitoring PDCCH (or MPDCCH or NPDCCH) (hereinafter, referred to as paging PDCCH) scrambled with P-RNTI in the PO. The paging message may be included in the paging PDCCH or included in a PDSCH scheduled by the paging PDCCH. One or a plurality of PO(s) is included in a paging frame (PF) and the PF may be periodically configured based on UE ID. Here, the PF may correspond to one radio frame, and the UE ID may be determined based on an International Mobile Subscriber Identity (IMSI). When the DRX is configured, the UE monitors only one PO per DRX cycle. When the UE receives a paging message indicating a change of an ID and/or system information thereof, the UE may perform the RACH process or receive (or acquire) new system information from the BS in order to initialize (or reconfigure) the connection with the BS. Accordingly, in performing the procedure and/or method described/proposed above, the PO monitoring may be discontinuously performed in the time domain in order to perform the RACH for connection with the base station or receive (or obtain) the new system information from the BS.

FIG. 29 illustrates an extended DRX (eDRX) cycle.

According to a DRX cycle configuration, maximum cycle duration may be limited to 2.56 seconds. However, in a UE in which data transmission/reception is intermittently performed, such as an MTC UE or NB-IoT UE, unnecessary power consumption may occur during the DRX cycle. In order to further reduce the power consumption, a method for significantly extending the DRX cycle based on a power saving mode (PSM) and a paging time window or paging transmission window (PTW) is introduced, and the extended DRX cycle is simply referred to as an eDRX cycle. Specifically, paging hyper-frames (PH) is periodically configured based on the UE ID, and the PTW is defined in the PH. The UE performs the DRX cycle in the PTW duration and switches to the wakeup mode in the PO thereof to monitor the paging signal. The PTW duration may include one or more DRX cycles (e.g., wakeup mode and sleep mode) of Figure U2. The number of DRX cycle times in the PTW duration may be configured through a higher layer (e.g., RRC) signal by the base station.

Wake-Up Signal (WUS)

The WUS may be used in order to reduce power consumption related to paging monitoring. The WUS is a physical layer signal indicating whether the UE monitors a paging signal (e.g., MPDCCH/NPDCCH scrambled with P-RNTI) according to a cell configuration. In a UE in which eDRX is not configured (i.e., only DRX is configured), the WUS may be associated with one PO (N=1). On the contrary, in a UE in which the eDRX is configured, the WUS may be associated with one or more POs (N≥1). When the WUS is detected, the UE may monitor N POs after being associated with the WUS. On the contrary, when the WUS is not detected, the UE may hold the sleep mode by omitting PO monitoring until monitoring a subsequent WUS.

FIG. 30 illustrates a timing relationship between WUS and PO.

The UE may receive configuration information for the WUS from the BS and monitor the WUS based on the WUS configuration information. The configuration information for the WUS may include, for example, a maximum WUS duration, the number of consecutive POs associated with the WSU, gap information, etc. The maximum WUS duration may represent a maximum time duration in which the WUS may be transmitted, and may be expressed as a ratio with a maximum repetition number (e.g., Rmax) related to the PDCCH (e.g., MPDCCH, NPDCCH). The UE may expect WUS repeated transmission in the maximum WUS duration, but an actual number of WUS transmission times may be smaller than a maximum number of WUS transmission times in the maximum WUS duration. For example, the number of WUS repetition times may be small for a UE within good coverage. For convenience, a resource/opportunity in which the WUS may be transmitted within the maximum WUS duration is referred to as a WSU resource. The WUS resource may be defined as a plurality of consecutive OFDM symbols and a plurality of consecutive subcarriers. The WUS resource may be defined as a plurality of consecutive OFDM symbols and a plurality of consecutive subcarriers in the subframe or slot. For example, the WUS resource may be defined as 14 consecutive OFDM symbols and 12 consecutive subcarriers. A UE that detects the WUS does not monitor the WUS until a first PO associated with the WUS. When the UE is not able to detect the WUS for the maximum WUS duration, the UE does not monitor the paging signal in the POs associated with the WUS (or remains in the sleep mode).

Currently, the new radio (NR) system supports a flexible slot format. For example, uplink (UL), downlink (DL), or flexible configuration may be possible per symbol(s) even within a subframe and/or slot. On the other hand, in the LTE IoT system, because valid/invalid configuration is possible only in units of subframe, it is necessary to configure and use resources based on a level less than the subframe for the purpose of the efficient coexistence of NR and LTE IoT. That is, it is necessary to configure and use resources in units of slot and/or symbol.

Hereinafter, the present disclosure proposes a method for an LTE IoT UE to efficiently coexist with NR at the same frequency band.

More specifically, the present disclosure describes a method of reserving a resource in units of subframe/slot/symbol (hereinafter, referred to as a first embodiment), and a method of managing a reserved resource (hereinafter, referred to as a second embodiment).

In the present disclosure, LTE IoT may be used as meaning including LTE MTC and/or NB-IoT.

Hereinafter, embodiments described in the present disclosure are merely distinguished for convenience of description. It is a matter of course that partial method and/or partial configuration, etc. of any embodiment can be replaced with methods and/or configurations, etc. of other embodiments, or they can be combined and applied to each other.

In the present disclosure, 'A/B' may be interpreted as 'A and B', 'A or B', and/or 'A and/or B'.

First Embodiment

A method of reserving a resource in units of subframe/slot/symbol is first described.

In order for an LTE IoT UE to coexist with NR at the same frequency band, a method of indicating a flexible subframe/slot/symbol in cell-specific radio resource control (RRC) configuration and/or UE-specific RRC configuration may be considered.

In order to coexist with NR supporting a flexible slot format, a flexible resource (or reserved resource may be indicated to the LTE IoT UE by cell-specific configuration or RRC configuration. For example, a flexible resource may be indicated to the LTE IoT UE by cell-specific RRC configuration or UE-specific RRC configuration, in order to coexist with NR supporting a flexible slot format.

The flexible resource described above may be a duration that is not determined in downlink or uplink of the LTE IoT system, and may also be a duration in which LTE CRS is not expected. And/or, this may be downlink by LTE TDD configuration, special subframe configuration, and/or LTE IoT system configuration, but may be indicated as the flexible resource. In this case, it may also be allowed to expect LTE CRS in the flexible resource.

And/or, the flexible resource is not configured with a BL/CE subframe or a valid subframe, and thus cannot be used for the existing LTE IoT UEs. However, the flexible resource may include the meaning of available resource for Rel-16 LTE IoT UEs by base station (BS) configuration. For example, the flexible resource may include the meaning of resource, in which Rel-16 LTE IoT UEs support more flexible time-domain resource reservation in units of symbol and/or slot and thus can use a resource, that has not been available because the existing LTE IoT UEs support only a time-domain resource reservation in units of subframe. For example, the Rel-16 LTE IoT UEs support the more flexible time-domain resource reservation in units of symbol and/or slot and thus can use a resource, that has not been available because the existing LTE IoT UEs support only the time-domain resource reservation in units of subframe.

And/or, in the meaning that the flexible resource is a resource that only the Rel-16 UE can flexibly use, the flexible resource has been configured as 'invalid' to UEs before Rel-16 by a subframe-level resource reservation. On the other hand, the flexible resource may be configured as 'valid' to the Rel-16 UE by the cell-specific RRC configuration, or although the flexible resource has been configured as 'invalid' to the Rel-16 UE by the cell-specific RRC configuration, the flexible resource may be configured as 'valid' to the Rel-16 UE or indicated to be available by the UE-specific RRC configuration or downlink control information (DCI) signaling.

In the present disclosure, a resource configured as 'invalid' to the Rel-16 LTE IoT UE may be referred to as a reserved resource. That is, a resource configured as 'invalid' to the Rel-16 LTE IoT UE may have the meaning of a reserved resource for non-LTE MTC use. For example, time resource/frequency resource, that the LTE MTC UE cannot expect as all or some of uplink/downlink signals because it is used as NR channel/signal, may be assigned to the Rel-16 LTE MTC UE as a reserved resource. And/or, in the present disclosure, the flexible resource may have the same meaning as the reserved resource. And/or, the reserved resource may be called on a per subframe basis, and the reserved resource may mean a subframe if all the symbols within the subframe are reserved.

By default, the reserved resource is semi-statically configured in units of specific duration (e.g., symbol, slot, subframe) in the form of bitmap(s), etc. (e.g., slotBitmap, symbolBimap) by the cell-specific RRC configuration and/or the UE-specific RRC configuration, and, it may be indicated to use some or all of the corresponding reserved resources in units of specific duration via dynamic DCI signaling. For example, the reserved resource may be semi-statically configured in units of specific duration in the form of bitmap(s), etc. by the cell-specific RRC configuration and/or the UE-specific RRC configuration, and it may be indicated to use some or all of the corresponding reserved resources in units of specific duration via the dynamic DCI signaling.

The specific duration, in which a bitmap (subframe level bitmap/slot level bitmap/symbol level bitmap) for semi-static time-domain resource reservation is defined, may be determined as a period of a specific channel/signal used in NR. For example, the specific duration may be determined as a synchronization signal block (SSB) transmission period of 20 ms that the UE assumes during an initial access in NR, or as one value of SSB transmission periods {5, 10, 20, 40, 80, 160} ms configured by RRC signaling. For example, the subframe level bitmap/slot level bitmap/symbol level bitmap may be configured in units of 10 ms and/or 40 ms. On the other hand, a unit for dynamic time-domain resource reservation using DCI may be in units of subframe(s), slot(s) and/or symbol(s).

The base station may semi-statically configure reserved resources by the cell-specific RRC configuration and/or the UE-specific RRC configuration and indicate to use some or all of the semi-static reserved resources via DCI signaling. The UE may be indicated the semi-static reserved resource configuration by the cell-specific RRC configuration and/or the UE-specific RRC configuration and may expect uplink/downlink transmission/reception on resources except the reserved resources. Further, the UE may be allocated additional resources for uplink/downlink transmission/reception via DCI signaling.

For example, the base station may configure a semi-static resource reservation based on transmittable provisional position(s) of SSB(s) (i.e., candidate positions of SSBs) and may configure a dynamic resource reservation based on transmitted position(s) of actual SSB(s) (i.e., actually transmitted positions of SSBs). In this case, the DCI signaling may utilize a resource, to which the actual SSB(s) is not transmitted, as a DL resource via DL assignment DCI.

Hereinafter, a resource reservation method is described in detail by being divided into a dynamic time-domain resource reservation method, a dynamic frequency-domain resource reservation method, and a dynamic NB-domain resource reservation method.

Dynamic Time-Domain Resource Reservation

For a dynamic time-domain resource reservation, a base station may previously RRC-configure an available or reserved time-domain resource through a dynamic indication, and then may indicate whether to use or reserve it via DCI signaling. This is to reduce a DCI signaling overhead. For example, the base station may indicate whether to use (or apply) the RRC configuration or reserve the resource via DCI signaling. For example, the base station may indicate whether to use or reserve a reserved resource according to the RRC configuration via DCI signaling.

For example, a UE may receive DCI and consider a reserved resource according to the RRC configuration as an available resource to transmit and receive information. Alternatively, the UE may receive DCI, consider a reserved resource according to the RRC configuration as an unavailable resource, and transmit and receive information using a resource other than the reserved resource.

The base station may configure a semi-static reserved resource through RRC configuration 1 and configure dynamic reserved resource information through RRC configuration 2, and the UE may selectively apply the RRC configuration 1 and the RRC configuration 2 via DCI signaling.

And/or, if the RRC configuration 2 is a resource that is configured to be additionally used, an additional usable resource may be indicated via DCI signaling. For example, if the RRC configuration 2 is a configuration for additional use, an additional usable resource may be indicated via DCI signaling.

And/or, if each of the RRC configuration 1 and the RRC configuration 2 is configured in the form of a bitmap of the same duration, a resource to be actually used or a reserved resource may be indicated in the form of and/or/exclusive-or. And/or, the base station may pre-configure multiple dynamic reserved resource information, and in this state, may indicate one of the multiple dynamic reserved resource information via DCI. For example, the base station may configure four dynamic reserved resources and then indicate one of the four dynamic reserved resources through DCI 2-bit. For example, the base station may configure RRC configuration 2-1, RRC configuration 2-2, RRC configuration 2-3, and RRC configuration 2-4 and then indicate one of them through DCI 2-bit.

And/or, the base station may add a field to DCI or repurpose the usage for scheduling flexibility to transmit dynamic reserved resource information. For example, the base station may indicate in the form of combinatorial index so as to implement all the cases in specific unit within a specific duration for full flexibility. In this instance, the specific duration and the specific unit may be pre-configured by higher layer configuration. For example, the specific duration and the specific unit may be pre-configured by a higher layer signal. For example, the specific duration may be a subframe, and the specific unit may be a symbol.

Dynamic Frequency-Domain Resource Reservation

For dynamic frequency-domain resource reservation, the base station may reuse the existing resource block (RB) allocation field of UL/DL DCI and indicate an available or reserved frequency-domain resource.

Dynamic NB Resource Reservation

The base station may support a dynamic resource reservation in units of narrowband (NB) in the form of designating and/or releasing an available or reserved resource per narrowband (NB) or NB-IoT carrier via dynamic DCI signaling. The above information may be transmitted by adding a field to DCI, and the designation and/or release of NB may be applied after a specific time (e.g., X=4 subframes). For example, the specific time may be determined from a fourth subframe after a subframe in which DCI is transmitted/received.

And/or, NB hopping may operate as in the following method 1 and/or method 2.

(Method 1) If NB is designated and/or released after a specific time, NB hopping of an LTE MTC UE may operate based on NB which is after being designated and/or released.

Because there may be a collision issue with other UE in the Method 1, the Method 1 may be applied only when the NB is cell-specifically designated and/or released. For example, an NB hopping operation of the LTE MTC UE may be applied only when the NB is cell-specifically designated and/or released.

(Method 2) NB hopping of an LTE MTC UE may operate based on NB which is before being designated and/or released. In this instance, the released NB may be punctured or postponed.

And/or, the two methods may be distinguished by a search space to which DCI indicating the corresponding dynamic NB designation and/or release is transmitted, and/or a radio network temporary identifier (RNTI). For example, the Method 1 may be applied for DCI transmitted to a common search space, and the Method 2 may be applied for DCI transmitted to a UE-specific search space.

A flexible resource may be configured in units of time, i.e., selectively among subframe/slot/symbol levels, and the corresponding unit may not be consecutive. For example, if the flexible resource is indicated in units of symbol, the number of flexible symbols within the corresponding subframe/slot may use the minimum number of downlink symbols/uplink symbols supported by the LTE IoT system as a minimum value, and subsequent values may not be consecutive.

And/or, even if the flexible resource (or reserved resource) is indicated in units of symbol, it may be a hierarchical structure in which radio frame/subframe/slot location, at which the corresponding symbol is positioned, is separately indicated. For example, the reserved resource may be configured by configuration information including a slot level bitmap and a symbol level bitmap, and the reserved resource may be one or more symbols reserved based on the symbol level bitmap in one or more slots reserved based on the slot level bitmap. And/or, the slot level bitmap may be set in units of 10 milliseconds (ms) and/or 40 ms. For example, 10 ms slot level bitmap may be configured to indicate or represent whether to reserve slots of 10 ms, and the symbol level bitmap may be configured to indicate or represent whether to reserve symbols of each of slots reserved in the 10 ms slot level bitmap. In other words, the base station may hierarchically configure the reserved resource to the UE.

And/or, the corresponding unit and minimum/maximum value range may vary depending on a cyclic prefix (CP) length of the corresponding system.

The indication method may be configured per NB or NB-IoT carrier, and/or the UE may expect that the indication method is not independently configured per NB or NB-IoT carrier when special configuration is not indicated.

In the cell-specific RRC configuration or the UE-specific RRC configuration, the flexible resource indicated in units of subframe/slot/symbol may be limited to a resource not Bandwidth reduced Low complexity (BL)/Coverage Enhancement (CE) subframe or a valid subframe. This may be to provide Rel-16 LTE IoT UEs with a method capable of dynamically utilizing opportunistically/limitedly only a resource selected as a resource that the existing LTE IoT UEs cannot utilize because the existing LTE IoT UEs cannot dynamically utilize the corresponding flexible resource.

Using the above feature, a bit size of the flexible resource may be determined depending on the value of '0' or '1' indicated in a BL/CE subframe or valid subframe bitmap.

And/or, the base station may differently configure the flexible resources through two methods, and the UE may select them. For example, the base station may differently configure the flexible resources via the cell-specific RRC signaling and the UE-specific RRC signaling, and the UE may select them. For example, the UE's selection may be based on a UE capability report or based on a preference from a UE perspective reported to the base station via uplink channel and/or uplink signal, etc. The base station may schedule downlink transmission or expect uplink reception based on the requesting capability or preference of the UE.

And/or, the base station may configure the flexible resource in units of slot (or subframe) via the cell-specific RRC signaling only when all symbols within a slot (or subframe) can be configured as the flexible resources, and may configure the flexible resource in units of symbol via the UE-specific RRC signaling when only some symbol(s) within a slot (or subframe) can be configured as the flexible resources.

In such a case, if the flexible resources in units of symbol can be used, the UE may perform uplink/downlink transmission/reception through the flexible resource configured via the UE-specific RRC signaling after the UE capability report/preference report (after the approval of the base station). The UE-specific RRC signaling may be used to configure additionally available flexible resources in addition to the flexible resources configured via the cell-specific RRC signaling, or used to limit some of the flexible resources, which are configured via the cell-specific RRC signaling, by the UE-specific RRC signaling.

Second Embodiment

Next, a method of managing a reserved resource is described.

Flexible resources (or reserved resources) may be managed or allocated for each channel/signal through the following method.

(1) (N)PRACH

If a random access (RA) resource is included in an UL subframe and/or UL slot including flexible resources, a physical random access channel (PRACH) transmission may not be allowed in the corresponding UL subframe and/or UL slot, but the UE may consider that (N)PRACH is actually transmitted in the corresponding duration and may count the number of (N)PRACH repeat transmissions. In the present disclosure, the PRACH may mean a narrowband physical random access channel (NPRACH), or mean to include the PRACH and NPRACH.

Exceptionally, if the flexible resource within the RA resource is indicated as UL through a dynamic method (e.g., via cell-specific, group-common and/or UE-specific DIC), (N)PRACH transmission may be allowed. This may be exceptionally allowed only when PDCCH order based PRACH transmission is performed.

And/or, if (N)PRACH transmission is performed based on PDCCH order, the flexible resource configuration may be ignored. That is, it may be interpreted that an intention of the base station to indicate PRACH transmission via a physical downlink control channel (PDCCH) has already changed the flexible resource to UL. However, if the UE fails to receive RAR and retransmits the PRACH after the (N)PRACH transmission based on the PDCCH order, the UE may allow PRACH to be transmitted only to RA resource not including flexible resource configured via higher layer.

(2) PDCCH

A flexible subframe/flexible slot may be processed by puncturing in PDCCH candidate construction.

In a LTE IoT PDCCH that UEs before Rel-16 can monitor, the actual transmission of LTE IoT PDCCH is omitted in a subframe/slot including a flexible resource, but it may be considered that the LTE IoT PDCCH is transmitted in a count of repeat transmission number. For example, the LTE IoT PDCCH that the UEs before Rel-16 can monitor may be punctured. In the present disclosure, the LTE IoT PDCCH may be referred to as an MTC physical downlink control channel (MPDCCH) and/or a narrowband physical downlink control channel (NPDCCH).

In the LTE IoT PDCCH that UEs above Rel-16 can monitor UE-specifically, the actual transmission of the LTE IoT PDCCH is omitted in a subframe/slot including a flexible resource, and it may be considered that the LTE IoT PDCCH is not transmitted even in a count of repeat transmission number. For example, the LTE IoT PDCCH that the UEs above Rel-16 can monitor UE-specifically may be postponed and/or deferred.

(3) PDSCH/PUSCH

When scheduling a physical downlink shared channel (PDSCH) and/or a physical uplink shared channel (PUSCH), whether a flexible subframe/flexible slot is included may be indicated. Alternatively, puncturing or postponing may be additionally indicated. For example, whether the flexible resource is included, and the puncturing or the postponing may be indicated.

If periodic transmission has been configured, but DCI scheduling this before every transmission is not transmitted (e.g., SPS, PUCCH for CSI report, etc.), the corresponding transmission may be omitted in the subframe/slot including the flexible resource. In the above, SPS, PUCCH, and CSI may mean semi-persistent scheduling, physical uplink control channel, channel state information, respectively.

The PDSCH and/or PUSCH that is dynamically scheduled to DCI through a UE-specific search space (USS) may indicate whether the subframe/slot including the flexible resource in a scheduling grant is used for the corresponding transmission/reception. This indication may be implemented by an independent field within scheduling DCI, or indirectly implemented by a repetition number of scheduled channel or a length value of a repetition transmission duration. Further, whether to be able to indicate whether the subframe/slot including the flexible resource in the scheduling DCI is used for the transmission/reception may be distinguished depending on a CE level and/or CE mode of the corresponding UE. Other Channel/Signal Without distinguishment for release as in a wake-up signal (WUS), a re-synchronization signal (RSS), paging PDCCH/PDSCH, and/or multicast PDCCH/PDSCH, transmission of cell-specifically configured channel/signal may be omitted in a subframe/slot including flexible resources, and it may be considered that the cell-specifically configured channel/signal is transmitted in terms of repetition number count. For example, the cell-specifically configured channel/signal may be punctured.

The flexible resource configuration may not be applied to subframe/slot/symbol, in which information, such as a primary synchronization signal (PSS), a secondary synchronization signal (SSS), a physical broadcast channel (PBCH) and/or a system information block (SIB), is transmitted. The corresponding duration may be not included in a flexible resource configuration field from the beginning.

Since examples of embodiments described in the present disclosure can be included as one of methods of implementing the present disclosure, it is obvious that the examples can be considered as embodiments.

As mentioned above, embodiments described in the present disclosure may be independently implemented, but some embodiments may be implemented in the form of combination (mergence). A rule may defined and/or configured so that a base station informs a UE of information about whether to apply embodiments (or information about rules of the embodiments) via pre-defined signaling (e.g., physical layer signaling and/or higher layer signaling, etc.).

FIG. 31 is a flow chart illustrating an operation method of a UE described in the present disclosure.

Referring to FIG. 31, first, a UE (1000/2000 of FIGS. 33 to 37) may receive discontinuous reception (DRX) related information from a base station via radio resource control (RRC) signaling, in S3101.

For example, an operation of the UE in the step S3101 to receive the DRX related information may be implemented by a device of FIGS. 33 to 37 to be described below. For example, referring to FIG. 34, one or more processors 1020 may control one or more memories 1040 and/or one or more RF units 1060 so as to receive the DRX related information, and the one or more RF units 1060 may receive the DRX related information.

And/or, the UE (1000/2000 of FIGS. 33 to 37) may receive a paging message from the base station based on the DRX related information, in S3102.

For example, an operation of the UE in the step S3102 to receive the paging message may be implemented by the device of FIGS. 33 to 37 to be described below. For example, referring to FIG. 34, one or more processors 1020 may control one or more memories 1040 and/or one or more RF units 1060 so as to receive the paging message, and the one or more RF units 1060 may receive the paging message.

And/or, the UE (1000/2000 of FIGS. 33 to 37) may receive, from the base station, configuration information (e.g., ResourceReservationCOnfig) including information for a slot level bitmap (e.g., slotBitmap) related to a reserved resource and information for a symbol level bitmap (e.g., symbolBitmap) related to the reserved resource, in S3103.

For example, the reserved resource may be one or more symbols reserved based on the symbol level bitmap in one or more slots reserved based on the slot level bitmap. And/or, the slot level bitmap may be set in units of 10 milliseconds (ms) and/or 40 ms. For example, 10 ms slot level bitmap may be configured to indicate or represent whether to reserve slots of 10 ms, and the symbol level bitmap may be configured to indicate or represent whether to reserve symbols of each of slots reserved in the 10 ms slot level bitmap. In other words, according to the present disclosure, the base station may hierarchically configure the reserved resource to the UE. For example, the reserved resource may be a resource in units of symbol, slot, subframe and/or radio frame.

And/or, the method according to the present disclosure may be performed in a wireless communication system supporting Internet of Things (IoT). For example, the IoT may include machine type communication (MTC) and/or narrowband-IoT (NB-IoT).

For example, based on that the IoT is the MTC, the configuration information may be configured per narrowband. And/or, based on that the IoT is the NB-IoT, the configuration information may be configured per NB-IoT carrier.

And/or, the configuration information may be received via radio resource control (RRC) signaling.

For example, an operation of the UE in the step S3103 to receive the configuration information may be implemented by the device of FIGS. 33 to 37 to be described below. For example, referring to FIG. 34, one or more processors 1020 may control one or more memories 1040 and/or one or more RF units 1060 so as to receive the configuration information, and the one or more RF units 1060 may receive the configuration information.

And/or, the UE (1000/2000 of FIGS. 33 to 37) may receive, from the base station, downlink control information (DCI) including indication information (e.g., resource reservation field) related to the use of the reserved resource, in S3104. For example, if the indication information is '0', the reserved resource based on the configuration information may be used for the UE to receive downlink information. If the indication information is '1', the reserved resource based on the configuration information cannot be used for the UE to receive downlink information. Herein, the reserved resource may be a resource in units of symbol, slot, subframe and/or radio frame.

Alternatively, the indication information may be information related to the use of the configuration information. For example, if the indication information is '0', downlink information may be received without the use of the configuration information. If the indication information is '1', downlink information may be received using the configuration information.

For example, an operation of the UE in the step S3104 to receive the DCI may be implemented by the device of FIGS. 33 to 37 to be described below. For example, referring to FIG. 34, one or more processors 1020 may control one or more memories 1040 and/or one or more RF units 1060 so as to receive the DCI, and the one or more RF units 1060 may receive the DCI.

And/or, the UE (1000/2000 of FIGS. 33 to 37) may receive, from the base station, downlink information based on the configuration information and the indication information, in S3105.

For example, the downlink information may be received using the reserved resource based on that the indication information includes an indication related to the use of the reserved resource. In other words, if the indication information includes an indication that the reserved resource is available, the UE may expect that the downlink information can be received in the reserved resource. And/or, the downlink information may be received without the use of the reserved resource based on that the indication information includes an indication related to a reservation of the reserved resource. In other words, if the indication information includes an indication that the reserved resource is unavailable, the UE may not expect that the downlink information can be received in the reserved resource. For example, the reservation of the reserved resource may mean that the reserved resource has been reserved, or that the reserved resource has been reserved without change.

And/or, the downlink information may be received using the reserved resource based on that the indication information includes an indication related to capable of using the reserved resource. As another example, the downlink information may be received not using the reserved resource based on that the indication information includes an indication related to incapable of using the reserved resource. And/or, the downlink information may include information and/or signal transmitted and received on channel.

For example, the downlink information may include a synchronization signal (e.g., PSS/SSS/NPSS/NSSS, etc.) and/or a reference signal (e.g., CSI-RS/DMRS/NRS/RRS, etc.), or the like.

For example, the downlink information may be received via a physical broadcast channel (PBCH) (e.g., PBCH/NPBCH), a physical downlink control channel (PDCCH) (e.g., PDCCH/NPDCCH/MPDCCH) and/or a physical downlink shared channel (PDSCH) (e.g., PDSCH/NPDSCH).

For example, an operation of the UE in the step S3105 to receive the downlink information may be implemented by the device of FIGS. 33 to 37 to be described below. For example, referring to FIG. 34, one or more processors 1020 may control one or more memories 1040 and/or one or more RF units 1060 so as to receive the downlink information, and the one or more RF units 1060 may receive the downlink information.

So far, although the method described above has been described based on the downlink, it is obvious that the method according to the present disclosure can be applied to uplink. For example, the configuration information may be configuration information for a reservation of an uplink resource. And/or, the UE and/or the base station may transmit and receive uplink information based on the configuration information for the reservation of the uplink resource. For example, the uplink information may be information and/or signal transmitted and received via a physical random access channel (PRACH) (e.g., PRACH/NPRACH), a physical uplink control channel (PUCCH), and/or a physical uplink shared channel (PUSCH) (e.g., PUSCH/NPUSCH).

Since the operation of the UE described with reference to FIG. 31 is the same as the operation of the UE described with reference to FIGS. 1 to 30, a detailed description thereof is omitted.

The signaling and operation described above may be implemented by a device (e.g., FIGS. 33 to 37) to be described below. For example, the signaling and operation described above may be processed by one or more processors 1010 and 2020 of FIGS. 33 to 37, and the signaling and operation described above may be stored in a memory (e.g., 1040 and 2040) in the form of a command/program (e.g., instruction, executable code) for running at least one processor (e.g., 1010 and 2020) of FIGS. 33 to 37.

For example, in a device comprising one or more memories and one or more processors operatively connected to the one or more memories, the one or more processors may be configured to allow the device to receive discontinuous reception (DRX) related information from a base station via radio resource control (RRC) signaling, receive a paging message from the base station based on the DRX related information, receive, from the base station, configuration information including information for a slot level bitmap related to a reserved resource and information for a symbol level bitmap related to the reserved resource, receive, from the base station, downlink control information (DCI) including indication information related to the use of the reserved resource, and receive downlink information from the base station based on the configuration information and the indication information.

As another example, in a non-transitory computer readable medium (CRM) storing one or more instructions, the one or more instructions executable by one or more processors may allow a UE to receive discontinuous reception (DRX) related information from a base station via radio resource control (RRC) signaling, receive a paging message from the base station based on the DRX related information, receive, from the base station, configuration information including information for a slot level bitmap related to a reserved resource and information for a symbol level bitmap related to the reserved resource, receive, from the base station, downlink control information (DCI) including indication information related to the use of the reserved resource, and receive downlink information from the base station based on the configuration information and the indication information.

FIG. 32 is a flow chart illustrating an operation method of a base station described in the present disclosure.

Referring to FIG. 32, first, a base station (1000/2000 of FIGS. 33 to 37) may transmit discontinuous reception (DRX) related information to a UE via radio resource control (RRC) signaling, in S3201.

For example, an operation of the base station in the step S3201 to transmit the DRX related information may be implemented by a device of FIGS. 33 to 37 to be described below. For example, referring to FIG. 34, one or more processors 1020 may control one or more memories 1040 and/or one or more RF units 1060 so as to transmit the DRX related information, and the one or more RF units 1060 may transmit the DRX related information.

And/or, the base station (1000/2000 of FIGS. 33 to 37) may transmit a paging message to the UE based on the DRX related information, in S3202.

For example, an operation of the base station in the step S3202 to transmit the paging message may be implemented by the device of FIGS. 33 to 37 to be described below. For example, referring to FIG. 34, one or more processors 1020 may control one or more memories 1040 and/or one or more RF units 1060 so as to transmit the paging message, and the one or more RF units 1060 may transmit the paging message.

And/or, the base station (1000/2000 of FIGS. 33 to 37) may transmit, to the UE, configuration information (e.g., ResourceReservationCOnfig) including information for a slot level bitmap (e.g., slotBitmap) related to a reserved resource and information for a symbol level bitmap (e.g., symbolBitmap) related to the reserved resource, in S3203.

For example, the reserved resource may be one or more symbols reserved based on the symbol level bitmap in one or more slots reserved based on the slot level bitmap.

And/or, the slot level bitmap may be set in units of 10 milliseconds (ms) and/or 40 ms. For example, 10 ms slot level bitmap may be configured to indicate or represent whether to reserve slots of 10 ms, and the symbol level bitmap may be configured to indicate or represent whether to reserve symbols of each of slots reserved in the 10 ms slot level bitmap. In other words, according to the present disclosure, the base station may hierarchically configure the reserved resource to the UE. For example, the reserved resource may be a resource in units of symbol, slot, subframe and/or radio frame.

And/or, the method according to the present disclosure may be performed in a wireless communication system supporting Internet of Things (IoT). For example, the IoT may include machine type communication (MTC) and/or narrowband-IoT (NB-IoT).

For example, based on that the IoT is the MTC, the configuration information may be configured per narrowband. And/or, based on that the IoT is the NB-IoT, the configuration information may be configured per NB-IoT carrier.

And/or, the configuration information may be received via radio resource control (RRC) signaling.

For example, an operation of the base station in the step S3203 to transmit the configuration information may be implemented by the device of FIGS. 33 to 37 to be described below. For example, referring to FIG. 34, one or more processors 1020 may control one or more memories 1040 and/or one or more RF units 1060 so as to transmit the configuration information, and the one or more RF units 1060 may transmit the configuration information.

And/or, the base station (1000/2000 of FIGS. 33 to 37) may transmit, to the UE, downlink control information (DCI) including indication information (e.g., resource reservation field) related to the use of the reserved resource, in S3204. For example, if the indication information is '0', the reserved resource based on the configuration information may be used for the UE to receive downlink information. If the indication information is '1', the reserved resource based on the configuration information cannot be used for the UE to receive downlink information. Herein, the reserved resource may be a resource in units of symbol, slot, subframe and/or radio frame.

Alternatively, the indication information may be information related to the use of the configuration information. For example, if the indication information is '0', downlink information may be received without the use of the configuration information. If the indication information is '1', downlink information may be received using the configuration information.

For example, an operation of the base station in the step S3204 to transmit the DCI may be implemented by the device of FIGS. 33 to 37 to be described below. For example, referring to FIG. 34, one or more processors 1020 may control one or more memories 1040 and/or one or more RF units 1060 so as to transmit the DCI, and the one or more RF units 1060 may transmit the DCI.

And/or, the base station (1000/2000 of FIGS. 33 to 37) may transmit, to the UE, downlink information based on the configuration information and the indication information, in S3205.

For example, the downlink information may be transmitted using the reserved resource based on that the indication information includes an indication related to the use of the reserved resource. In other words, if the indication information includes an indication that the reserved resource is available, the UE may expect that the downlink information can be received in the reserved resource. And/or, the downlink information may be transmitted without the use of the reserved resource based on that the indication information includes an indication related to a reservation of the reserved resource. In other words, if the indication information includes an indication that the reserved resource is unavailable, the UE may not expect that the downlink information can be received in the reserved resource. For example, the reservation of the reserved resource may mean that the reserved resource has been reserved, or that the reserved resource has been reserved without change.

And/or, the downlink information may be transmitted using the reserved resource based on that the indication information includes an indication related to capable of using the reserved resource. As another example, the downlink information may be transmitted not using the reserved resource based on that the indication information includes an indication related to incapable of using the reserved resource. And/or, the downlink information may include information and/or signal transmitted and received on channel.

For example, the downlink information may include a synchronization signal (e.g., PSS/SSS/NPSS/NSSS, etc.) and/or a reference signal (e.g., CSI-RS/DMRS/NRS/RRS, etc.), or the like.

For example, the downlink information may be transmitted via a physical broadcast channel (PBCH) (e.g., PBCH/NPBCH), a physical downlink control channel (PDCCH) (e.g., PDCCH/NPDCCH/MPDCCH) and/or a physical downlink shared channel (PDSCH) (e.g., PDSCH/NPDSCH).

For example, an operation of the base station in the step S3205 to transmit the downlink information may be implemented by the device of FIGS. 33 to 37 to be described below. For example, referring to FIG. 34, one or more processors 1020 may control one or more memories 1040 and/or one or more RF units 1060 so as to transmit the downlink information, and the one or more RF units 1060 may transmit the downlink information.

So far, although the method described above has been described based on the downlink, it is obvious that the method according to the present disclosure can be applied to uplink. For example, the configuration information may be configuration information for a reservation of an uplink resource. And/or, the UE and/or the base station may transmit and receive uplink information based on the configuration information for the reservation of the uplink resource. For example, the uplink information may be information and/or signal transmitted and received via a physical random access channel (PRACH) (e.g., PRACH/NPRACH), a physical uplink control channel (PUCCH), and/or a physical uplink shared channel (PUSCH) (e.g., PUSCH/NPUSCH).

Since the operation of the base station described with reference to FIG. 32 is the same as the operation of the base station described with reference to FIGS. 1 to 31, a detailed description thereof is omitted.

The signaling and operation described above may be implemented by a device (e.g., FIGS. 33 to 37) to be described below. For example, the signaling and operation described above may be processed by one or more processors 1010 and 2020 of FIGS. 33 to 37, and the signaling and operation described above may be stored in a memory (e.g., 1040 and 2040) in the form of a command/program (e.g., instruction, executable code) for running at least one processor (e.g., 1010 and 2020) of FIGS. 33 to 37.

For example, in a device comprising one or more memories and one or more processors operatively connected to the one or more memories, the one or more processors may be configured to allow the device to transmit discontinuous reception (DRX) related information to a UE via radio resource control (RRC) signaling, transmit a paging message to the UE based on the DRX related information, transmit, to the UE, configuration information including information for a slot level bitmap related to a reserved resource and information for a symbol level bitmap related to the reserved resource, transmit, to the UE, downlink control information (DCI) including indication information related to the use of the reserved resource, and transmit downlink information to the UE based on the configuration information and the indication information.

As another example, in a non-transitory computer readable medium (CRM) storing one or more instructions, the one or more instructions executable by one or more processors may allow a base station to transmit discontinuous reception (DRX) related information to a UE via radio resource control (RRC) signaling, transmit a paging message to the UE based on the DRX related information, transmit, to the UE, configuration information including information for a slot level bitmap related to a reserved resource and information for a symbol level bitmap related to the reserved resource, transmit, to the UE, downlink control information (DCI) including indication information related to the use of the reserved resource, and transmit downlink information to the UE based on the configuration information and the indication information.

Example of Communication System to which Present Disclosure is Applied

Although not limited thereto, but various descriptions, functions, procedures, proposals, methods, and/or operation flowcharts of the present disclosure, which are disclosed in this document may be applied to various fields requiring wireless communications/connections (e.g., 5G) between devices.

Hereinafter, the communication system will be described in more detail with reference to drawings. In the following drawings/descriptions, the same reference numerals will refer to the same or corresponding hardware blocks, software blocks, or functional blocks if not differently described.

FIG. 33 illustrates a communication system 10 applied to the present disclosure.

Referring to 33, a communication system 10 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 1000a, vehicles 1000b-1 and 1000b-2, an eXtended Reality (XR) device 1000c, a hand-held device 1000d, a home appliance 1000e, an Internet of Thing (IoT) device 1000f, and an AI device/server 4000. For example, the vehicle may include a vehicle with a wireless communication function, an autonomous driving vehicle, a vehicle capable of performing inter-vehicle communication, and the like. Here, the vehicle may include an Unmanned Aerial Vehicle (UAV) (e.g., drone). The XR device may include an Augmented Reality (AR)/Virtual Reality (VR)/Mixed Reality (MR) device and may be implemented as a form such as a head-mounted device (HMD), a head-up display (HUD) provided in the vehicle, a television, a smart phone, a computer, a wearable device, a home appliance device, digital signage, a vehicle, a robot, etc. The hand-held device may include the smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the BS and the network may be implemented even the wireless device and a specific wireless device 2,000a may operate a BS/network node for another wireless device.

The wireless devices 1000a to 1000f may be connected to a network 3000 through a BS 2000. An artificial intelligence (AI) technology may be applied to the wireless devices 1000a to 100f and the wireless devices 1000a to 1000f may be connected to an AI server 4000 through the network 3000. The network 3000 may be configured by using a 3G network, a 4G (e.g., LTE) network, or a 5G (e.g., NR) network. The wireless devices 1000a to 1000f may communicate with each other through the BS 2000/network 3000, but may directly communicate with each other without going through the BS/network (sidelink communication). For example, the vehicles 1000b-1 and 1000b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 1000a to 1000f.

Wireless communications/connections 1500a, 1500b, and 1500c may be made between the wireless devices 1000a to 1000f and the BS 2000 and between the BS 2000 and the BS 2000. Here, the wireless communication/connection may be made through various wireless access technologies (e.g., 5G NR) such as uplink/downlink communication 1500a, sidelink communication 1500b (or D2D communication), and inter-BS communication 1500c (e.g., relay, Integrated Access Backhaul (IAB)). The wireless device and the BS/the wireless device and the BS and the BS may transmit/receive radio signals to/from each other through wireless communications/connections 1500a, 1500b, and 1500c. For example, the wireless communications/connections 1500a, 1500b, and 1500c may transmit/receive signals through various physical channels. To this end, based on various proposals of the present disclosure, at least some of various configuration information setting processes, various signal processing processes (e.g., channel encoding/decoding, modulation/demodulation, resource mapping/demapping, etc.), a resource allocation process, and the like for transmission/reception of the radio signal may be performed.

Example of Wireless Device to which Present Disclosure is Applied

FIG. 34 illustrates a wireless device which may be applied to the present disclosure.

Referring to FIG. 34, a first wireless device 1000 and a second wireless device 2000 may transmit/receive radio signals through various wireless access technologies (e.g., LTE and NR). Here, the first wireless device 1000 and the second wireless device 2000 may correspond to a wireless device 1000x and a BS 2000 and/or a wireless device 1000x and a wireless device 1000x of FIG. 36.

The first wireless device 1000 may include one or more processors 1020 and one or more memories 1040 and additionally further include one or more transceivers 1060 and/or one or more antennas 1080. The processor 1020 may control the memory 1040 and/or the transceiver 1060 and may be configured to implement descriptions, functions, procedures, proposals, methods, and/or operation flows disclosed in the present disclosure. For example, the processor 1020 may process information in the memory 1040 and generate a first information/signal and then transmit a radio signal including the first information/signal through the transceiver 1060. Further, the processor 1020 may receive a radio signal including a second information/signal through the transceiver 1060 and then store in the memory 1040 information obtained from signal processing of the second information/signal. The memory 1040 may connected to the processor 1020 and store various information related to an operation of the processor 1020. For example, the memory 1040 may store a software code including instructions for performing some or all of processes controlled by the processor 1020 or performing the descriptions, functions, procedures, proposals, methods, and/or operation flowcharts disclosed in the present disclosure. Here, the processor 1020 and the memory 1040 may be a part of a communication modem/circuit/chip designated to implement the wireless communication technology (e.g., LTE and NR). The transceiver 1060 may be connected to the processor 1020 and may transmit and/or receive the radio signals through one or more antennas 1080. The transceiver 1060 may include a transmitter and/or a receiver. The transceiver 1060 may be mixed with a radio frequency (RF) unit. In the present disclosure, the wireless device may mean the communication modem/circuit/chip.

The second wireless device 2000 may include one or more processors 2020 and one or more memories 2040 and additionally further include one or more transceivers 2060 and/or one or more antennas 2080. The processor 2020 may control the memory 2040 and/or the transceiver 2060 and may be configured to implement descriptions, functions, procedures, proposals, methods, and/or operation flows disclosed in the present disclosure. For example, the processor 2020 may process information in the memory 2040 and generate a third information/signal and then transmit a radio signal including the third information/signal through the transceiver 2060. Further, the processor 2020 may receive a radio signal including a fourth information/signal through the transceiver 2060 and then store in the memory 2040 information obtained from signal processing of the fourth information/signal. The memory 2040 may connected to the processor 2020 and store various information related to an operation of the processor 2020. For example, the memory 2040 may store a software code including instructions for performing some or all of processes controlled by the processor 2020 or performing the descriptions, functions, procedures, proposals, methods, and/or operation flowcharts disclosed in the present disclosure. Here, the processor 2020 and the memory 2040 may be a part of a communication modem/circuit/chip designated to implement the wireless communication technology (e.g., LTE and NR). The transceiver 2060 may be connected to the processor 2020 and may transmit and/or receive the radio signals through one or more antennas 2080. The transceiver 2060 may include a transmitter and/or a receiver and the transceiver 2060 may be mixed with the RF unit. In the present disclosure, the wireless device may mean the communication modem/circuit/chip.

Hereinafter, hardware elements of the wireless devices 1000 and 2000 will be described in more detail. Although not limited thereto, one or more protocol layers may be implemented by one or more processors 1020 and 2020. For example, one or more processors 1020 and 2020 may implement one or more layers (e.g., functional layers such as PHY, MAC, RLC, PDCP, RRC, and SDAP). One or more processors 1020 and 2020 may generate one or more protocol data units (PDUs) and/or one or more service data units (SDUs) according to the descriptions, functions, procedures, proposals, methods, and/or operation flowcharts disclosed in the present disclosure. One or more processors 1020 and 2020 may generate a message, control information, data, or information according to the descriptions, functions, procedures, proposals, methods, and/or operation flowcharts disclosed in the present disclosure. One or more processors 1020 and 2020 may generate a signal (e.g., a baseband signal) including the PDU, the SDU, the message, the control information, the data, or the information according to the function, the procedure, the proposal, and/or the method disclosed in the present disclosure and provide the generated signal to one or more transceivers 1060 and 2060. One or more processors 1020 and 2020 may receive the signal (e.g. baseband signal) from one or more transceivers 1060 and 2060 and acquire the PDU, the SDU, the message, the control information, the data, or the information according to the descriptions, functions, procedures, proposals, methods, and/or operation flowcharts disclosed in the present disclosure.

One or more processors 1020 and 2020 may be referred to as a controller, a microcontroller, a microprocessor, or a microcomputer. One or more processors 1020 and 2020 may be implemented by hardware, firmware, software, or a combination thereof. As one example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 1020 and 2020. The descriptions, functions, procedures, proposals, and/or operation flowcharts disclosed in the present disclosure may be implemented by using firmware or software and the firmware or software may be implemented to include modules, procedures, functions, and the like. Firmware or software configured to perform the descriptions, functions, procedures, proposals, and/or operation flowcharts disclosed in the present disclosure may be included in one or more processors 1020 and 2020 or stored in one or more memories 1040 and 2040 and driven by one or more processors 1020 and 2020. The descriptions, functions, procedures, proposals, and/or operation flowcharts disclosed in the present disclosure may be implemented by using firmware or software in the form of a code, the instruction and/or a set form of the instruction.

One or more memories 1040 and 2040 may be connected to one or more processors 1020 and 2020 and may store various types of data, signals, messages, information, programs, codes, instructions, and/or instructions. One or more memories 1040 and 2040 may be configured by a ROM, a RAM, an EPROM, a flash memory, a hard drive, a register, a cache memory, a computer reading storage medium, and/or a combination thereof. One or more memories 1040 and 2040 may be positioned inside and/or outside one or more processors 1020 and 2020. Further, one or more memories 1040 and 2040 may be connected to one or more processors 1020 and 2020 through various technologies such as wired or wireless connection.

One or more transceivers 1060 and 2060 may transmit to one or more other devices user data, control information, a wireless signal/channel, etc., mentioned in the methods and/or operation flowcharts of the present disclosure. One or more transceivers 1060 and 2060 may receive from one or more other devices user data, control information, a wireless signal/channel, etc., mentioned in the descriptions, functions, procedures, proposals, methods, and/or operation flowcharts disclosed in the present disclosure. For example, one or more transceivers 1060 and 2060 may be connected to one or more processors 1020 and 2020 and transmit and receive the radio signals. For example, one or more processors 1020 and 2020 may control one or more transceivers 1060 and 2060 to transmit the user data, the control information, or the radio signal to one or more other devices. Further, one or more processors 1020 and 2020 may control one or more transceivers 1060 and 2060 to receive the user data, the control information, or the radio signal from one or more other devices. Further, one or more transceivers 1060 and 2060 may be connected to one or more antennas 1080 and 2080 and one or more transceivers 1060 and 2060 may be configured to transmit and receive the user data, control information, wireless signal/channel, etc., mentioned in the descriptions, functions, procedures, proposals, methods, and/or operation flowcharts disclosed in the present disclosure through one or more antennas 1080 and 2080. In the present disclosure one or more antennas may be a plurality of physical antennas or a plurality of logical antennas (e.g., antenna ports). One or more transceivers 1060 and 2060 may convert the received radio signal/channel from an RF band signal to a baseband signal in order to process the received user data, control information, radio signal/channel, etc., by using one or more processors 1020 and 2020. One or more transceivers 1060 and 2060 may convert the user data, control information, radio signal/channel, etc., processed by using one or more processors 1020 and 2020, from the baseband signal into the RF band signal. To this end, one or more transceivers 1060 and 2060 may include an (analog) oscillator and/or filter.

Example of Signal Processing Circuit to which Present Disclosure is Applied

FIG. 35 illustrates a signal processing circuit for a transmit signal.

Referring to FIG. 35 a signal processing circuit 10000 may include a scrambler 10100, a modulator 10200, a layer mapper 10300, a precoder 10400, a resource mapper 10500, and a signal generator 10600. Although not limited thereto, an operation/function of FIG. 35 may be performed by the processors 1020 and 2020 and/or the transceivers 1060 and 2060 of FIG. 34. Hardware elements of FIG. 35 may be implemented in the processors 1020 and 2020 and/or the transceivers 1060 and 2060 of FIG. 34. For example, blocks 10100 to 10600 may be implemented in the processors 1020 and 2020 of FIG. 34. Further, blocks 10100 to 10500 may be implemented in the processors 1020 and 2020 of FIG. 34 and the block 10600 of FIG. 34 and the block 2760 may be implemented in the transceivers 1060 and 2060 of FIG. 34.

A codeword may be transformed into a radio signal via the signal processing circuit 10000 of FIG. 35. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 10100. A scramble sequence used for scrambling may be generated based on an initialization value and the initialization value may include ID information of a wireless device. The scrambled bit sequence may be modulated into a modulated symbol sequence by the modulator 10200. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 10300. Modulated symbols of each transport layer may be mapped to a corresponding antenna port(s) by the precoder 10400 (precoding). Output z of the precoder 10400 may be obtained by multiplying output y of the layer mapper 10300 by precoding matrix W of N*M. Here, N represents the number of antenna ports and M represents the number of transport layers. Here, the precoder 10400 may perform precoding after performing transform precoding (e.g., DFT transform) for complex modulated symbols. Further, the precoder 10400 may perform the precoding without performing the transform precoding.

The resource mapper 10500 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 10600 may generate the radio signal from the mapped modulated symbols and the generated radio signal may be transmitted to another device through each antenna. To this end, the signal generator 10600 may include an Inverse Fast Fourier Transform (IFFT) module, a Cyclic Prefix (CP) insertor, a Digital-to-Analog Converter (DAC), a frequency uplink converter, and the like.

A signal processing process for a receive signal in the wireless device may be configured in the reverse of the signal processing process (10100 to 10600) of FIG. 25. For example, the wireless device (e.g., 1000 or 2000 of FIG. 34) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which Present Disclosure is Applied

FIG. 36 illustrates another example of a wireless device applied to the present disclosure.

The wireless device may be implemented as various types according to a use example/service (see FIG. 33). Referring to FIG. 36, wireless devices 1000 and 2000 may correspond to the wireless devices 1000 and 2000 of FIG. 34 and may be constituted by various elements, components, units, and/or modules. For example, the wireless devices 1000 and 2000 may include a communication unit 1100, a control unit 1200, and a memory unit 1300, and an additional element 1400. The communication unit may include a communication circuit 1120 and a transceiver(s) 1140. For example, the communication circuit 1120 may include one or more processors 1020 and 2020 and/or one or more memories 1040 and 2040 of FIG. 34. For example, the transceiver(s) 1140 may include one or more transceivers 1060 and 2060 and/or one or more antennas 1080 and 2080 of FIG. 34. The control unit 1200 is electrically connected to the communication unit 1100, the memory unit 1300, and the additional element 1400 and controls an overall operation of the wireless device. For example, the control unit 1200 may an electrical/mechanical operation of the wireless device based on a program/code/instruction/information stored in the memory unit 1300. Further, the control unit 1200 may transmit the information stored in the memory unit 1300 to the outside (e.g., other communication devices) through the communication unit 1100 via a wireless/wired interface or store information received from the outside (e.g., other communication devices) through the wireless/wired interface through the communication unit 1100.

The additional element 1400 may be variously configured according to the type of wireless device. For example, the additional element 1400 may include at least one of a power unit/battery, an input/output (I/O) unit, a driving unit, and a computing unit. Although not limited thereto, the wireless device may be implemented as a form such as the robot 1000*a* of FIG. 33, the vehicles 1000*b*-1 and 1000*b*-2 of FIG. 33, the XR device 1000*c* of FIG. 33, the portable device 1000*d* of FIG. 33, the home appliance 1000*e* of FIG. 33, the IoT device 1000*f* of FIG. 33, a digital broadcasting terminal, a hologram device, a public safety device, an MTC device, a medical device, a fintech device (or financial device), a security device, a climate/environment device, an AI server/device 4000 of FIG. 33, the BS 2000 of FIG. 33, a network node, etc. The wireless device may be movable or may be used at a fixed place according to a use example/service.

In FIG. 36, all of various elements, components, units, and/or modules in the wireless devices 1000 and 2000 may be interconnected through the wired interface or at least may be wirelessly connected through the communication unit 1100. For example, the control unit 1200 and the communication 110 in the wireless devices 1000 and 2000 may be wiredly connected and the control unit 1200 and the first unit (e.g., 1300 or 1400) may be wirelessly connected through the communication unit 1100. Further, each element, component, unit, and/or module in the wireless devices 1000 and 2000 may further include one or more elements. For example, the control unit 1200 may be constituted by one or more processor sets. For example, the control unit 1200 may be configured a set of a communication control processor, an application processor, an electronic control unit (ECU), a graphic processing processor, a memory control processor, etc. As another example, the memory 1300 may be configured as a random access memory (RAM), a dynamic RAM (DRAM), a read only memory (ROM), a flash memory, a volatile memory, a non-volatile memory, and/or combinations thereof.

FIG. 37 illustrates a portable device applied to the present disclosure.

The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 37, a portable device 1000 may include an antenna unit 1080, a communication unit 1100, a control unit 1200, a memory unit 1300, a power supply unit 1400a, an interface unit 1400b, and an input/output unit 1400c. The antenna unit 1080 may be configured as a part of the communication unit 1100. The blocks 1100 to 1300/1400a to 1400c correspond to the blocks 1100 to 1300/1400 of FIG. 36, respectively.

The communication unit 1100 may transmit/receive a signal (e.g., data, a control signal, etc.) to/from another wireless device and BSs. The control unit 1200 may perform various operations by controlling components of the portable device 1000. The control unit 1200 may include an Application Processor (AP). The memory unit 1300 may store data/parameters/programs/codes/instructions required for driving the portable device 1000. Further, the memory unit 1300 may store input/output data/information, etc. The power supply unit 1,400a may supply power to the portable device 1000 and include a wired/wireless charging circuit, a battery, and the like. The interface unit 1400b may support a connection between the portable device 1000 and another external device. The interface unit 1400b may include various ports (e.g., an audio input/output port, a video input/output port) for the connection with the external device. The input/output unit 1400c may receive or output a video information/signal, an audio information/signal, data, and/or information input from a user. The input/output unit 1400c may include a camera, a microphone, a user input unit, a display unit 1400d, a speaker, and/or a haptic module.

As one example, in the case of data communication, the input/output unit 1400c may acquire information/signal (e.g., touch, text, voice, image, and video) input from the user and the acquired information/signal may be stored in the memory unit 1300. The communication unit 1100 may transform the information/signal stored in the memory into the radio signal and directly transmit the radio signal to another wireless device or transmit the radio signal to the BS. Further, the communication unit 1100 may receive the radio signal from another wireless device or BS and then reconstruct the received radio signal into original information/signal. The reconstructed information/signal may be stored in the memory unit 1300 and then output in various forms (e.g., text, voice, image, video, haptic) through the input/output unit 1400c.

A wireless communication technology implemented by a wireless device (e.g., 1000, 2000, 1000a to 1000f) according to the present disclosure may include narrowband Internet of Things for low power communication in addition to LTE, NR and 6G. In this case, for example, the NB-IoT technology may be an example of a low power wide area network (LPWAN) technology and may be implemented by standards such as LTE Cat NB1 and/or LTE Cat NB2, and the present disclosure is not limited to the aforementioned names. Additionally or alternatively, the wireless communication technology implemented by the wireless device (e.g., 1000, 2000, 1000a to 1000f) according to the present disclosure may perform communication based on the LTE-M technology. In this case, for example, the LTE-M technology may be an example of the LPWAN technology and may be called various names, such as enhanced Machine Type Communication (eMTC). For example, the LTE-M technology may be implemented by at least one of various standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and the present disclosure is not limited to the aforementioned names. Additionally or alternatively, the wireless communication technology implemented by the wireless device (e.g., 1000, 2000, 1000a to 1000f) according to the present disclosure may include at least one of ZigBee, Bluetooth and a low power wide area network (LPWAN) in which low power communication is considered, and the present disclosure is not limited to the aforementioned names. For example, the ZigBee technology may generate personal area networks (PAN) related to small/low-power digital communication based on various standards such as IEEE 802.15.4, and may be called various names.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL AVAILABILITY

Although the present disclosure has described a method for transmitting and receiving downlink information in a wireless communication system supporting Internet of Things (IoT) (e.g., MTC, NB-IoT) focusing on examples applying to the 3GPP LTE/LTE-A system, the present disclosure can be applied to various wireless communication systems such as 5G system in addition to the 3GPP LTE/LTE-A system.

The invention claimed is:

1. A method performed by a user equipment (UE), in a wireless communication system supporting Internet of Things (IoT), the method comprising:
receiving, from a base station, discontinuous reception (DRX) related information via radio resource control (RRC) signaling;
receiving, from the base station, a paging message based on the DRX related information;
receiving, from the base station via a RRC signal, resource reservation configuration information including first information for a slot level bitmap related to a reserved resource and second information for a symbol level bitmap related to the reserved resource, wherein the resource reservation configuration information semi-statistically configures the reserved resource;
receiving, from the base station, downlink control information (DCI) including resource reservation information, wherein the resource reservation information dynamically configures whether to use the reserved resource of slot-level and symbol-level granularity configured via the RRC signal for a IoT downlink resource;
determining, based on the resource reservation configuration information and the resource reservation information, the IoT downlink resource,
wherein, based on the resource reservation information being set to "0", the IoT downlink resource is determined as the reserved resource, and
wherein, based on the resource reservation information being set to "1" thereby indicating that the reserved resource is fully reserved, the IoT downlink resource is determined as a resource other than the reserved resource; and
receiving, from the base station, downlink information based on the IT downlink resource.

2. The method of claim 1, wherein the reserved resource is one or more symbols reserved based on the symbol level bitmap in a slot reserved based on the slot level bitmap.

3. The method of claim 1, wherein the slot level bitmap is set in units of 10 milliseconds (ms) or 40 ms.

4. A user equipment (UE) in a wireless communication system supporting Internet of Things (IoT), the UE comprising:
at least one transceiver;
at least one processor; and
at least one memory operably connectable to the at least one processor and storing instructions that, when executed by the at least one processor, perform operations comprising:
receiving, from a base station, discontinuous reception (DRX) related information via radio resource control (RRC) signaling;
receiving, from the base station, a paging message based on the DRX related information;
receiving, from the base station via a RRC signal, resource reservation configuration information including first information for a slot level bitmap related to a reserved resource and second information for a symbol level bitmap related to the reserved resource, wherein the resource reservation configuration information semi-statistically configures the reserved resource;
receiving, from the base station, downlink control information (DCI) including resource reservation information, wherein the resource reservation information dynamically configures whether to use the reserved resource of slot-level and symbol-level granularity configured via the RRC signal for a IoT downlink resource;
determining, based on the resource reservation configuration information and the resource reservation information, the IoT downlink resource,
wherein, based on the resource reservation information being set to "0", the IoT downlink reserved resource is determined as the reserved-downlink resource, and
wherein, based on the resource reservation information being set to "1" thereby indicating that the reserved resource is fully reserved, the IoT downlink resource is determined as a resource other than the reserved resource; and
receiving, from the base station, downlink information based on the IoT downlink resource.

5. A method performed by a base station in a wireless communication system supporting Internet of Things (IoT), the method comprising:
transmitting, to a user equipment (UE), discontinuous reception (DRX) related information via radio resource control (RRC) signaling;
transmitting, to the UE, a paging message based on the DRX related information;
transmitting, to the UE via a RRC signal, resource reservation configuration information including first information for a slot level bitmap related to a reserved resource and second information for a symbol level bitmap related to the reserved resource, wherein the resource reservation configuration information semi-statistically configures the reserved resource;
transmitting, to the UE, downlink control information (DCI) including resource reservation information, wherein the resource reservation information dynamically configures whether to use the reserved resource of slot-level and symbol-level granularity configured via the RRC signal for a IoT downlink resource,
wherein the IoT downlink resource is determined based on the resource reservation configuration information and the resource reservation information,
wherein, based on the resource reservation information being set to "0", the IoT downlink resource is determined as the reserved resource, and
wherein, based on the resource reservation information being set to "1" thereby indicating that the reserved resource is fully reserved, the IoT downlink resource is determined as a resource other than the reserved resource; and
transmitting, to the UE, downlink information based on the IoT downlink resource.

6. The method of claim 5, wherein the reserved resource is one or more symbols reserved based on the symbol level bitmap in a slot reserved based on the slot level bitmap.

7. The method of claim 5, wherein the slot level bitmap is set in units of 10 milliseconds (ms) or 40 ms.

\* \* \* \* \*